(12) United States Patent
Bettner et al.

(10) Patent No.: US 12,041,276 B2
(45) Date of Patent: Jul. 16, 2024

(54) SYSTEM AND METHOD FOR CONTENT STREAMING INTERACTIVITY

(71) Applicant: Playful Corp., McKinney, TX (US)

(72) Inventors: Paul Bettner, McKinney, TX (US); Mark Stanley, McKinney, TX (US); Michael Coker, McKinney, TX (US); Mark Lohstroh, McKinney, TX (US); Kristopher Chambers, McKinney, TX (US); Eric Best, McKinney, TX (US); Daniel Havens, McKinney, TX (US); Stephen Hurd, McKinney, TX (US)

(73) Assignee: Playful Corp., McKinney, TX (US)

( * ) Notice: Subject to any disclaimer, the term of this patent is extended or adjusted under 35 U.S.C. 154(b) by 0 days.

(21) Appl. No.: 17/440,621

(22) PCT Filed: Mar. 18, 2020

(86) PCT No.: PCT/US2020/023417
§ 371 (c)(1),
(2) Date: Sep. 17, 2021

(87) PCT Pub. No.: WO2020/191090
PCT Pub. Date: Sep. 24, 2020

(65) Prior Publication Data
US 2022/0167022 A1    May 26, 2022

Related U.S. Application Data

(60) Provisional application No. 62/954,181, filed on Dec. 27, 2019, provisional application No. 62/820,028, filed on Mar. 18, 2019.

(51) Int. Cl.
*H04N 21/2187* (2011.01)
*H04N 21/442* (2011.01)
(Continued)

(52) U.S. Cl.
CPC ... *H04N 21/2187* (2013.01); *H04N 21/44204* (2013.01); *H04N 21/44224* (2020.08); *H04N 21/4532* (2013.01); *H04N 21/472* (2013.01)

(58) Field of Classification Search
CPC ......... H04N 21/2187; H04N 21/44204; H04N 21/44224; H04N 21/4532; H04N 21/472
See application file for complete search history.

(56) References Cited

U.S. PATENT DOCUMENTS 9,814,987 B1 * 11/2017 Lawson ............... A63F 13/65
9,827,500 B1 * 11/2017 Baklov ............... A63F 13/352
(Continued)

OTHER PUBLICATIONS

International Search Report dated Jun. 17, 2020 in connection with International Patent Application No. PCT/US2020/023417, 2 pages.
(Continued)

*Primary Examiner* — Michael R Telan

(57) ABSTRACT

An electronic device (101) for interactive content streaming includes a memory (130) and at least one processor (120) coupled to the memory (130). The at least one processor (120) is configured to receive an interaction request from a streaming device (1305), determine at least one action based on the interaction request, provide an action notification, based on the at least one action, to a content source (1308), wherein the action notification notifies the content source (1308) to update a state of at least one content of the content source (1308), and transmit a state update notification to the streaming device (1305), wherein the state update notification updates one or more applications of the streaming device (1305) based on the updated state of the at least one content.

21 Claims, 28 Drawing Sheets

(51) Int. Cl.
     *H04N 21/45*       (2011.01)
     *H04N 21/472*    (2011.01)

(56) References Cited

U.S. PATENT DOCUMENTS

| | | | |
|---|---|---|---|
| 9,954,646 | B1 | 4/2018 | Marcin et al. |
| 9,998,796 | B1* | 6/2018 | Kedenburg, III .... H04N 21/466 |
| 10,015,224 | B1 | 7/2018 | Shen et al. |
| 10,105,596 | B1 | 10/2018 | Mann |
| 10,116,989 | B1 | 10/2018 | Shen et al. |
| 10,129,310 | B1 | 11/2018 | Brunning |
| 2003/0014546 | A1* | 1/2003 | Kikinis .............. H04N 21/4627 |
| | | | 348/E5.002 |
| 2010/0050219 | A1* | 2/2010 | Angiolillo ........ H04N 21/42204 |
| | | | 725/100 |
| 2010/0332565 | A1* | 12/2010 | Al-Shaykh .............. G06F 16/44 |
| | | | 707/955 |
| 2012/0036536 | A1* | 2/2012 | Klappert ................ H04N 5/782 |
| | | | 725/50 |
| 2016/0286244 | A1* | 9/2016 | Chang ................ H04N 21/4788 |
| 2017/0001112 | A1* | 1/2017 | Gilmore .................. A63F 13/85 |
| 2017/0003740 | A1* | 1/2017 | Verfaillie ................ A63F 13/87 |
| 2017/0003784 | A1* | 1/2017 | Garg ....................... A63F 13/87 |
| 2017/0006322 | A1* | 1/2017 | Dury .................... H04N 21/254 |

OTHER PUBLICATIONS

Written Opinion of the International Searching Authority dated Jun. 17, 2020 in connection with International Patent Application No. PCT/US2020/023417, 6 pages.

* cited by examiner

SYSTEM AND METHOD FOR CONTENT STREAMING INTERACTIVITY

CROSS-REFERENCE TO RELATED APPLICATIONS

This application is a 371 of International Application No. PCT/US2020/023417 filed on Mar. 18, 2020, which claims priority to U.S. Patent Application No. 62/820,028 filed on Mar. 18, 2019, and U.S. Patent Application No. 62/954,181 filed on Dec. 27, 2019, the disclosures of which are herein incorporated by reference in their entirety.

TECHNICAL FIELD

This disclosure generally relates to media streaming. More specifically, this disclosure relates to a system and method for content streaming interactivity.

BACKGROUND

The advent of live streaming gameplay has created a large, thriving, and growing subculture of viewers watching gamers play games. While thousands of viewers can watch a single player play a game, there are few methods to interact with that gameplay, and even fewer to provide meaningful changes to that gameplay. Most games do not consider streaming interactivity at all—streams are purely passive. Interactions (such as chat, emotes, etc.) are separate from the game. This means that any interaction is transitory, as there is no way to record or reward repeated interaction, and is framed from the context of the platform (such as chat) versus the game (such as game-driven art, systems, etc.).

SUMMARY

This disclosure provides a system and method for content streaming interactivity.

In one embodiment, an electronic device for interactive content streaming comprises a memory, and at least one processor coupled to the memory. The at least one processor is configured to receive an interaction request from a streaming device. The at least one processor is further configured to determine at least one action based on the interaction request. The at least one processor is further configured to provide an action notification, based on the at least one action, to a content source, wherein the action notification notifies the content source to update a state of at least one content of the content source. The at least one processor is further configured to transmit a state update notification to the streaming device, wherein the state update notification updates one or more applications of the streaming device based on the updated state of the at least one content.

In another embodiment, a method for interactive content streaming comprises receiving an interaction request from a streaming device. The method further comprises determining at least one action based on the interaction request. The method further comprises providing an action notification, based on the at least one action, to a content source, wherein the action notification notifies the content source to update a state of at least one content of the content source. The method further comprises transmitting a state update notification to the streaming device, wherein the state update notification updates one or more applications of the streaming device based on the updated state of the at least one content.

In another embodiment, a method for providing interactions during a media stream comprises receiving an interaction request from a streaming device. The method further comprises determining at least one action based on the interaction request. The method further comprises transmitting an action notification based on the at least one action to a content source. The method further comprises receiving a confirmation message from the content source, wherein the confirmation message confirms that a state of at least one content of the content source is updated in response to the action notification. The method further comprises transmitting a state update notification to update a streaming client application on the streaming device based on the updated state.

In another embodiment, a method for providing content to a streaming client application comprises receiving an identifier detection notification from the streaming client application, wherein the identifier detection notification includes information associated with an identifier detected by the streaming client application in one or more streamed images. The method further comprises retrieving at least one content in response to the identifier detection notification. The method further comprises transmitting the at least one content to the streaming client application for display in the streaming client application.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
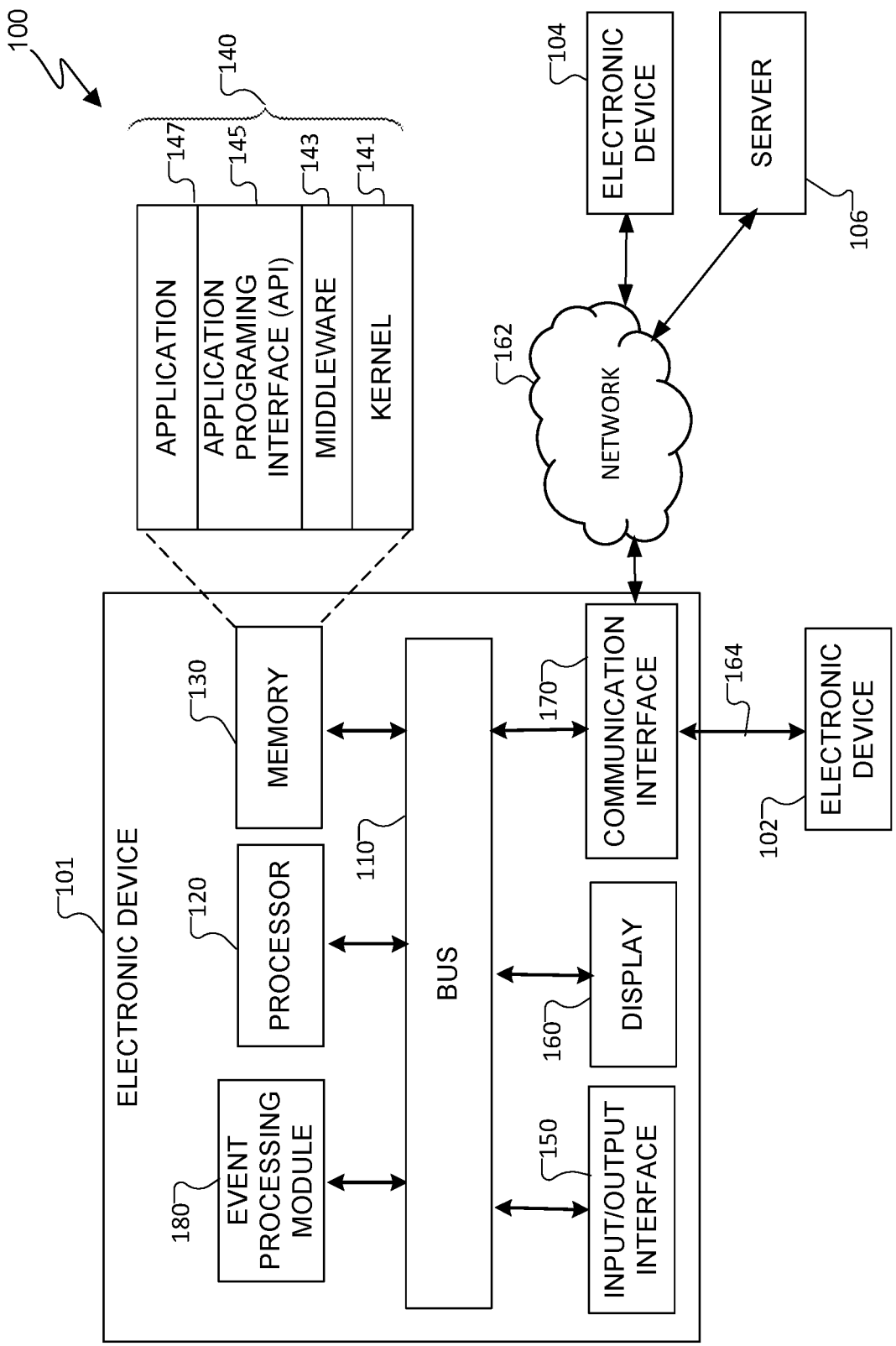
FIG. 1 illustrates an example networked system in accordance with various embodiments of this disclosure.

FIGS. 1 through 25, discussed below, and the various embodiments of this disclosure are described with reference to the accompanying drawings. However, it should be appreciated that this disclosure is not limited to the embodiments and all changes and/or equivalents or replacements thereto also belong to the scope of this disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO console), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

This disclosure describes systems and methods by which viewers can interact with, influence, and alter elements of the game while the viewers are watching a live stream of the gameplay and without having to own, or even directly play, the game itself. Viewers watching a game on a live streaming service (such as TWITCH, MIXER, or CAFFEINE) can send interaction signals to the game via either extensions built on the stream service or through an application program interface (API) of the service itself. The game receives these signals, processes the signals, and alters the mode of play, rules, camera angle, or any number of additional aspects of the game based on the overall design of the game itself. Once the game processes the inputs sent through a live streaming client and alters its gameplay based upon those inputs, the streamers playing the game and the viewers watching the stream will see the results of those inputs on the stream, while allowing the viewers to continue to send signals to alter the game further.

As a viewer watches streams of the game, they accrue in-game items. An account is created for every viewer behind the scenes that is connected to a traditional account should the viewer make one. When a viewer creates an account, all the accrued rewards are granted from the behind the scenes account to their traditional account for use in game. Embodiments of this disclosure wrap the viewer interaction into the game itself. Instead of arbitrary votes in the chat element of a streaming client, embodiments of the systems and methods of this disclosure create in-game items, associated with the behind the scenes account, allowing the viewer to actually participate and interact with the game through in-game mechanics and visualization, the interaction being independent from any single streaming client. Embodiments of this disclosure allow for (N) interactions in the game.

Embodiments of this disclosure allow for connecting to viewers of a game, independent of the streaming platform, allow for interacting and influencing the game play and game rules, through a game-specific framework and context (the method of interaction is designed and implemented within the game, making it unique per title), and allow the viewer to accrue rewards without having to first purchase the game. This is accomplished by using frameworks and APIs provided by the streaming services to connect with the gameplay and account servers to create and generate game-specific content to provide to the viewers through the viewers' preferred streaming client. The viewers interact with the game through game-specific content, rather than only through client chat or emote commands.

Embodiments of this disclosure improve the immersion and feel of the viewer experience, and provide a seamless method to gain rewards which are then bestowed to them upon creating an account. It also provides a platform-independent approach to the viewing and interaction experience, so that, regardless of the platform the viewer chooses, the viewer can still interact with the game. Game-specific content and rewards are granted to the viewer, or are rewarded to all viewers via the actual players, rather than being a generic reward.

FIG. 1 illustrates an example networked system 100 in accordance with various embodiments of this disclosure. The embodiment of the system 100 shown in FIG. 1 is for illustration only. Other embodiments of the system 100 could be used without departing from the scope of this disclosure.

According to embodiments of this disclosure, an electronic device 101 is included in the system 100. The electronic device 101 can include at least one of a bus 110, a processor 120, a memory 130, an input/output (IO) interface 150, a display 160, a communication interface 170, or an event processing module 180. In some embodiments, the electronic device 101 may exclude at least one of the components or may add another component.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can send or receive messages pertaining to services provided to an extension of a streaming client to provide additional functionality to the streaming client and the extension.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 can include a streaming extension application that provides additional functionality to a streaming application, such as additional viewer communications options, functions to interact with content streamed by another streaming device, or functions to enable projection of additional content onto a streaming application. In some embodiments, when the electronic device 101 is a server or backend system configured to communicate with a streaming client extension, the application 147 can include one or more applications that receive messages from the streaming client extension, process the messages to determine actions to be performed at the streaming client extension, and communicate with a game server and/or a streaming service to confirm and implement the determined actions.

The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (such as a command) for filing control, window control, image processing or text control.

The IO interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 includes, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as signals received by the communication interface 170 regarding streaming client extension signals, game server signals, streaming service signals, or other signals.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
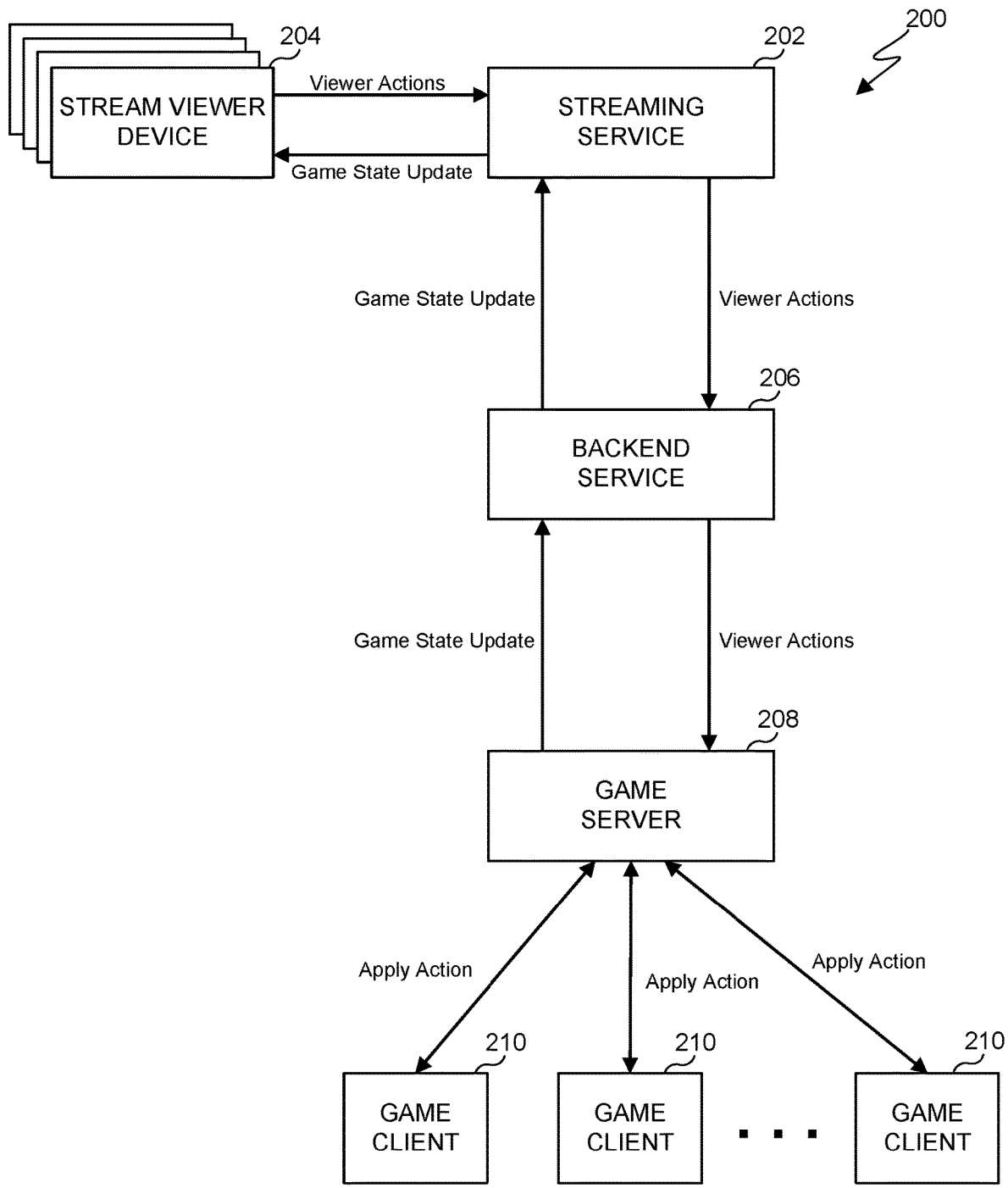
FIG. 2 illustrates a stream interaction system in accordance with various embodiments of this disclosure.

FIG. 2 illustrates a stream interaction system 200 in accordance with various embodiments of this disclosure. The system 200 includes a streaming service 202 (such as provided by TWITCH, MIXER, CAFFEINE or other services), one or more stream viewer devices 204, a backend service 206, a game server 208, and one or more game clients 210. The stream viewer device 204, the game server 208, and devices running the streaming service 202, the backend service 206, and the one or more game clients 210, can include the same components 110-180 of the electronic device 101 illustrated in FIG. 1. The stream viewer devices 204 are configured to run a streaming application and communicate with a streaming service 202 to receive streaming media such as a video stream of the content of a game client 210. For example, a user operating a game client 210 can use the streaming service 202 to stream a gaming session to the stream viewer devices 204, such that the stream viewer devices 204 are presented with a video stream of the game content of the gaming client 210. The video stream presents a video of the game content to the viewers as if the viewers were playing the game—the viewers see what the user operating the game client 210 sees. In some embodiments, the stream viewer devices 204 are configured to, via the streaming application, provide multiple video windows presenting the viewers with different content in each window. For example, one video window of the streaming application on a stream viewer device 204 can present a video of the game content of the game client 210, another window can present a video stream of the user or streamer operating the game client 210, such as video content of the streamer providing commentary as the streamer operates the game client 210, and/or another window can present other content such as promotional video content.

The one or more game clients 210 in some embodiments are in communication with the game server 208. The game server 208 can be a server for facilitating various functions to the game, such as allowing for communication among game clients 210, such as chat communications and shared gaming spaces for online and multiplayer games, including updates to game clients 210 to maintain and sync player actions across game clients 210, hosting game content not stored locally on a device running a game client 210, providing game client patches to game clients 210, or other services and functions. In some embodiments, the game server 208 communicates with the backend service 206, and the backend service 206 then communicates with the streaming service 202 to update the streams of the stream viewer devices 204, or to receive communications from the stream viewer devices 204. In some embodiments, the game server 208 communicates directly with the streaming service 202. In yet other embodiments, the game server 208 communicates with the one or more game clients 210, while the devices running the one or more game clients 210 communicate with either the backend service 206 or the streaming service 202.

Various embodiments of this disclosure provide for viewers of a video stream to influence or take action in a game being streamed by a player or streamer. As illustrated in FIG. 2, in some embodiments the one or more stream viewer devices 204 transmit viewer actions to the streaming service 202. The streaming service 202 communicates received viewer actions to a backend service 206. The backend service 206 can be a service running on, for example, a server remote from the stream viewer devices 204 and the streaming service 202, to store additional content or viewer actions to be applied to a game being streamed. The backend service 206 determines based on the received viewer action message the actions to be performed at a game client 210 in response to a viewer action. In some embodiments, the backend service 206 transmits to the game server 208 the actions or content to be applied to at least one of the one or more game clients 210, and the game server 208 updates the at least one game client 210 with the action or content. In some embodiments, the backend service 206 can communicate with game clients 210 directly. The actions or content applied to game clients 210 can be stored at various devices of the system 200, such as the game server 208, the backend service 206, or locally on a device running a game client 210.

The actions or content applied to game clients 210 can include various actions and content such as updating at least one of the game clients 210 to present a message from one of the stream viewers, such as a text message pop-up near the avatar of the player streaming the game, transforming a location in the game, such as placing a hazard (such as a furnace, spikes, electricity, etc.) in the middle of a multi-player arena of the game, spawning items, vehicles, or enemies in the game, buffing the avatar of the player streaming the game (such as by increasing the avatar's health, strength, defense, or other buffs), allowing the viewer to customize an avatar of the viewer that can be visually presented either in the streaming application on the stream viewer device 204, an extension of the streaming application, or in the game, or other actions and content. The game state of the at least one game client 210 receiving the action or content update from the game server 208 is updated to reflect the action or content. The player operating the game client 210 is able to see, hear, and react to the game state update, and a multimedia content stream of the update affecting the game client 210 is transmitted back to the stream viewer devices 204, as part of the operation of the streaming service 202 and associated clients.

In some embodiments, the game server 208 transmits the game state update to the backend service 206, the backend service 206 transmits the game state update to the streaming service 202, and the streaming service 202 updates the stream of the game presented at the stream viewer devices 204 to show the updated game state. In some embodiments, the game server 208 communicates directly with the streaming service 202. In yet other embodiments, the game server 208 communicates with the one or more game clients 210, while the devices running the one or more game clients 210 communicate with either the backend service 206 or the streaming service 202.

The update to the stream viewer devices 204 can also include an update to a viewer's account, which is reflected by the streaming application on the stream viewer device 204. Various embodiments of this disclosure provide for viewer actions to be based on rewards accrued by the viewer for participating in the stream. A viewer of the stream can be rewarded for various participation activities, such as the amount of time the viewer has viewed the stream, either in the current session, or based on an overall amount of time viewing streaming content provided by a particular streamer or streaming channel, the number of times the viewer has chatted during a stream or streams, such as a number of submitted text chats in a chat window provided by the streaming client running on the stream viewer device 204, a frequency of chats submitted by the viewer during a stream or streams, if the viewer chooses to follow or subscribe to the streamer or the streaming channel, if the viewer chooses to donate to the streamer or the streaming channel, or other user or viewer participation activities. The rewards associated with a viewer are stored in an account associated with the viewer, such as an account stored by the streaming service 202, or the backend service 206. A list of viewer rewards can be presented to the user in a viewer rewards interface, such as a graphical user interface (GUI), of a streaming client, an extension application of the streaming client, or in another application executed on a stream viewer device 204.

In some embodiments, rewards provided to the viewer can be consumable resources such as consumable currency (such as coins, gems, etc.) and/or consumable items (such as treasure chests, boxes or crates, weapons or armor, character icons, environmental icons such as walls, fire, or others, card packs or individual cards, etc.). The currency or items can be redeemed in order to initiate an action or game content update. In some embodiments, the type of action or content update initiated by a viewer can be selected by the viewer by spending one of, or an amount of, the currency or items. The user may be presented with an interface for selecting an action or content, and the amount of currency or items used to activate each action or content. In some embodiments, specific actions or content are tied to a type of currency or item. For example, different currencies can be used for different actions, such as providing coins for one action or content and gems for another action or content. Different item types can also be used as designating different actions or content, and an icon for the item can represent the type of action or content. Upon activating an action or content, the currency or item in the appropriate amount can be deducted or removed from the viewer's account, and the deduction can be presented to the viewer in the viewer rewards interface.

Although FIG. 2 illustrates one example of a stream interaction system 200, various changes may be made to FIG. 2. For example, the system 200 could include any number of each component in any suitable arrangement. In general, computing and communication systems come in a wide variety of configurations, and FIG. 2 does not limit the scope of this disclosure to any particular configuration. While FIG. 2 illustrates one operational environment in which various features disclosed in this patent document can be used, these features could be used in any other suitable system.

Figure 3:
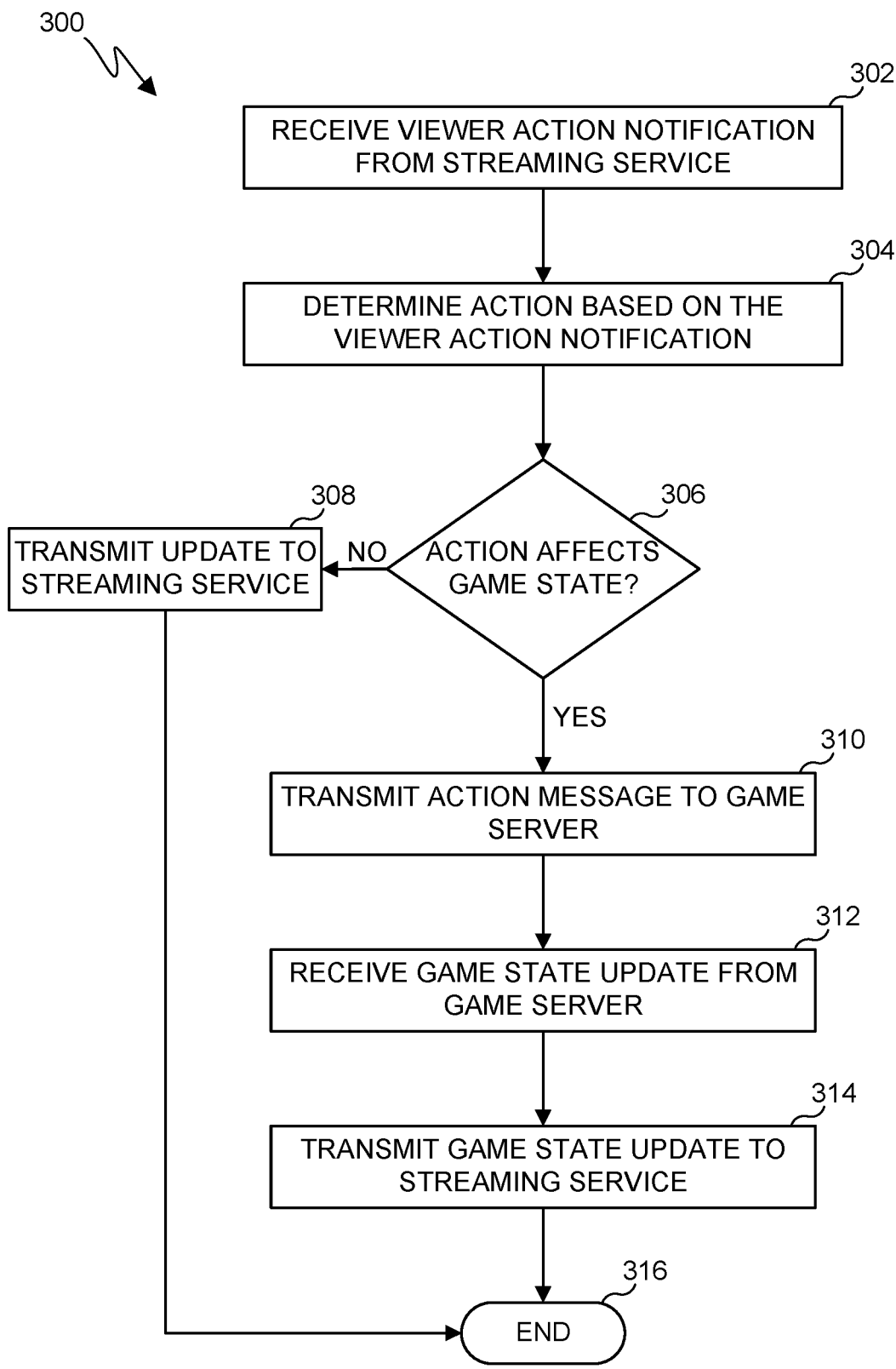
FIG. 3 illustrates a flowchart of a viewer interaction process in accordance with various embodiments of this disclosure.

FIG. 3 illustrates a flowchart of a viewer interaction process 300 in accordance with various embodiments of this disclosure. FIG. 3 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 300 is described with respect to the processor 120 of any, or a combination, of the streaming service 202, the stream viewer device 204, the backend service 206, the game server 208, or one of the one or more game clients 210. However, the process 300 can be used with any other suitable device(s) and in any suitable system. In some embodiments, the process 300 is executed by the backend service 206.

At block 302, the processor receives a viewer action notification from a streaming service. In some embodiments, the viewer action notification can be received from a device running a stream viewer client and a streaming extension. The viewer action notification can include a viewer account identifier, such as an authentication token or an account ID, an action type or a currency or item type, a target player, or other parameters. The account identifier can be included in the header of the notification. In some embodiments the currency or item type is specific to an action, and the currency or item type is included in the viewer action notification to indicate the action type.

At block 304, the processor determines an action based on the viewer action notification. In some embodiments, the processor determines the action by an action identifier included in the notification. In some embodiments in which the viewer action notification includes a currency or item identifier, the processor retrieves an action associated with the identified currency or item. Actions can be associated with particular currencies or items in an associative database or other data storage structure accessible by the processor for retrieving actions based on the currency or item identifier included in the viewer action notification. At decision block 306, the processor determines if the determined action affects the game state of the game being streamed. In some embodiments, the action may not affect the game state of the game being streamed, but may perform an action in the streaming client. For example, an action may trigger a custom message display in the streaming applications of the streamer and other stream viewers, or may enable an interface in the streaming application or an extension of the streaming application for the viewer to create a custom avatar that is not yet implemented or displayed in the game, rather than causing a change in the game at the time of this viewer action. In some embodiments, other rewards tied to the viewer's account can also be awarded, such as rewarding the viewer with custom avatar skins in the game if the viewer chooses to buy a copy of the game using the viewer's account. If the processor determines the action does not affect the game state, the process moves to block 308. At block 308, the processor transmits an update to the streaming service to cause the action to be reflected in the streaming client of the viewer who initiated the action, and in some embodiments in the streaming client of the streamer and other viewers. The process then ends at block 316.

If at decision block 306 the processor determines the determined action affects the game state, the process moves to block 310. At block 310, the processor transmits an action message to a game server. The action message indicates the determined action and parameters used by the game server 208 to update one or more game clients 210 with the action, such as the identity or account of the viewer who initiated the action, an action type or an effect of the action, a target player, a location in the game world to apply the action, or other parameters. In some embodiments, the processor at block 310 transmits the action message to one or more game clients directly. At block 312, the processor receives a game state update from the game server, or, in some embodiments, from one or more game clients.

The game state update indicates to the processor that action has been applied to the game state of one or more game clients, and can include additional information such as where in the game world the action was applied, and other updates on the current game state. At block 314, the processor transmits a game state update to the streaming service. This game state update can include an updated stream of the game to transmit to viewer clients currently viewing the stream, and can also include an indication to the streaming service to update the viewer streaming client, or an extension of the client, that currency or an item used to initiate the action is deducted from the viewer's account, and reflected in an interface viewable by the viewer in the client or extension of the client.

The viewer action notification, the action message, the game state update, or other notifications or messages sent between components, can be a Hypertext Transfer Protocol (HTTP) message, a JavaScript Object Notation (JSON) message, a Binary JSON message, a MessagePack message, or another message type.

Figure 4:
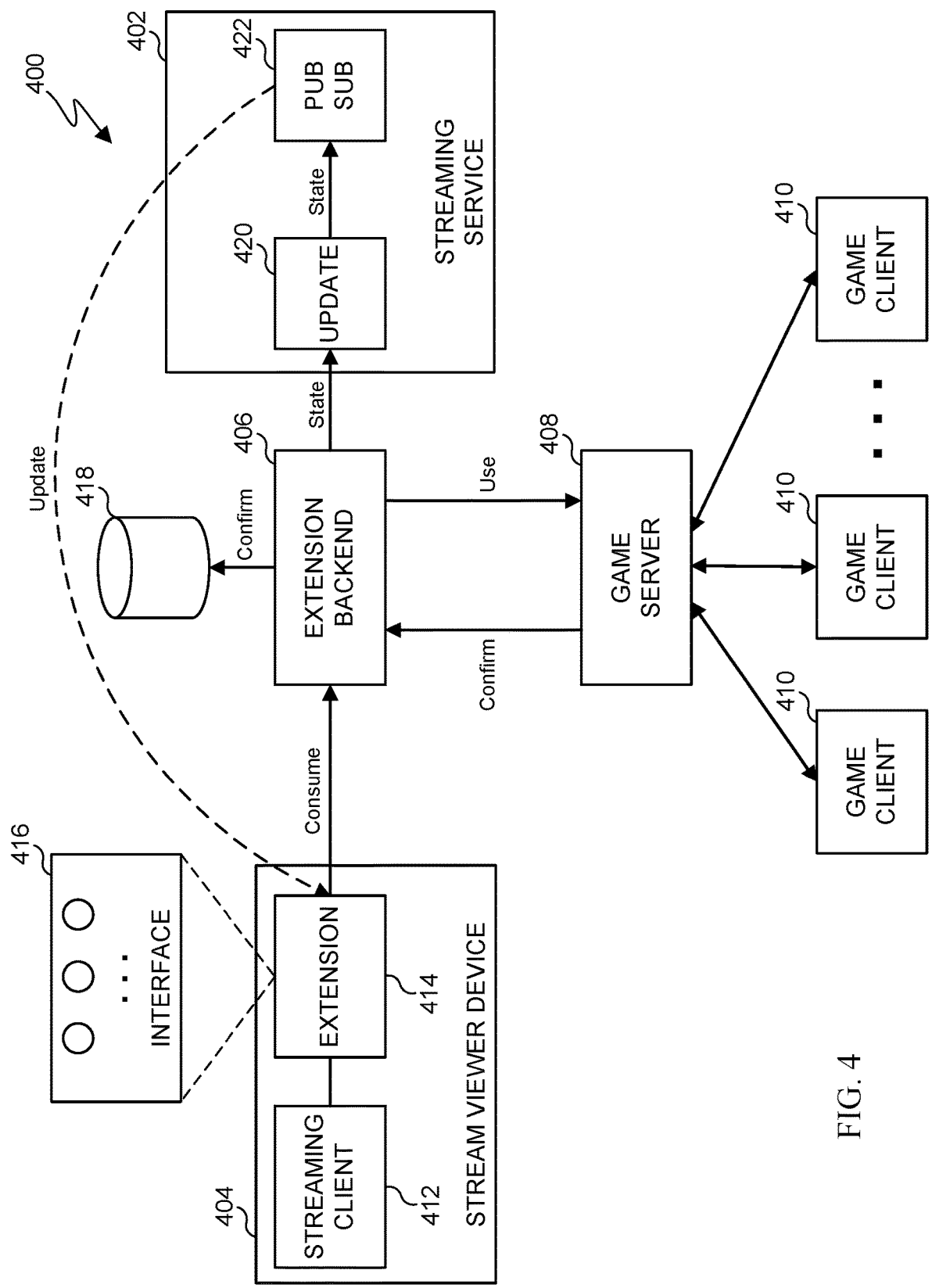
FIG. 4 illustrates a stream interaction system in accordance with various embodiments of this disclosure.

FIG. 4 illustrates a stream interaction system 400 in accordance with various embodiments of this disclosure. The system 400 includes a streaming service 402, a stream viewer device 404, an extension backend 406, a game server 408, and one or more game clients 410. The streaming service 402, the stream viewer device 404, the extension backend 406, the game server 408, and the one or more game clients 410 can be, in some embodiments, the streaming service 202, a stream viewer device 204, the backend service 206, the game server 208, and the one or more game clients 210, respectively. The stream viewer device 404, the game server 408, and devices running the streaming service 402, the extension backend 406, and the one or more game clients 410, can include the same components 110-180 of the electronic device 101 illustrated in FIG. 1. The stream viewer device 404 is configured to execute a streaming client application 412. An extension 414 of the streaming client application 412 is also executed by the stream viewer device 404. The extension 414 is an application or other executable that runs in connection with the streaming client application 412, and provides additional functionality to the streaming client application 412.

For example, the extension 414 can provide an interface or graphical overlay 416 in an interface window of the streaming client application 412, and can provide functions within the interface 416 such as additional chat options, viewer voting functions, viewer or streamer statistical overlays or interfaces, and/or a viewer inventory interface or overlay. The interface 416 can be configured to display one or more currencies, or one or more items to a viewer, wherein the currencies or items are rewards accrued by the viewer to provide the viewer with various options for interacting with the game or the stream of the game. It will be understood that the streaming client application 412 and the streaming extension 414 can be locally-stored programs on a stream viewer device 404, or can be applications provided via a web browser, such as if the streaming client application 412 is first activated by navigating to a webpage. The stream presented by the streaming client application 412 can also be hosted on other websites, such as by using an iFrame designating the dimensions of a video window on the webpage and calling the video stream via a URL. In some embodiments, the extension 414 can be a wrapper or injector client that activates upon a detection that the streaming client application 412 is running. In some embodiments, no extension of the streaming client is used, and a separate application, or the streaming client application 412, performs the functions described in this disclosure through an API.

The extension backend 406 communicates with the extension 414 to facilitate the extended functionality of the extension 414, and the extension backend 406 updates the game server 408 and the streaming service 402 in response to the extension 414 notifying the extension backend 406 of a use of a currency or item, and/or a viewer action. In some embodiments, the extension backend 406 has an API associated therewith that the extension 414 uses to communicate with the extension backend 406 and initiate various functions at the extension backend 406. In some embodiments, the extension backend 406 can be a component of the streaming service 402, such that certain communications from the streaming client application 412 and/or the extension 414 are sent to the streaming service 402 directly, and the streaming service 402 performs the functions of the extension backend 406 described in this disclosure. In some embodiments, the extension backend 406 can be a component of the game server 408, such that certain communications from the streaming client application 412 and/or the extension 414 are sent to the game server 408 directly, and the game server 408 performs the functions of the extension backend 406 described in this disclosure.

When a viewer operating the stream viewer device 404 selects a reward item presented to the user in the interface 416 of the extension 414, the extension 414 transmits a consume message to the extension backend 406. The consume message includes parameters such as a viewer account identifier, such as an authentication token or account ID, an action type or a currency or item type, a target player, or other parameters. The account identifier can be included in a header of the consume message. In some embodiments the currency or item type is specific to an action, and the currency or item type is included in the consume message to indicate the action type.

The extension backend 406, upon receiving the consume message, confirms that the item or action identified in the message, that is, the item or action the viewer selected to initiate the viewer action, is available to the viewer. The extension backend 406 includes, or can be communicatively connected to, a database 418 that stores items or actions in association with viewer accounts. The extension backend 406 confirms with the database 418 that the item or action is associated with the viewer's account. The extension backend 406 then transmits a use message to the game server 408. The use message notifies the game server 408 of the item or action that the viewer selected via the extension 414, and the game server 408 responds by updating the one or more game clients 410 with the appropriate action. The game server 408 then transmits to the extension backend 406 a confirm message confirming that the one or more game clients 410 have been updated with the appropriate action. The extension backend 406 responds by transmitting a state update message to an update module 420 of the streaming service 402. The update module 420 passes the state update to a publish-subscribe (pub/sub) module 422 of the streaming service 402, and the pub/sub module 422 transmits an update to the extension 414 to update the extension 414 that the action has been performed, such as by updating the viewer inventory in the interface 416 to reflect that the selected item has been removed from the inventory.

The update module 420 and the pub/sub module 422 can periodically push received updates in certain intervals. It will be understood that, in some embodiments, the streaming service 402 can have a different configuration, and the extension backend 406 generally sends the state update message to the streaming service 402, and the streaming services transmits the update to the extension 414. In some embodiments, while the streaming service 402 continues to stream video of the gameplay of a game client 410 from a streamer's client to the streaming client 412 of the stream viewer device 404, the extension backend 406 updates the database 418 of the use of the item, deducts the item from the viewer's account, and sends the state update message to the extension 414, reflecting the deduction of the item in the viewer's inventory presented in the interface 416.

The consumer message, the use message, the confirm message, or other notifications or messages sent between components, can be a Hypertext Transfer Protocol (HTTP) message, a JavaScript Object Notation (JSON) message, a Binary JSON message, a MessagePack message, or another message type.

Although FIG. 4 illustrates one example of a stream interaction system 400, various changes may be made to FIG. 4. For example, the system 400 could include any number of each component in any suitable arrangement. In general, computing and communication systems come in a wide variety of configurations, and FIG. 4 does not limit the scope of this disclosure to any particular configuration. While FIG. 4 illustrates one operational environment in which various features disclosed in this patent document can be used, these features could be used in any other suitable system.

Figure 5:
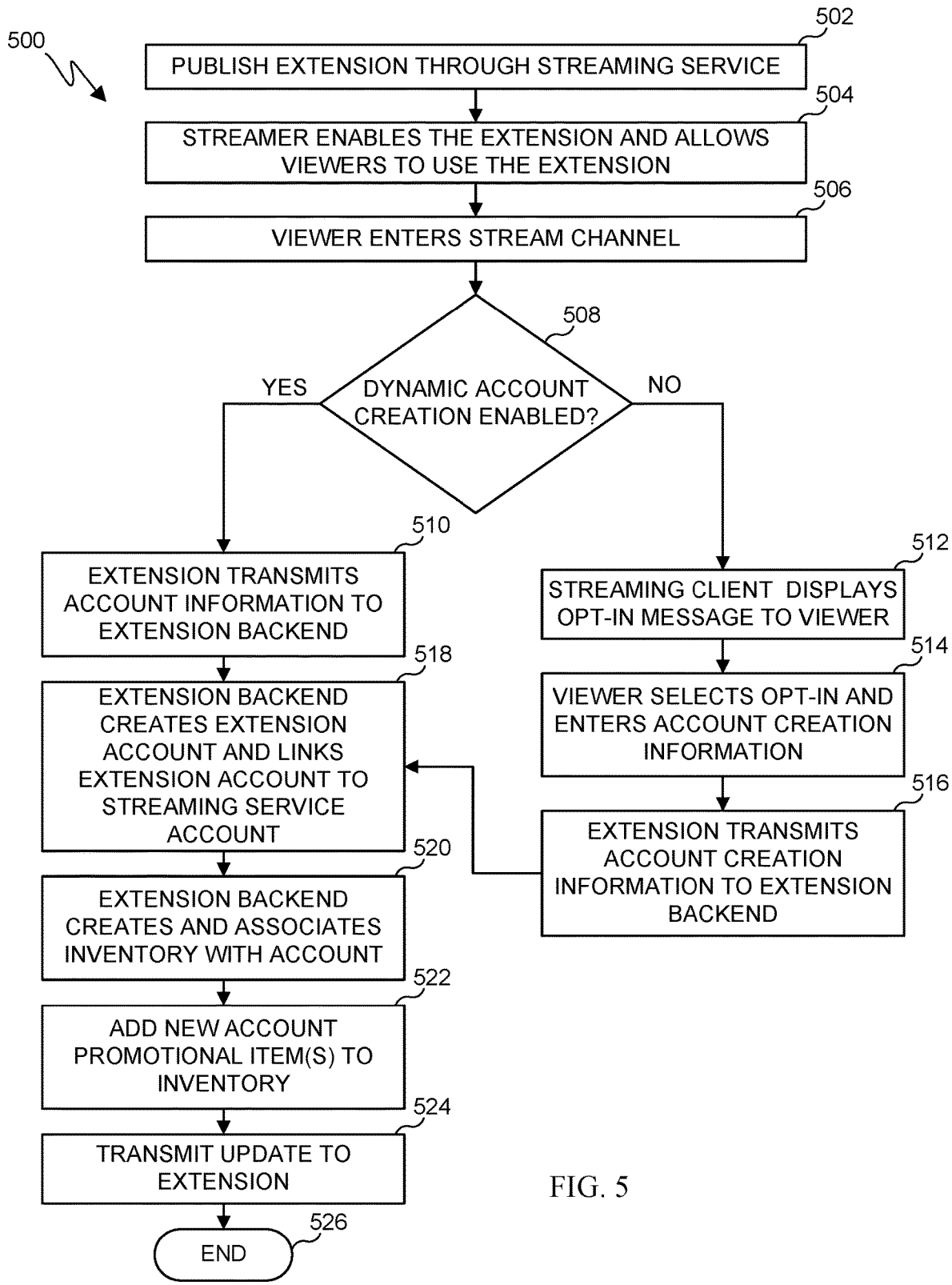
FIG. 5 illustrates a flowchart of a streaming extension enablement and viewer account creation process in accordance with various embodiments of this disclosure.

FIG. 5 illustrates a flowchart of a streaming extension enablement and viewer account creation process 500 in accordance with various embodiments of this disclosure. FIG. 5 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 500 is described with respect to the processor 120 of any, or a combination, of the streaming service 402, the stream viewer device 404, the extension backend 406, the game server 408, or one of the one or more game clients 410. However, the process 500 can be used with any other suitable device(s) and in any suitable system.

At block 502, a streaming extension is published through a streaming service 402. In some embodiments, the streaming extension, such as extension 414 described with respect to FIG. 4, is published through the streaming service 402 as an additional component or feature of the streaming service 402. For example, if the extension 414 is published through the streaming service 402, viewers using a streaming client 412 can be offered use of the streaming extension 414 and use of the extension 414 is then enabled or the extension 414 is installed via the streaming client 412. In some embodiments, the streaming extension 414 is a standalone application that is offered separately from the streaming client 412 and runs concurrently with the streaming client 412 to provide the extended functions described in this disclosure. At block 504, a streamer enables the extension 414 and allows viewers of the streamer or the streamer's channel to use the extension 414. Enablement of the extension 414 provides that the streamer is choosing to use the functions of the extension 414 such as voting, stats, rewards, viewer game interactions, and other extension functions, and intends to stream games that support viewer game interactions.

At block 506, a viewer enters the streaming channel on which the extension 414 is enabled. At decision block 508, the extension 414 or the extension backend 406 determines if dynamic account creation is enabled. If so, at block 510, the extension 414 transmits account information to the extension backend 406. The transmitted account information can include the viewer's streaming service account information, personal information used for activating an extension account, and other information. If at decision block 508 the extension 414 or the extension backend 406 determines that dynamic account creation is disabled, at block 512, the streaming client 412 displays an opt-in message to the viewer. At block 514, if the viewer wishes to use the streaming extension 414, the viewer selects the opt-in and enters account creation information, such as personal viewer information, preferences, and an authorization to link the viewer's streaming service account to an extension account. The extension 414 can then be installed on the viewer's device. At block 516, the extension transmits the account creation information to the extension backend 406.

If account creation is enabled, the process 500 moves from block 510 to block 518. If account creation is disabled, the process 500 moves from block 516 to block 518. At block 518, the extension backend 406 creates an extension account and links the extension account to the viewer's streaming service account. At block 520, the extension backend 406 creates an inventory and associates the inventory with the viewer's account. At block 522, the extension backend 406 can add one or more items to the newly-created inventory as a promotional tool for new accounts to encourage the viewer to try the item selection and viewer interactions process, and to incentivize the viewer to earn more rewards. At block 524, the extension backend 406 transmits an update to the extension 414 at the viewer's device to update the extension 414 to show the new account activation, update the inventory to reflect the promotional items, and to optionally provide an instructional message to the viewer on how to use items and earn more rewards. The process 500 ends at block 526.

Figure 6:
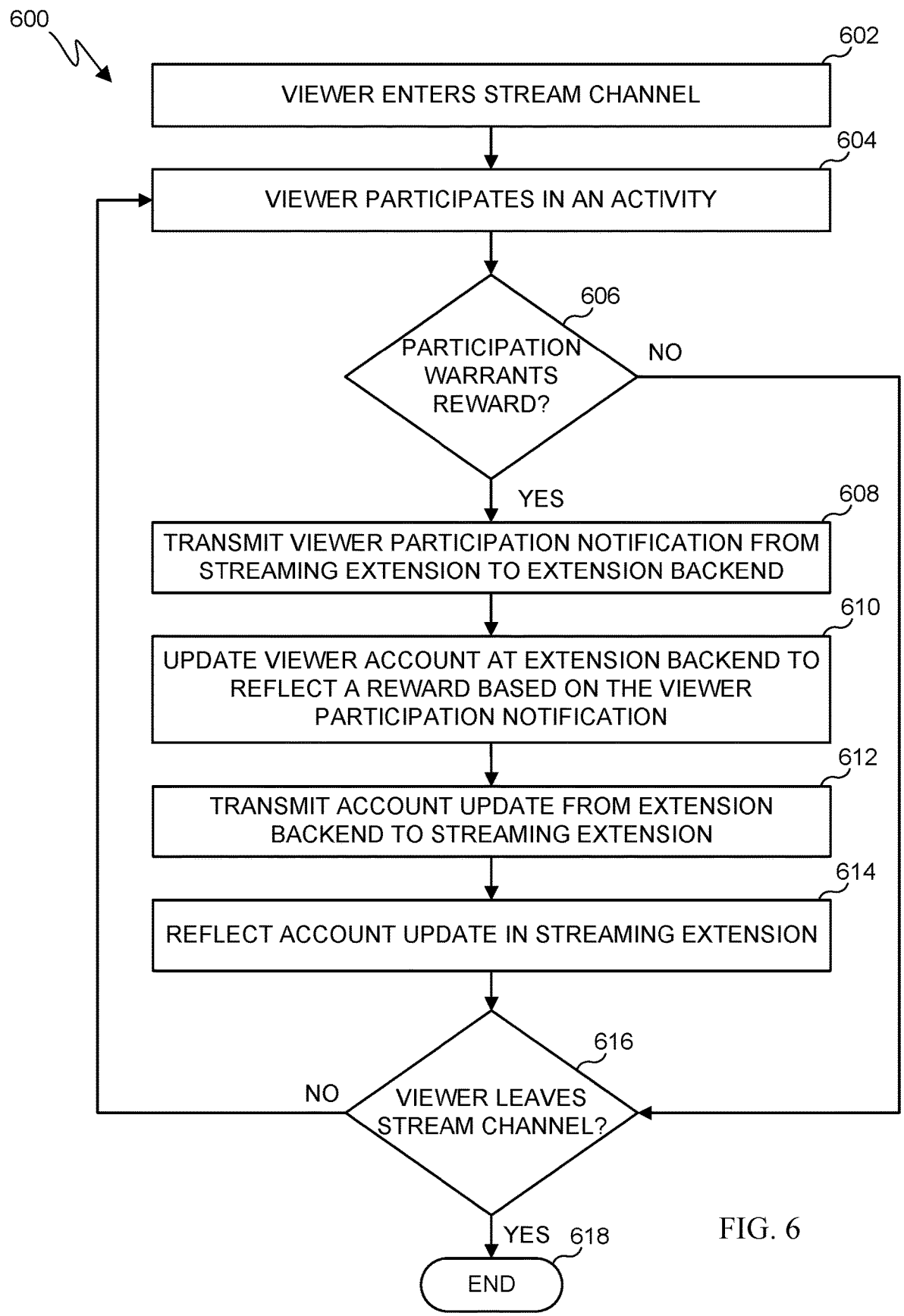
FIG. 6 illustrates a flowchart of a viewer rewards process in accordance with various embodiments of this disclosure.

FIG. 6 illustrates a flowchart of a viewer rewards process 600 in accordance with various embodiments of this disclosure. FIG. 6 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 600 is described with respect to the processor 120 of any, or a combination, of the streaming service 402, the stream viewer device 404, the extension backend 406, the game server 408, or one of the one or more game clients 410. However, the process 600 can be used with any other suitable device(s) and in any suitable system.

At block 602, a viewer enters a stream channel. At block 604, the viewer participates in an activity using the extension 414. Activities can include viewer voting, such as if the streamer asks for viewers to vote on options for the streamer to perform in-game, an amount of time the viewer is in the stream, viewer chat participation, the viewer choosing to follow or subscribe to the streamer or streaming channel, or other activities. At decision block 606, the extension 414 determines if the viewer activity warrants one or more rewards. For example, if the viewer participates in chatting with the streamer or other viewers using a text-based chat feature of the streaming client 412, the extension 414 can determine whether the viewer's chat activity warrants a reward, such as if the number of submitted text-based chats by the viewer passes a threshold, or if the text-based chats submitted by the viewer reaches a certain rate of submitted chats over a certain period of time.

As another example, the viewer participating in a vote could trigger a reward, or a number of voting participation events can trigger the reward. The viewer's time spent in the stream, or a viewer's total time spent in the streaming channel across multiple streaming sessions, can also trigger a reward. If the participation does not warrant a reward, such as if a rewards threshold based on the activity has not yet been reached by the viewer, the process 600 moves to decision block 616. At decision block 616, the extension 414 determines if the viewer leaves the stream channel. If so, the process 600 ends at block 618. If not, the process moves back to block 604.

If at decision block 606 the extension 414 determines that the viewer participation warrants a reward, at block 608 the extension 414 transmits a viewer participation notification to the extension backend 406. In some embodiments, a viewer participation notification is transmitted from the extension 414 to the extension backend 406 when a viewer participates in an activity at block 604, and the extension backend 406 determines at decision block 606 whether the participation warrants a reward. At block 610, the extension backend 406 updates the viewer account associated with the viewer who performed the activity so that the viewer account reflects an earned reward. In some embodiments, the reward applied to the viewer's account can be determined by the type of participation (such as time spent in stream, chatting, voting, etc.), a level of participation, such as the amount of time spent in the stream passing more than one set threshold, a number of rewards received, such as providing set rewards based on how many rewards the viewer has already received, or other scenarios.

At block 612, the extension backend 406 transmits an account update to the streaming client extension 414. The account update can include various information such as an account identifier or username of the viewer, the participation that triggered the reward, currency or item information such as text, icons, or other data that represent the reward and an action or actions that can be performed by the currency or item, a message text string and images or graphics for displaying a rewards notification message in the interface 416 of the extension 414, or other information. At block 614, the extension 414 reflects the account update in the streaming extension interface 416, such as by populating the interface 416 with reward items according to the rewards granted to the viewer by the extension backend 406. The process then moves to decision block 616. At decision block 616, the extension 414 determines if the viewer leaves the stream channel. If not, the process moves back to block 604. If so, the process 600 ends at block 618.

The viewer participation message, the account update, or other notifications or messages sent between components, can be a Hypertext Transfer Protocol (HTTP) message, a JavaScript Object Notation (JSON) message, a Binary JSON message, a MessagePack message, or another message type.

Figure 7:
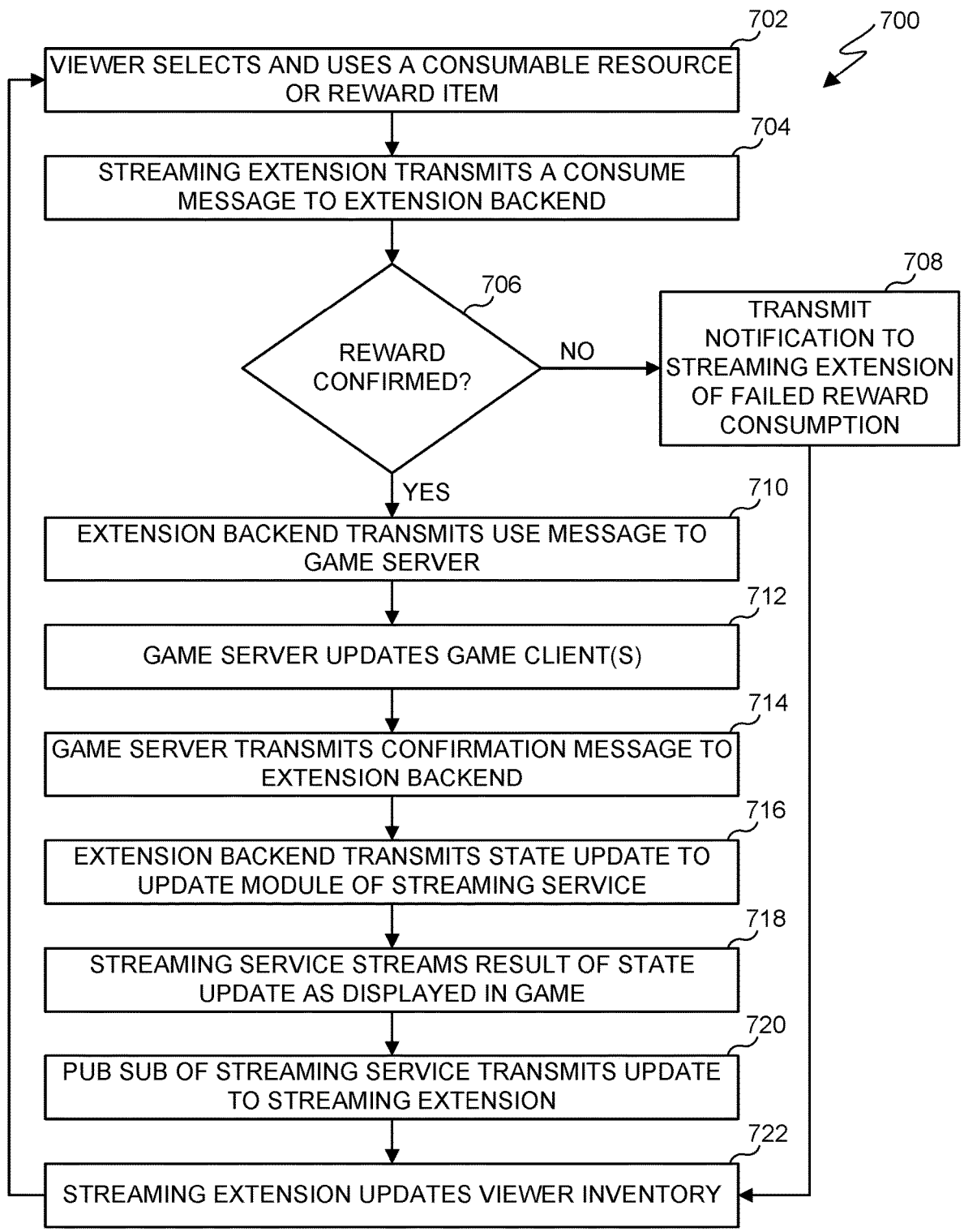
FIG. 7 illustrates a flowchart of a reward consumption process in accordance with various embodiments of this disclosure.

FIG. 7 illustrates a flowchart of a reward consumption process 700 in accordance with various embodiments of this disclosure. FIG. 7 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 700 is described with respect to the processor 120 of any, or a combination, of the streaming service 402, the stream viewer device 404, the extension backend 406, the game server 408, or one of the one or more game clients 410. However, the process 700 can be used with any other suitable device(s) and in any suitable system.

At block 702, the viewer selects and uses a reward item from the streaming client extension interface 416. At block 704, the streaming extension 414 transmits a consume message to the extension backend 406. The consume message includes parameters such as a viewer account identifier, such as an authentication token or username, an action type, a currency or item type, a target player, or other parameters. The account identifier can be included in a header of the consume message. In some embodiments the currency or item type is specific to an action, and the currency or item type is included in the consume message to indicate the action type.

At 706, the extension backend 406 determines if the selected reward is confirmed, such as verifying that the item is still associated with the viewer's account in the database 418. If at decision block 706 the extension backend determines that the reward is not confirmed, the process 700 moves to block 708. At block 708 the extension backend 406 transmits a failed reward consumption notification to the streaming extension 414, and the process 700 moves to block 722. At block 722, the streaming extension 414 updates the inventory of the viewer to remove the item selected by the viewer that was not confirmed to be in the viewer's account by the extension backend 406, and the update is reflected in the interface 416 of the streaming extension 414. The process then moves back to block 702.

If at decision block 706 the extension backend 406 confirms that the selected item is still associated with the viewer's account, the process 700 moves to block 710. At block 710, the extension backend 406 transmits a use message, or action notification message, to the game server 408. The use message notifies the game server 408 of the item or action that the viewer selected via the extension 414. At block 712, the game server 408 updates the one or more game clients 410 with the appropriate action. At block 714, the game server 408 transmits to the extension backend 406 a confirm message confirming that the one or more game clients 410 have been updated with the appropriate action. At block 716, the extension backend 406 transmits a state update message to the update module 420 of the streaming service 402. At block 718, the streaming service 402 streams the result of the state update to as displayed in-game to the viewer's streaming client 412 and other streaming clients 412 connected to the particular stream.

At block 720, the update module 420 passes the state update to the pub/sub module 422 of the streaming service 402, and the pub/sub module 422 transmits an update to the extension 414 to update the extension 414 that the action has been performed, such as by updating the viewer inventory in the interface 416 to reflect that the selected item has been removed from the inventory. It will be understood that, in some embodiments, the streaming service 402 can have a different configuration, in which the extension backend 406 generally sends the state update message to the streaming service 402, and the streaming services transmits the update to the extension 414. In some embodiments, while the streaming service 402 continues to stream video of the gameplay of a game client 410 from a streamer's client to the streaming client 412 of the stream viewer device 404, the extension backend 406 updates the database 418 of the use of the item, deducts the item from the viewer's account, and sends the state update message to the extension 414, reflecting the deduction of the item in the viewer's inventory presented in the interface 416. The process 700 then moves back to block 702 to allow a viewer to select another item.

The consume message, the use message, the confirmation message, the state update, or other notifications or messages sent between components, can be a Hypertext Transfer Protocol (HTTP) message, a JavaScript Object Notation (JSON) message, a Binary JSON message, a MessagePack message, or another message type.

Figure 8:
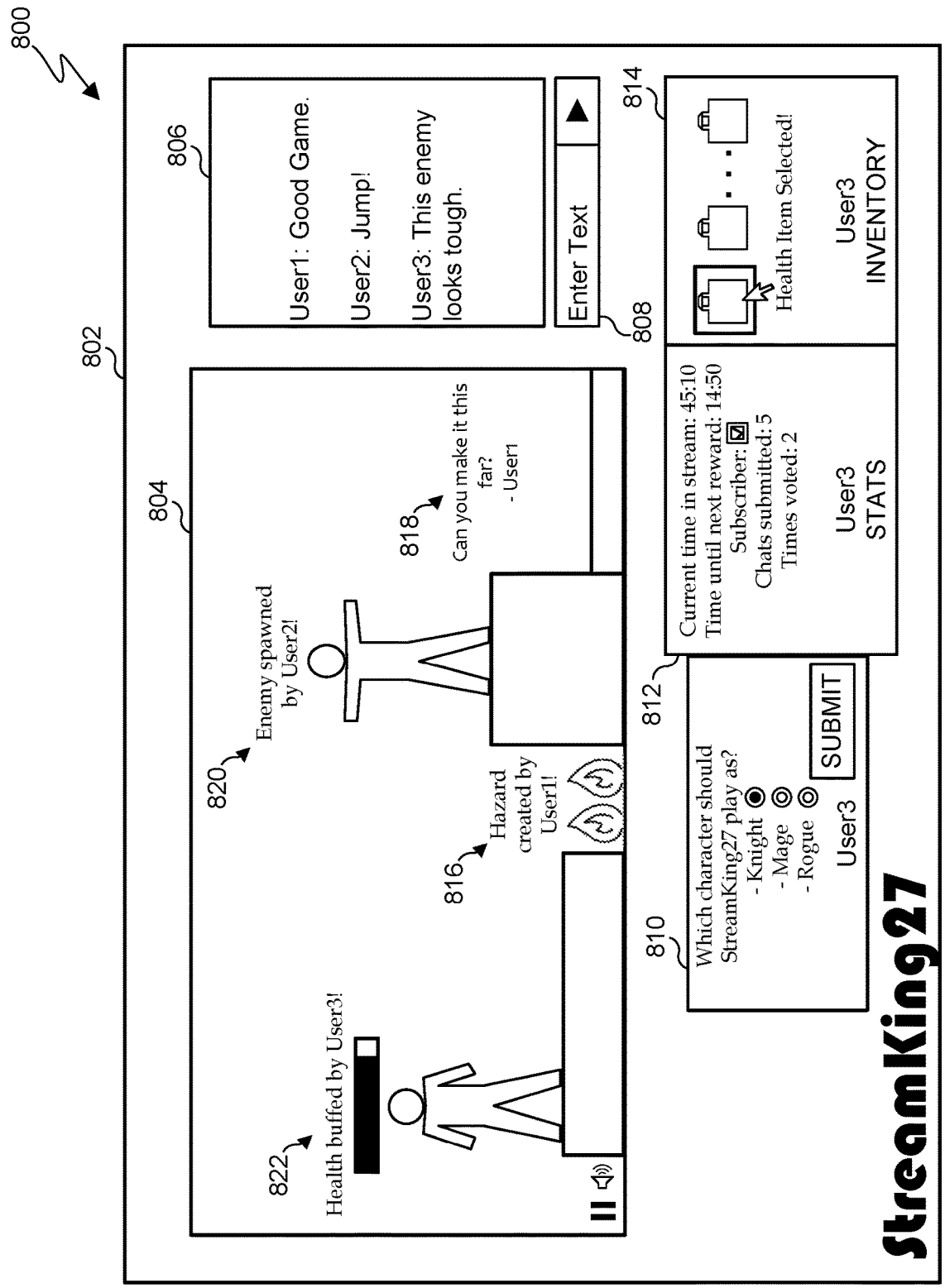
FIG. 8 illustrates an example diagram of a streaming client window including extended functionality in accordance with various embodiments of this disclosure.

FIG. 8 illustrates an example diagram 800 of a streaming client window 802 including extended functionality in accordance with various embodiments of this disclosure. It will be understood that the functionality illustrated in FIG. 8 are merely examples, and other functions and features can be included. The streaming client window 802 can be presented to a viewer by the streaming client 412 on a stream viewer device 404.

As illustrated in FIG. 8, the streaming client window 802 includes a content playback portion 804 that presents to the user streaming content such as a video of game content being played by a streamer streaming the content via the streaming service 402. The content playback portion 804 can include various controls such as controls to pause or play the content, controls to alter the volume level of content playback, or other controls. The streaming client window 802 also includes a chat area 806 that displays text-based chat communications among viewers of the stream, and a text input field 808 configured to accept text input from the viewer to submit as a text-based chat communication for the streamer, the viewer, and other viewers to see and to which the streamer, the viewer, and the other viewers can respond. The streaming client window 802 can also include the streamer's name or identification in a bottom left corner of the streaming client window 802, or elsewhere in the window 802.

As described in this disclosure, the functionality of the streaming client 412 can be extended by executing and running a streaming extension 414. The streaming extension 414 is configured to present to the viewer additional interfaces in the streaming client window 802. The additional interfaces can display information pertaining to the functions of the extension 414, accept viewer inputs to initiate actions, or provide other additional features to the streaming client window 802. The additional interface can be separate windows that can be dragged anywhere on the viewer's device screen, or can be overlays or distinct GUI components of the streaming client window 802. As shown in the example illustrated in FIG. 8, the interface 416 of the streaming client extension 414 can include multiple interface areas. In this example, the extension 414 presents to the viewer a voting interface 810. The voting interface 810 presents to the viewer opportunities to vote on various questions or actions of the streamer as part of the streamer engaging the viewers in the stream and in communities that develop around particular streamers or streaming channels. For example, as illustrated in FIG. 8, the voting interface 810 can present to viewers a voting opportunity concerning the character or type of character viewers think the streamer should play as in the game being streamed to the viewers.

The voting interface 810 can include GUI elements for selecting the viewer's voting choice, such as radio buttons, as illustrated in the example in FIG. 8, check boxes, text entry fields, selectable text or images, or other elements for selecting a voting choice. As described in this disclosure, voting can be considered viewer participation by the extension 414 and the extension backend 406 and viewer rewards can be provided accordingly.

As shown in the example illustrated in FIG. 8, the extension 414 can present to the viewer a viewer statistics interface 812. The viewer statistics interface 812 includes various statistics related to the viewer, such as a current amount of time the viewer has been viewing the stream, an amount of time until the viewer receives another reward for viewing the stream, whether the viewer is subscribed to the streaming channel, a number of chats submitted, a number of times voted, or other statistics. These stats can be shown to the viewer to inform the viewer of upcoming rewards, and incentivize the viewer to continue participating in the streaming channel. For example, as shown in FIG. 8, the viewer statistics interface 812 displays a current time in the stream at 45 minutes and 10 seconds, and displays that the viewer will received another reward if the viewer continues to view the stream for another 14 minutes and 50 seconds. It will be understood that other statistics can be shown in a similar manner as this example, such as showing a number of chats or votes to submit to receive another reward.

The streaming client extension 414 also displays to the viewer a rewards interface 814 in the streaming client window 802. The rewards interface 814 displays the viewer's current rewards that can be used to activate actions that affect elements of the streaming client, such as allowing for special chat text, images, or graphics to be submitted in the chat area 806, playing particular audio sounds that other viewers and/or the streamer can hear, or other actions. The rewards displayed in the rewards interface 814 can also be used to activate actions that affect the game state of the game being streamed by the streamer or streaming channel, and that can be viewed in the content playback portion 804 of the streaming client window 802. These items can be currency that is spent on certain actions, or can be distinct items with different icons and/or names pertaining to the effect of the action. For example, an item that adds a hazard to an environment can have a warning symbol icon, or an environmental effect icon like a fire icon, a lightning bolt icon, or other icons. As another example, an item that buffs the health of a character in the game could have a medical cross icon.

FIG. 8 illustrates example actions that affect the game state of the game. It will be understood that these actions are examples of the types of actions that can be performed, but are not exhaustive or exclusive of other actions that can be performed. The system and methods of this disclosure allow for actions to affect any aspect of the game state, depending on the game, such as the genre of the game, and depending on which actions the developers or publishers of the game include.

As one example, and as illustrated in FIG. 8, a viewer can select items displayed in the rewards interface 814. In the example of FIG. 8, the effects of actions of three different viewers on the game-state are shown in the streaming client window 802. The streaming client window 802 shown in FIG. 8 is that of a viewer with an identifier of "User3." User3 is able to see the effects on the game state of the actions of other viewers in the content playback portion 804 of the streaming client window 802. For example, a viewer with an identifier of "User1" uses an action for creating a hazard, and a hazard 816 is created in an area of the game environment. In some embodiments, a message is displayed in the game environment indicating that the hazard 816 was created by the viewer, User1. User1 also uses an action to display a message 818 in an area of the game environment. The message 818 can be one of a plurality of pre-set messages that User1 selects from, or can be a custom message entered by User1 in the rewards interface 814, such as a text field. In some embodiments, the hazard 816 and the message 818, or other action types, triggered by the items and actions, are configured to be applied to particular areas of the game environment. In some embodiments, the viewer initiating the actions can choose locations in the game environment to place the hazard 816 or the message 818, or other action types.

The example shown in FIG. 8 also illustrates that a viewer with an identifier of "User2" uses an action for spawning an enemy in the game environment, which spawns an enemy 820, as viewed by User3 in the content playback portion 804 of the streaming client window 802. In this example, a message is displayed indicating that User2 spawned the enemy 820. In some embodiments, the enemy 820, or other action effects, triggered by the items and actions are configured to be applied to particular areas of the game environment. In some embodiments, the viewer initiating the actions can choose locations in the game environment to place the enemy 820, or other action types.

The example shown in FIG. 8 also illustrates that the viewer, User3, selects a health item in the rewards interface 814. The input of the selection of the health item by User3 can be carried out differently based on the hardware of the device running the streaming client, such as a mouse click on a personal computer device, or a touchscreen input on a smartphone device or other device that includes a touchscreen. Upon selecting the item, the rewards interface 814 of the streaming client extension 414 can ask the viewer to confirm the selection and use of the item. In response to User3 using the health item, an action is initiated for increasing or buffing the health of the player's, or the streamer's, avatar in the game. As described in this disclosure, various messages are sent between the streaming client 412 and/or the streaming client extension 414 running on User3's device and the extension backend 406. Messages can also be sent to a game server that is in a bidirectional communication link with the game client 410, the content of which is being streamed to User3's streaming client 412, or to the game client 410 directly, to update the game state with the selected action.

The game state update causes a health buff 822 to be applied to the health of the player's avatar. A visual indicator of the health buff 822 can be shown in the game environment, along with a message that User3 buffed the player avatar's health. As illustrated in FIG. 8, a video stream of the displayed game state continues to be streamed from the streamer's or player's streaming client to streaming clients 412 of the viewers currently in the stream, and the viewers of the stream are presented with the visual indicator of the health buff and the associated message, along with the rest of the currently visible game state, as if the viewers were viewing the player's screen or game client application window. As described in this disclosure, an update to the streaming client extension 414 is sent by the extension backend 406 to the streaming client extension 414, in some embodiments, or from the streaming service 402 in some embodiments. The update to the streaming client extension 414 causes the health item selected and used by User3 to be removed from the rewards interface 814. In some embodiments, the update to the streaming client extension 414 causes a number counter for the health item type displayed in the rewards interface 814 to be deducted by one, if there is more than one health item in User3's inventory, or if item types are designed to remain visible, even if there are zero items of that type left in the viewer's inventory.

Figure 9:
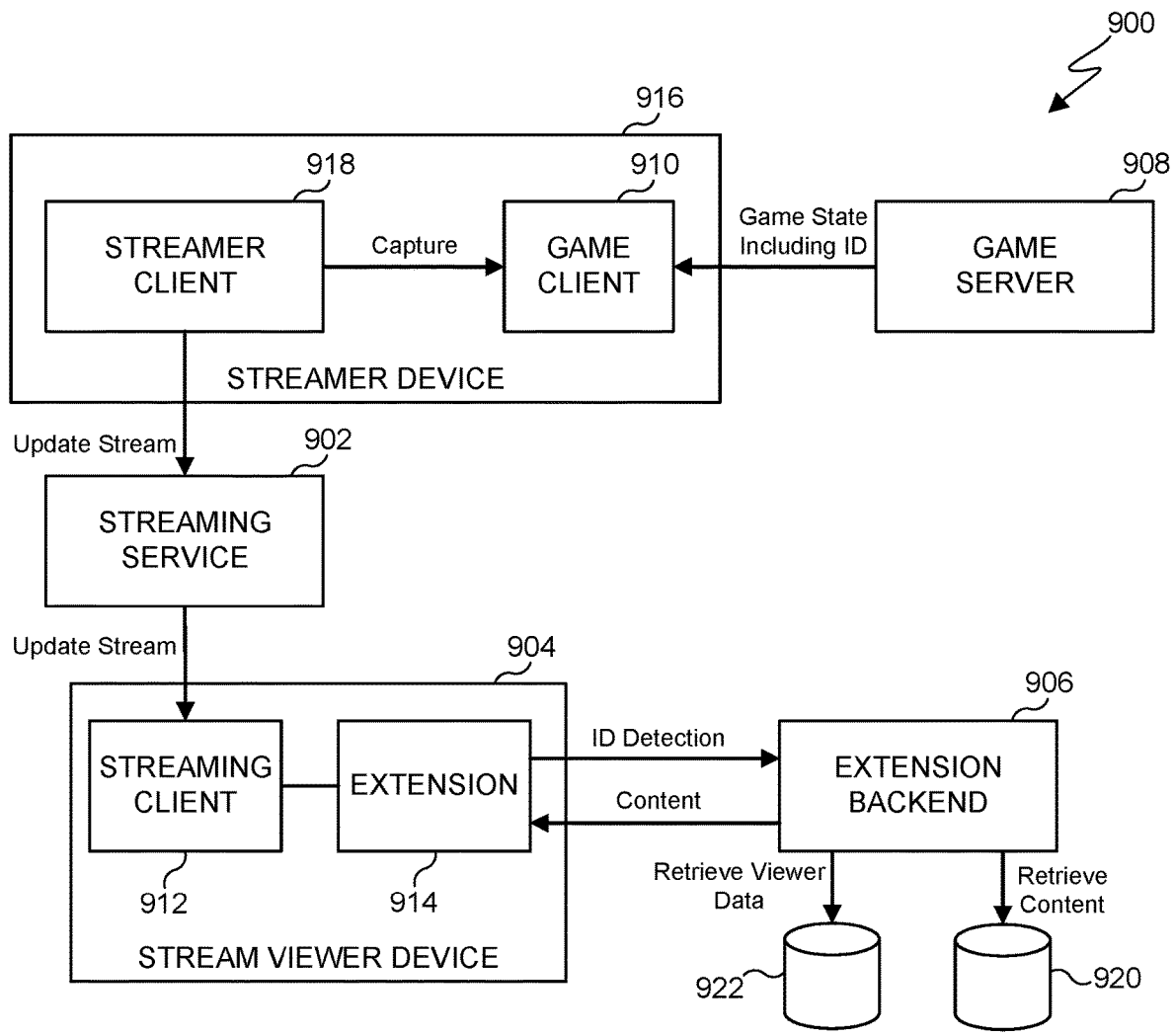
FIG. 9 illustrates an identifier detection and content retrieval system in accordance with various embodiments of this disclosure.

FIG. 9 illustrates an identifier detection and content retrieval system 900 in accordance with various embodiments of this disclosure. The system 900 includes a streaming service 902, a stream viewer device 904, an extension backend 906, a game server 908, and a game client 910. The stream viewer device 904 is illustrated as running thereon a streaming client application 912 and a streaming client extension 914. The streaming service 902, the stream viewer device 904, the extension backend 906, the game server 908, the game client 910, the streaming client application 912, and the streaming client extension 914 can be, in some embodiments, the streaming service 202 or 402, a stream viewer device 204 or the stream viewer device 404, the backend service 206 or the extension backend 406, the game server 208 or 408, one of the one or more game clients 210 or 410, the streaming client application 412, and the streaming client extension 414, respectively.

The extension 914 is an application or other executable that runs in connection with the streaming client application 912, and provides additional functionality to the streaming client application 912. The game client 910 can be running on a streamer device 916. The streamer device 916 also runs a streamer client 918. In some embodiments, the streamer client 918 can be the same application as the streaming client 912, and is in a streaming mode rather than a viewer mode. In some embodiments, the streamer client 918 can also be running an extension such as extension 914. The stream viewer device 904, the game server 908, the streamer device 916, and devices running the streaming service 902 and the extension backend 906, can include the same components 110-180 of the electronic device 101 illustrated in FIG. 1.

The system 900 is configured to detect identifiers included within a game environment of the game running in the game client 910, from images of the game environment streamed to viewers of the stream using the streaming service 902. The identifier detection can be a functionality included within the extension 914. Upon detection of an identifier in the game environment by the extension 914, the detected identifier is transmitted to the extension backend 906, and the extension backend 906 provides additional content to the extension 914 to be presented to a user of the stream viewer device 904 through the extension 914 and/or the streaming client application 912. For example, the extension 914 can scan and detect an identifier placed on a building in the game environment when an image of the game environment including the building is streamed to the stream viewer device 904. The identifier corresponds to data stored on the stream viewer device 904 in association with the extension 914 and/or on the extension backend 906, the data including parameters such as dimensions for displaying image content at the location of the detected identifier. In some embodiments, such data can be encoded in the identifier itself. The viewer would therefore see the image content displayed on the building in the game environment.

In some embodiments, each viewer of the streaming game may see different image content, and in some embodiments each viewer may see the same image content. The extension 914 can scan for an identifier at particular intervals to limit the resources used to continuously scan the image of the game environment. In game environments that include a static arena or other static or slowly changing game environment, scanning at particular intervals can be implemented. For game environments that change quickly, such as action game or first-person shooter games, the extension 914 can scan the images of the game environments at frequent intervals to frequently update the location of the image content based on the detected location of the identifier at each interval. In some embodiments, a separate content window to display the content can be presented by the extension 914 in a window of, or separate from, the streaming client 912, such as if a particular game includes movement that is too quick, or upon the extension determining that the location of the identifier in the streaming video of the game environment is shifting too frequently.

As illustrated in FIG. 9, the game server 908 updates the game state of the game client 910, the update including a game environment that includes the identifier. In some embodiments, the game client may not communicate with a game server, and the game environments include identifiers at specific locations as part of the game client 910 stored on the streamer device 916. The streamer client 918 running on the streamer device 916 captures or records the content displayed by the game client 910, and streams the captured game content through the streaming service 902 to one or more streaming clients 912 running on one or more stream viewer devices 904. The extension 914 scans the images of the streamed captured game content for identifiers. The identifiers being scanned for by the extension 914 can be known identifiers, or the identifiers can have as part of the identifiers a particular code that signals to the extension 914 that the identifier is one handled by the extension 914.

In some embodiments, the identifier can be a type of matrix barcode, such as a quick response (QR) code or other type of barcode. The barcode is detected by scanning and processing one or more images of the streamed captured game content. The barcode can include information such as a content identifier to identify particular content to be requested from the extension backend 906, dimensions for placing the requested content in the game environment, data and error correction keys, or other information. In some embodiments, the identifier is not visible by streamers, players, or viewers, or may be a detail in the game environment that is inconspicuous to streamers, players, or viewers, but can still be detected by image processing techniques performed by the extension 914.

In response to detecting an identifier in the streamed captured game content, the extension 914 transmits an identifier detection message to the extension backend 906. The identifier detection message can include any data retrieved from the identifier, such as a content identifier or dimensions, and can also include other data such as viewer information. In response to receiving the identifier detection message, the extension backend 906 retrieves content from a data store 920 stored on, or in connection with, the extension backend 906. The content can include image content such as a single image or a video, which may or may not have associated audio. In some embodiments, the content to be retrieved from the data store 920 is determined based on a content identifier included in the identifier detected in the game environment. In some embodiments, the content to be retrieved is determined in accordance with preferences or other data of the viewer. For example, in some embodiments, the viewer provides preferences for the types of content the viewer is interested in, and/or data pertaining to viewer preferences is tracked, such as by tracking viewer searches performed in search engines, streams the viewer frequents, items the viewer purchases online, websites visited, or other tracked preferences or activity. In some embodiments, the extension 914 and extension backend 906 actively track viewer activities, and in some embodiments viewer preferences and activities are retrieved from outside sources.

If the content to be retrieved is determined based on viewer preferences or activity, the extension backend 906 retrieves viewer preferences or activity from a data store 922 stored on, or in connection with, the extension backend 906. Based on the retrieved viewer preferences or activities, the extension backend 906 retrieves content from the data store 920 corresponding to those preferences or activities. For example, if the viewer preferences include that the viewer is a fan of a certain movie or television show, the extension backend 906 can retrieve a video clip or still image from the movie or television show to be presented to the viewer. As another example, if the viewer preferences include that the viewer likes a particular video game, the extension backend 906 can retrieve image or video content pertaining to that video game, such as an advertisement to buy the video game, gameplay or information pertaining to the video game, or suggested other streamers using the streaming service 902 that stream gameplay of the video game. As yet another example, if the viewer preferences include that the viewer is interested in a particular sports team, the extension backend 906 can retrieve content related to that sports team, such as a video advertising an upcoming game, image or video content of particular players, or images or video content of recent news or developments concerning the team.

Once the extension backend 906 retrieves the content, the extension backend transmits the content to the extension 914 on the stream viewer device 904. The transmission can also include other parameters such as a label for the content, links that can be presented to the viewer and clicked to take the viewer to a webpage providing more information concerning the content, display dimensions and locations for placing the content either in the stream of the game environment or at a location of the interface of the streaming client 912 and/or the extension 914, or other parameters. The extension 914 receives the content and displays the content as defined by the parameters. For example, if the parameters provide dimensions and a location for placing the content in the game environment, the extension 914 displays or overlays the content in an area of a content playback portion of the streaming client interface designated by the dimensions. For instance, if the identifier was originally detected at a particular point on a building in the gaming environment, the content can be displayed at that same location on the building, such that the viewer sees the content as if it were displayed on the building in the gaming environment. For example, a video at that location on the building could be played as the viewer continues to view the gameplay streamed from the streamer client 918. In this way, additional content can be pushed to the viewer while the viewer watches a media stream.

Although FIG. 9 illustrates one example of an identifier detection and content retrieval system 900, various changes may be made to FIG. 9. For example, the system 900 could include any number of each component in any suitable arrangement. In general, computing and communication systems come in a wide variety of configurations, and FIG. 9 does not limit the scope of this disclosure to any particular configuration. While FIG. 9 illustrates one operational environment in which various features disclosed in this patent document can be used, these features could be used in any other suitable system.

Figure 10A:
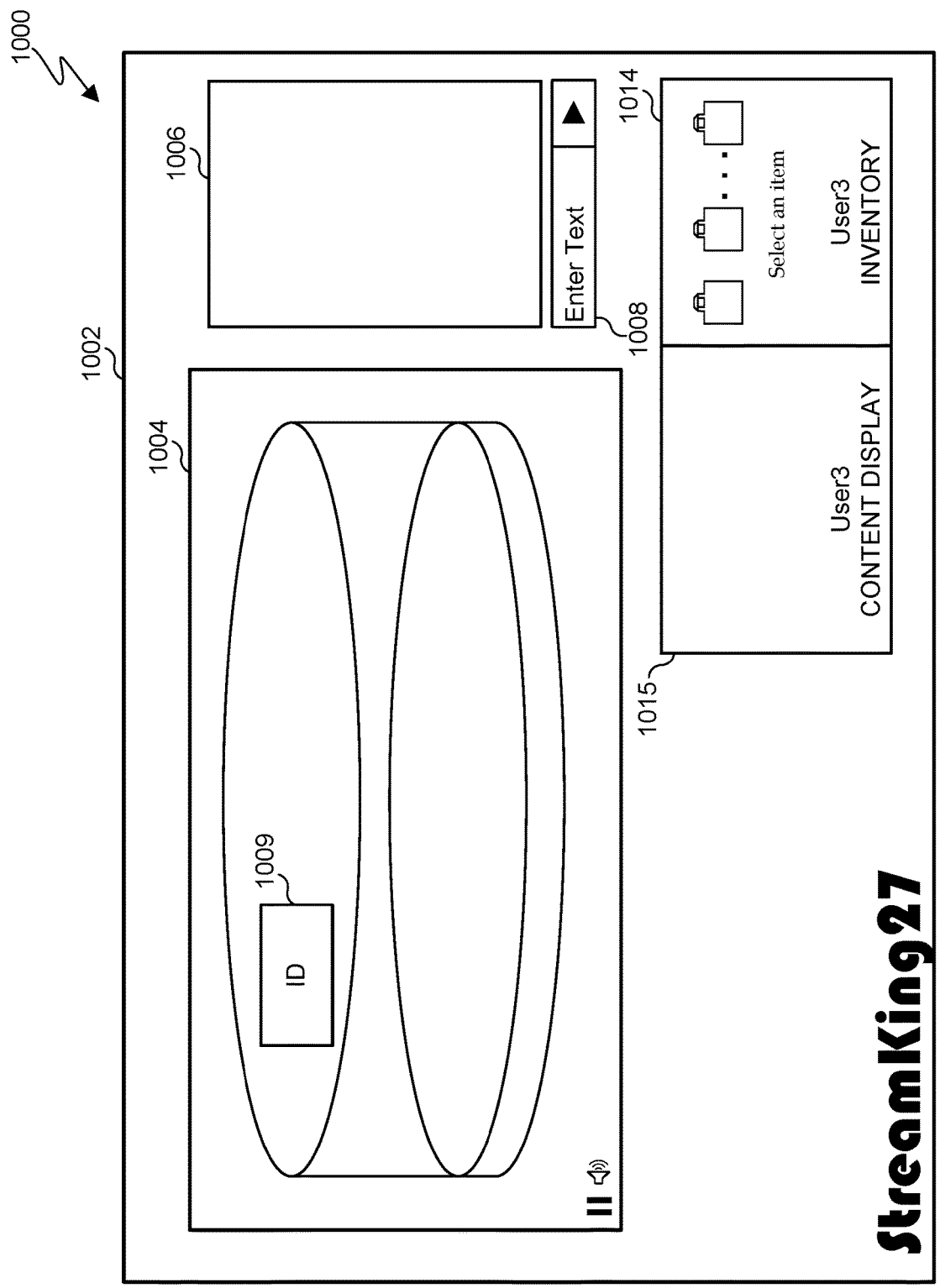
FIGS. 10A and 10B illustrate example diagrams of a streaming client window including extended content display functionality in accordance with various embodiments of this disclosure.
Figure 10B:
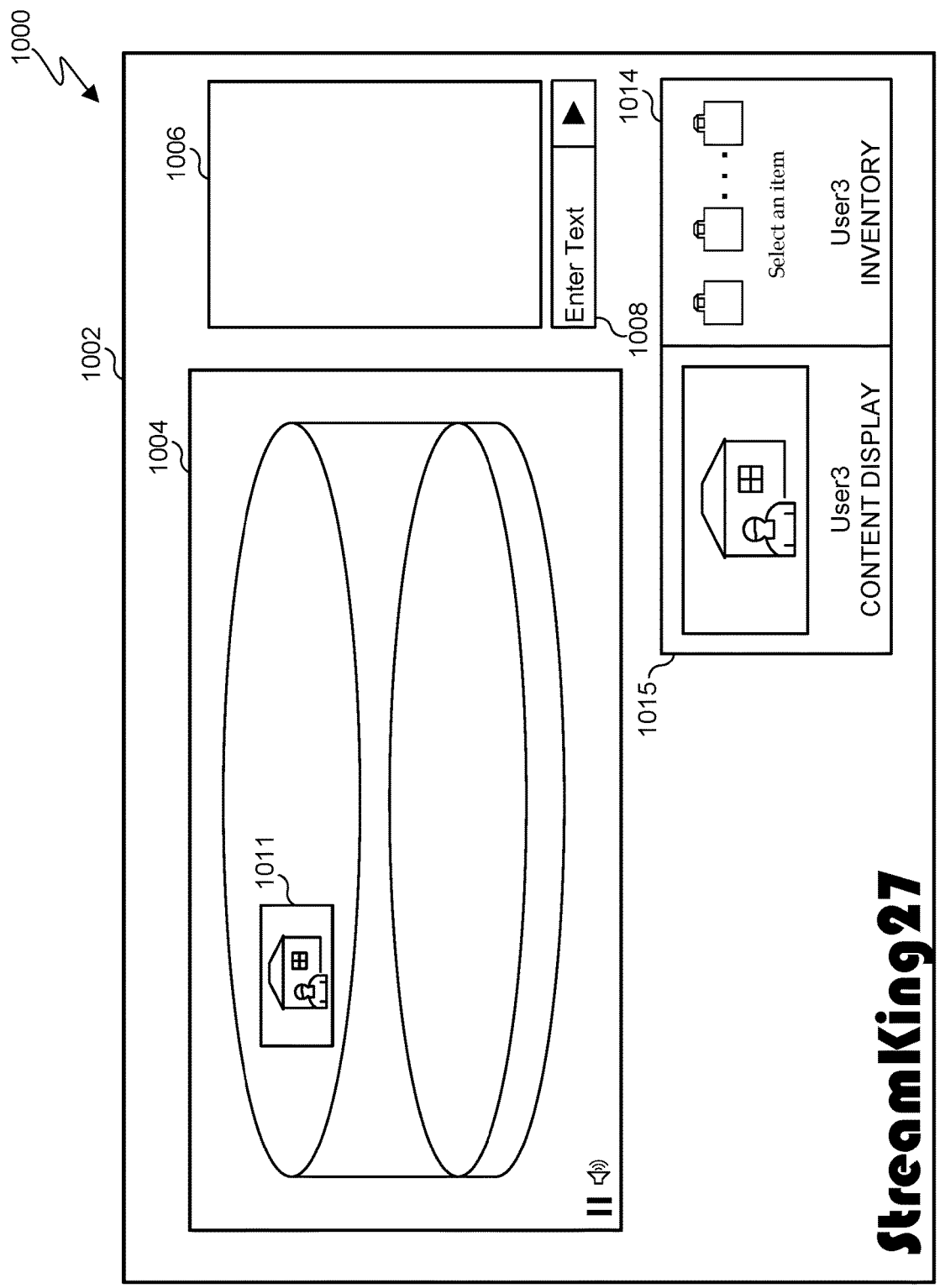

FIGS. 10A and 10B illustrate example diagrams 1000 of a streaming client window 1002 including extended content display functionality in accordance with various embodiments of this disclosure. The streaming client window 1002 can be presented to a viewer by the streaming client 912 on a stream viewer device 904.

As illustrated in FIGS. 10A and 10B, the streaming client window 1002 includes a content playback portion 1004 that presents to the user streaming content such as a video of gameplay from a streamer streaming the content via the streaming service 902. The content playback portion 1004 can include various controls such as controls to pause or play the content, controls to alter the volume level of content playback, or other controls. The streaming client window 1002 also includes a chat area 1006 that displays text-based chat communications among viewers of the stream, and a text input field 1008 configured to accept text input from the viewer to submit as a text-based chat communication for the streamer, the viewer, and other viewers to see and to which the streamer, the viewer, and the other viewers can respond. The streaming client window 1002 can also include the streamer's name or identification in a bottom left corner of the streaming client window 1002, or elsewhere in the window 1002.

As described in this disclosure, the functionality of the streaming client 912 can be extended by executing and running a streaming extension 914. The streaming extension 914 is configured to present to the viewer additional interfaces in the streaming client window 1002. The additional interfaces can display information pertaining to the functions of the extension 914, accept viewer inputs to initiate actions, or provide other additional features to the streaming client window 1002. The additional interface can be separate windows that can be dragged anywhere on the viewer's device screen, or can be overlays or distinct GUI components of the streaming client window 1002. As shown in the example illustrated in FIG. 10, the interface 416 of the streaming client extension 914 can include multiple interface areas, such as a rewards interface 1014 in the streaming client window 1002. The rewards interface 1014 displays the viewer's current rewards that can be used to activate actions that affect elements of the streaming client, such as allowing for special chat text, images, or graphics to be submitted in the chat area 1006, playing particular audio sounds that other viewers or the streamer can hear, or other actions, as described in this disclosure. The rewards displayed in the rewards interface 1014 can also be used to activate actions that affect the game state of the game being streamed by the streamer or streaming channel, and that can be viewed in the content playback portion 1004 of the streaming client window 1002, as described in this disclosure.

As described with respect to FIG. 9, the game environment being streamed can include identifiers that can be scanned by the extension 914 to retrieve and display content based on the scanned identifiers. As illustrated in the example of FIG. 10A, an identifier 1009 is located in the game environment in a top portion of an arena, such as an arena in a sports game, a first-person shooter game, card battle game, or other games. The identifier 1009 can be viewed by the viewer in some embodiments. In some embodiments, the identifier 1009 is not viewable by the viewer, or is viewable but is an inconspicuous detail in the environment, but still detectable by the scanning operation of the extension 914. As described with respect to FIG. 9, the identifier 1009 can be a barcode, such as a QR code, or other scannable item in the environment.

As also described with respect to FIG. 9, upon scanning one or more images of the stream of the gameplay by the extension 914, the extension 914 can transmit the identifier and/or a request for content to the extension backend 906. The extension backend 906 retrieves appropriate content, such as image content relating to a content identified by the identifier, or based on viewer preferences or activity, and transmits the content to the extension 914. As illustrated in FIG. 10B, the content received by the extension 914 from the extension backend 906 is displayed in the content playback portion 1004 of the streaming client window 1002 at a same location 1011 as the identifier 1009 shown in FIG. 10A. The displayed content can be still images, a video with multiple images with or without audio, text, or other content displayed as also described with respect to FIG. 9.

In some embodiments, the streaming client extension 914 can also display a content display interface 1015. As shown in FIG. 10A, when no additional content has been received by the extension 914, the content display interface 1015 can be displayed without content. In some embodiments, the content display interface 1015 can be hidden when no content is available for display. As shown in FIG. 10B, the content display interface 1015 can display received content within the content display interface 1015. In some embodiments, content can be displayed in the content display interface 1015 at the same time as content is displayed at a location in the game environment shown in the content playback portion 1004. In some embodiments, the content display interface 1015 displays the content in situations when the content cannot be displayed, or it is undesirable to display the content. For example, if the gameplay being streamed is fast-paced and locations in the environment appear for only a few seconds, instead of placing the content over the game environment in the content playback portion 1004, the content is displayed in the content display interface 1015.

Figure 11:
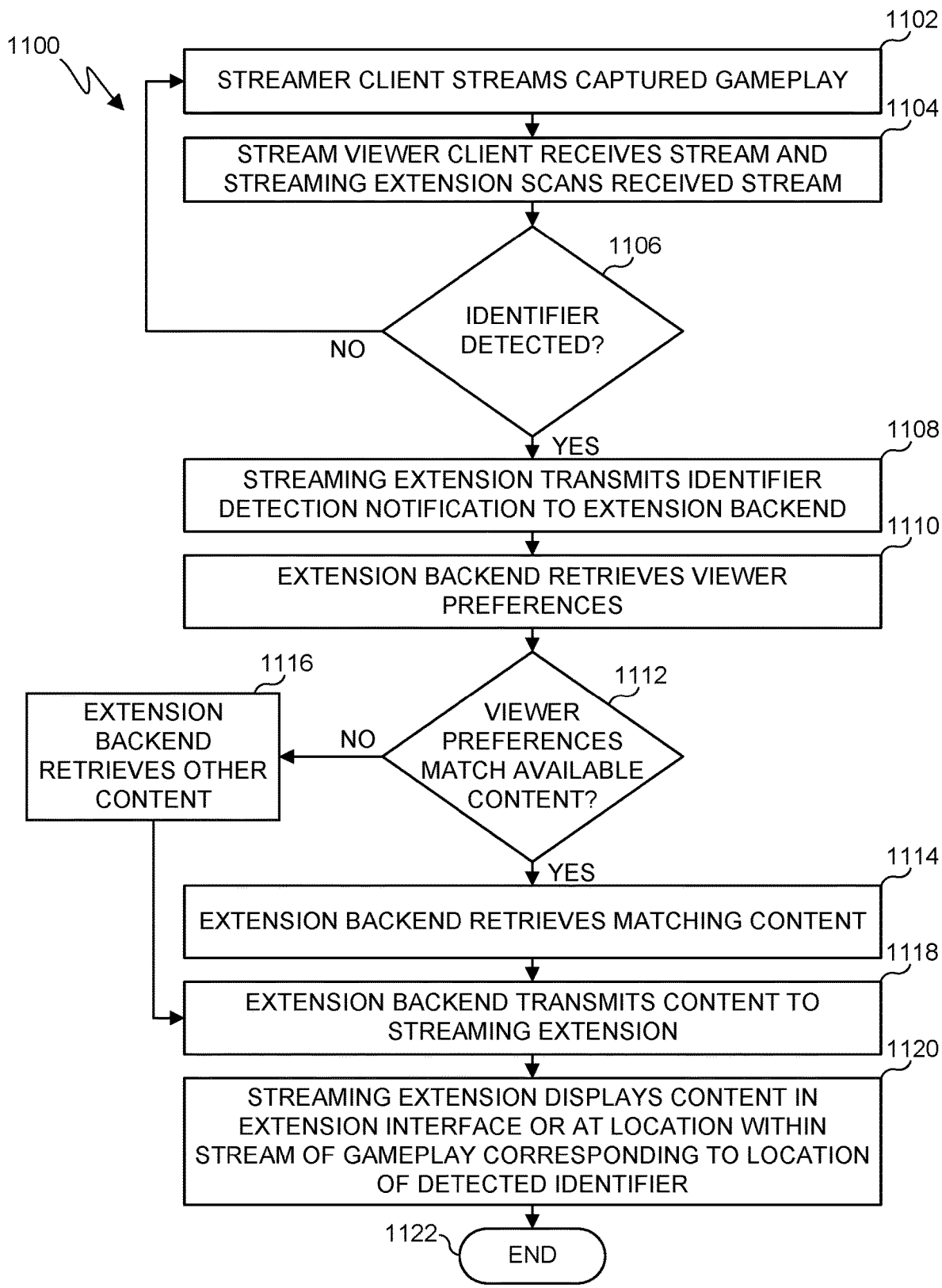
FIG. 11 illustrates a flowchart of an identifier detection and content retrieval process in accordance with various embodiments of this disclosure.

FIG. 11 illustrates a flowchart of an identifier detection and content retrieval process 1100 in accordance with various embodiments of this disclosure. FIG. 11 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 1100 is described with respect to the processor 120 of any, or a combination, of the streaming service 902, the stream viewer device 904, the extension backend 906, the game server 908, the game client 910, or the streamer device 916. However, the process 1100 can be used with any other suitable device(s) and in any suitable system.

At block 1102, the streamer client 918 streams captured gameplay to a streaming client 912. At block 1104, the streaming client 912 receives the streamed captured gameplay and the streaming extension 914 scans one or more images of the received stream for identifiers present in the one or more images. At decision block 1106, the extension 914 determines if an identifier is detected. If not, the process 1100 moves back to block 1102 to continue the streaming process. If so, at block 1108 the extension 914 transmits an identifier detection notification to the extension backend 906. The identifier detection notification can include the detected identifier, a request for particular content based on the detected identifier, personal viewer information, viewer account information, dimensions for content to be displayed, or other parameters.

At block 1108, the extension backend 906 retrieves viewer preferences pertaining the viewer associated with the extension 914 that transmitted the identifier detection notification. At decision block 1112, the extension backend determines if the user preferences match available content. In some embodiments, there can be certain content available to the extension backend 906 that does not encompass all possible viewer preferences. For example, if the viewer preferences include that the viewer is interesting in travel, but there is currently no content pertaining to travel, the extension backend 906 determines that the viewer preferences do not match available content. As another example, if the viewer preferences include that the viewer is interested in the Olympics, and content pertaining to the Olympics is currently available to the extension backend 906, the extension backend 906 determines that the viewer preferences match available content.

If at decision block 1112 the extension backend 906 determines that the viewer preferences match available content, at block 1114 the extension backend retrieves the matching content. The process 1100 then moves to block 1118. If at decision block 1112 the extension backend 906 determines that the viewer preferences do not match available content, at block 1116 the extension backend retrieves other content that is available to the extension backend 906, even if it does not match the viewer preferences. The process 1100 then moves to block 1118. At block 1118, the extension backend 906 transmits the retrieved content to the extension 914 at the stream viewer device 904. At block 1120, the extension 914 displays the content in an interface of the extension, such as the content display interface 1015, or at a location within the game being streamed, wherein the location corresponds to the location of the detected identifier.

The identifier detection notification, the content transmission, or other notifications or messages sent between components, can be a Hypertext Transfer Protocol (HTTP) message, a JavaScript Object Notation (JSON) message, a Binary JSON message, a MessagePack message, or another message type.

Figure 12:
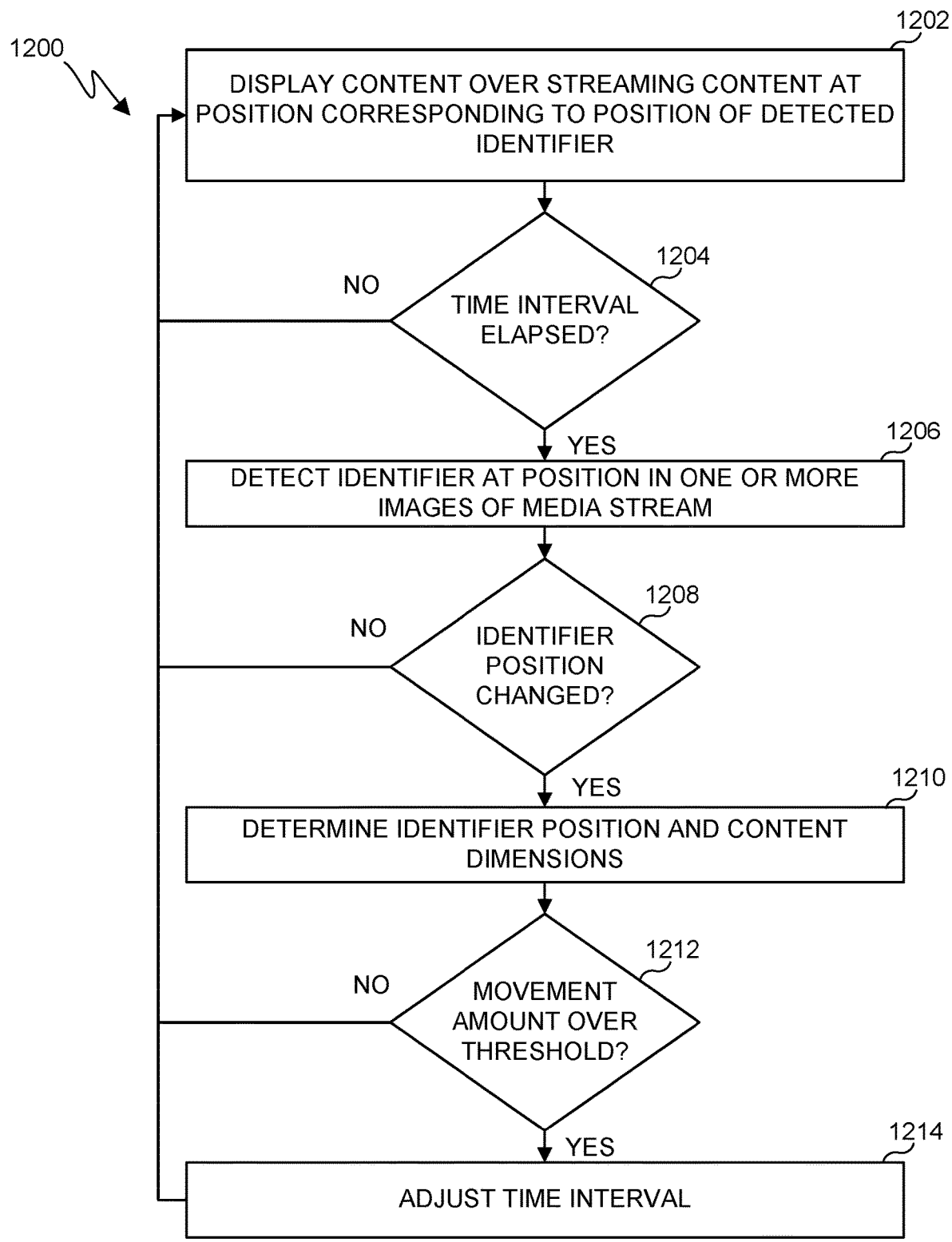
FIG. 12 illustrates a content placement process in accordance with various embodiments of this disclosure.

FIG. 12 illustrates a content placement process 1200 in accordance with various embodiments of this disclosure. FIG. 12 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 1200 is described with respect to the processor 120 of any, or a combination, of the streaming service 902, the stream viewer device 904, the extension backend 906, the game server 908, the game client 910, or the streamer device 916. However, the process 1200 can be used with any other suitable device(s) and in any suitable system. In some embodiments, the process 1200 is performed by the streaming client extension 914.

At block 1202, the processor displays content over streaming content at a position corresponding to a position of a detected identifier. As described with respect to FIGS. 9-11, identifiers in the game environment or other images from a media steam can be used to display content such as image or video content at the location of the detected identifier. In some embodiments, the identifier includes dimensions for the content, while in other embodiments the dimensions are determined based on a size of the current streaming window. For example, if the current stream window is a 1280×720 pixel video window, and the location of the identifier is detected at a pixel index of (580, 120), the processor displays the content over the streaming content window at a pixel index position of (580, 120), this pixel index position serving as the center point for the content.

The processor also determines the dimensions for the content, either provided by information in the detected and scanned identifier, by dimensions of the identifier itself, such as if the identifier is a scannable image having certain dimensions in the one or more images, or determined by the processor based on the streaming window size. For example, if information in the detected and scanned identifier indicates the content should be displayed at a pixel size of 120×80, the processor displays the content at this size over the streaming window at the determined pixel index position as the center point, such that the displayed content extends 60 pixels left and right of the center point, and 40 pixels up and down from the center point.

The processor is configured to detect one or more identifiers in one or more images of the streaming content at certain intervals, in order to move or correct the displayed content if the identifier in the one or more images moves to a different position, such as due to camera movement during gameplay of a video game. For example, the initial time interval can be only several milliseconds for a game that is fast-paced or the scenery changes rapidly, or can be several minutes for a game with little camera movement or few scenery changes. At decision block 1204, the processor determines if the time interval has elapsed. If not, the process 1200 moves back to block 1202 to continue displaying the content. In some embodiments, if the content being displayed over the streaming window expires, such as if the content is a video and the video runtime completes, the processor can request additional content, such as from the extension backend 906, to replace the expired content with the additional content at the same location where the expired content was being displayed.

If at decision block 1204 the processor determines the time interval has elapsed, at block 1206, the processor again detects the identifier at a position in one or more images of the media stream. In some embodiments, if no identifier is detected, the processor can cease displaying content over the streaming window, and the process 1200 can loop back to decision block 1204 to wait for the interval to elapse again before attempting another detection at block 1206. At decision block 1208, the processor determines if the location of the identifier detected at block 1206 changed from a previous detection of an identifier. If not, the process 1200 moves back to block 1202 to continue displaying content at the previous position. If the processor at decision block 1208 determines that the position of the identifier has changed, the process moves to block 1210.

At block 1210, the processor determines the position of the identifier detected at block 1206, and again determines content dimensions for displaying the content. At decision block 1212, the processor determines if movement based on the position change of the identifier is over a threshold. If not, the process 1200 moves back to block 1202 and the processor displays the content at the newly determines position and at the newly determines content dimensions. If at decision block 1212 the processor determines the movement is over the threshold, at block 1214 the processor adjusts the time interval. For example, if the position of the identifier is now detected at an opposite side of the one or more images, the processor can determine this movement is over the threshold, indicating that there is a considerable amount of camera movement or scenery changes in the game environment. The processor can thus at block 1214 adjust the time interval to be a shorter time interval, so that the displayed content is updated more frequently to compensate for the high movement.

In some embodiments, the processor can also determine if the movement is below a low threshold, and can adjust the time interval to be a longer time interval for situations where there is little camera movement or scenery changes. In some embodiments in which the game is one that has no camera movement or scene changes, the steps of adjusting the time interval based on the movement threshold may not be performed. The process 1200 moves from block 1214 to block 1202 and the processor displays the content at the newly determines position and at the newly determines content dimensions. The process 1200 can perform each of blocks 1202-1214 in a loop based on the time interval to continuously update the position of content displayed over the streaming content window.

Figure 13:
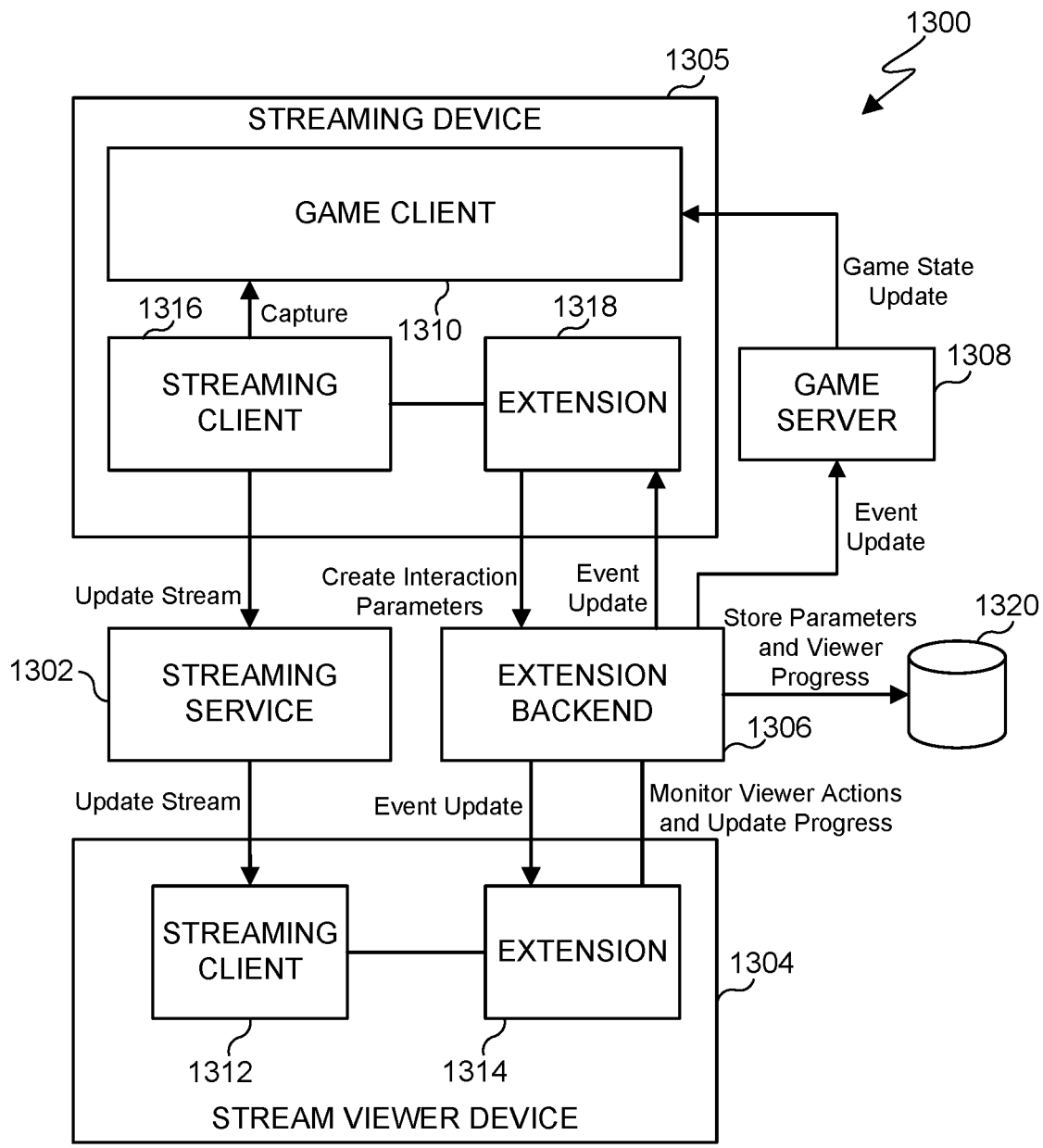
FIG. 13 illustrates a content streaming interaction system in accordance with various embodiments of this disclosure.

FIG. 13 illustrates a content streaming interaction system 1300 in accordance with various embodiments of this disclosure. The system 1300 includes a streaming service 1302, a stream viewer device 1304, a streaming device 1305, an extension backend 1306, and a game server 1308. The stream viewer device 1304 is illustrated as running thereon a streaming client application 1312 and a streaming client extension 1314. The streaming device 1305 is illustrated as running thereon a game client 1310, a streaming client application 1316, and a streaming client extension 1318. The streaming service 1302, the stream viewer device 1304, the extension backend 1306, the game server 1308, the streaming client application 1312, and the streaming client extension 1314 can be, in some embodiments, the streaming service 202, 402, or 902, the stream viewer device 204, 404, or 904, the backend service 206 or the extension backend 406 or 906, the game server 208, 408, or 908, the streaming client application 412 or 912, and the streaming client extension 414 or 914, respectively. In some embodiments, the streaming device 1305, the game client 1310, and the streaming client 1316 can be the streamer device 916, one of the one or more game clients 210, 410, or 910, and the streamer client 918, respectively.

The extension 1314 is an application or other executable that runs on the stream viewer device 1304 in connection with the streaming client application 1312, and provides additional functionality to the streaming client application 1312. The extension 1318 is an application or other executable that runs on the streaming device 1305 in connection with the streaming client application 1316, and provides additional functionality to the streaming client application 1316. In some embodiments, the streaming client 1316 can be the same application or executable as the streaming client 1312, and is in a streaming mode rather than a viewer mode. In some embodiments, the extension application 1318 can be the same application or executable as the extension application 1314, and is in a streaming mode rather than a viewer mode. In some embodiments, the streaming client 1316 can be a different application or executable from the streaming client 1312, and the streaming client 1316 is designed to function for capturing content and streaming the content via the streaming service 1302. In some embodiments, the extension application 1318 can be a different application or executable from the extension application 1314, and the extension application 1318 is designed to function with streaming clients. The stream viewer device 1304, the streaming device 1305, the game server 1308, and devices running the streaming service 1302 and the extension backend 1306, can include the same components 110-180 of the electronic device 101 illustrated in FIG. 1. It will be understood that the system 1300 can include any number of stream viewer devices 1304, streaming devices 1305, or game servers 1308. It will also be understood that the streaming service 1302 and the extension backend 1306 can comprise any number of devices, and can be distributed systems.

The system 1300 is configured to allow for the stream viewer device 1304 and the streaming device 1305 to interact in various ways while the streaming device 1305 streams content via the streaming service 1302 to the stream viewer device 1304. In some embodiments, the interactions are facilitated by the extension applications 1314 and 1318 that are in communication with the extension backend 1306. The extension backend monitors activity of the extension applications 1314 and 1318 to track the states of the extension applications 1314 and 1318. In some embodiments, the extension backend 1306 also receives game state updates from the game server 1308, and can display information regarding the game state in either or both of the extension applications 1314 and 1318, such as player or streamer stats (win/loss rate, play-by-play game feeds, time spent in the game or streaming the game, and other stats). The types of stats that can be displayed by the extension applications 1314 and 1318 can be dependent on the game being played, streamed, and viewed.

As also described in this disclosure, the extension backend 1306 can also monitor the extensions 1314 and 1318 to track interaction activity between the streamer and the viewer, such as voting results, viewer rewards, viewer item inventory and use that affects the game state of the game client 1310, or other interactions. In some embodiments, the extension applications 1314 and 1318 run in conjunction with the streaming client 1312 and the streaming client 1316, respectively, such that users are provided the functionality of the extension applications 1314 and 1316 as part of the streaming client 1312 and the streaming client 1316, such as GUI elements provided by the extension applications 1314 and 1314 being displayed within the streaming client 1312 and the streaming client 1316.

The system 1300 provides that a streamer using a streaming device 1305 can provide various viewer engagement interactions designed to change the nature of a viewer's experience from a passive experience to an active and engaged experience. The system 1300 allows for a streamer to create interaction events that keeps viewers engaged. Interaction events can include, but are not limited to, voting events that can change the outcome of the game based on the result, promotional events such as raffles that reward viewers with prizes when a streaming channel reaches a milestone such as a certain number of subscribers, in-game interactions with the streamer, such a viewer's avatar giving a streamer's avatar a high-five in-game, requests from viewers that can be granted by the streamer to use certain game types, equipment, items, resources, or other content during the game, events or requests that allow the viewer and streamer to enter the game and play together or against one another, and other interactions.

In some embodiments, interaction events can be provided by the extension backend 1306 via the extensions 1314 and 1318, such as default interaction events that are specific to the game associated with the game client 1310 and the game server 1308. In some embodiments, custom interaction events can also be created by a streamer via the extension application 1318. Custom interaction events can be default interaction events that have parameters that are customized by the streamer, or can be unique interaction events created by the streamer. As illustrated in FIG. 13, when a streamer sets up an interaction event, the streamer creates interaction parameters via the extension 1318. The extension 1318 transmits the created interaction parameters to the extension backend 1306, and the extension backend stores the parameters in a database or data store 1320. The extension backend 1306 monitors viewer actions and receives viewer progress updates from the extension 1314 on the stream viewer device 1304 and stores the viewer progress in the data store 1320.

Created interactions can be triggered by various actions as described herein. Depending on the interaction types currently active and available, interaction events can be triggered by actions performed by the viewer, actions performed by the streamer, or in-game actions communicated to the extension backend by the game server 1308. For example, a team-up interaction event in which the streamer and viewer enter and play the game together can be initiated or requested by a viewer. Interaction events such as a voting event can be initiated by a streamer. Interaction events such as end-of-game celebrations in which a viewer's avatar celebrates in-game with a streamer's avatar can be initiated by the game server 1308 when communicating to the extension backend 1306 that an end-of-game state has been reached.

In some embodiments, when an interaction event is triggered, the extension backend 1306 receives an interaction request or update from a device such as the stream viewer device 1304 or streaming device 1305 via the extensions 1314 and 1318, respectively, or from the game server 1308. The extension backend 1306 determines at least one action based on the interaction request and provides an action notification or event update based on the at least one action to one or more devices, such as the stream viewer device 1304 via the extension 1314, the streaming device 1305 via the extension 1318, and/or the game server 1308. The event update notifies the receiving device of the event, so that the receiving device can update a state based on the event. For example, an event update sent to the stream viewer device 1304 via the extension 1314, or to the streaming device 1305 via the extension 1318, can cause the extension 1314 or 1318 to display information, graphics, animations, or other data regarding the event, and provide the viewer or streamer with options for responding to the event. As another example, when an action notification or event update is sent to a content source such as the game server 1308, the event update notifies the content source to update a state of at least one content of the content source, such as updating a game state to reflect the nature of the event.

When the game server 1308 receives an event update, the game server 1308 can transmit a game state update notification to the streaming device 1305 via the game client 1310, wherein the state update notification updates one or more applications of the streaming device 1305 based on the updated state of the at least one content associated with the game server 1308. The streaming client 1316 captures the updated game state of the game client 1310 and transmits an updated stream via the streaming service 1302 to the stream viewer device 1304. It will be understood that the operation of the streaming client 1316 is such that the streaming client 1316 continuously captures images of content being displayed by the game client 1310, such that when the game state of the game client 1310 is updated by the game server 1308, images of the content of the game client 1310 showing the update is captured by the streaming client and streamed via the streaming service 1302 to one or more streaming clients 1312 of streaming viewer devices 1304 connected to the stream or streaming channel.

Although FIG. 13 illustrates one example of content streaming interaction system, various changes may be made to FIG. 13. For example, the system 1300 could include any number of each component in any suitable arrangement. Also, for example, the extension backend 1306 can be in communication with the game client 1310 directly, without communicating with a game server 1308, such as when a game being streamed is not configured to receive updates from a game server, such as an offline or single player game. In general, computing and communication systems come in a wide variety of configurations, and FIG. 13 does not limit the scope of this disclosure to any particular configuration. While FIG. 13 illustrates one operational environment in which various features disclosed in this patent document can be used, these features could be used in any other suitable system.

Figure 14:
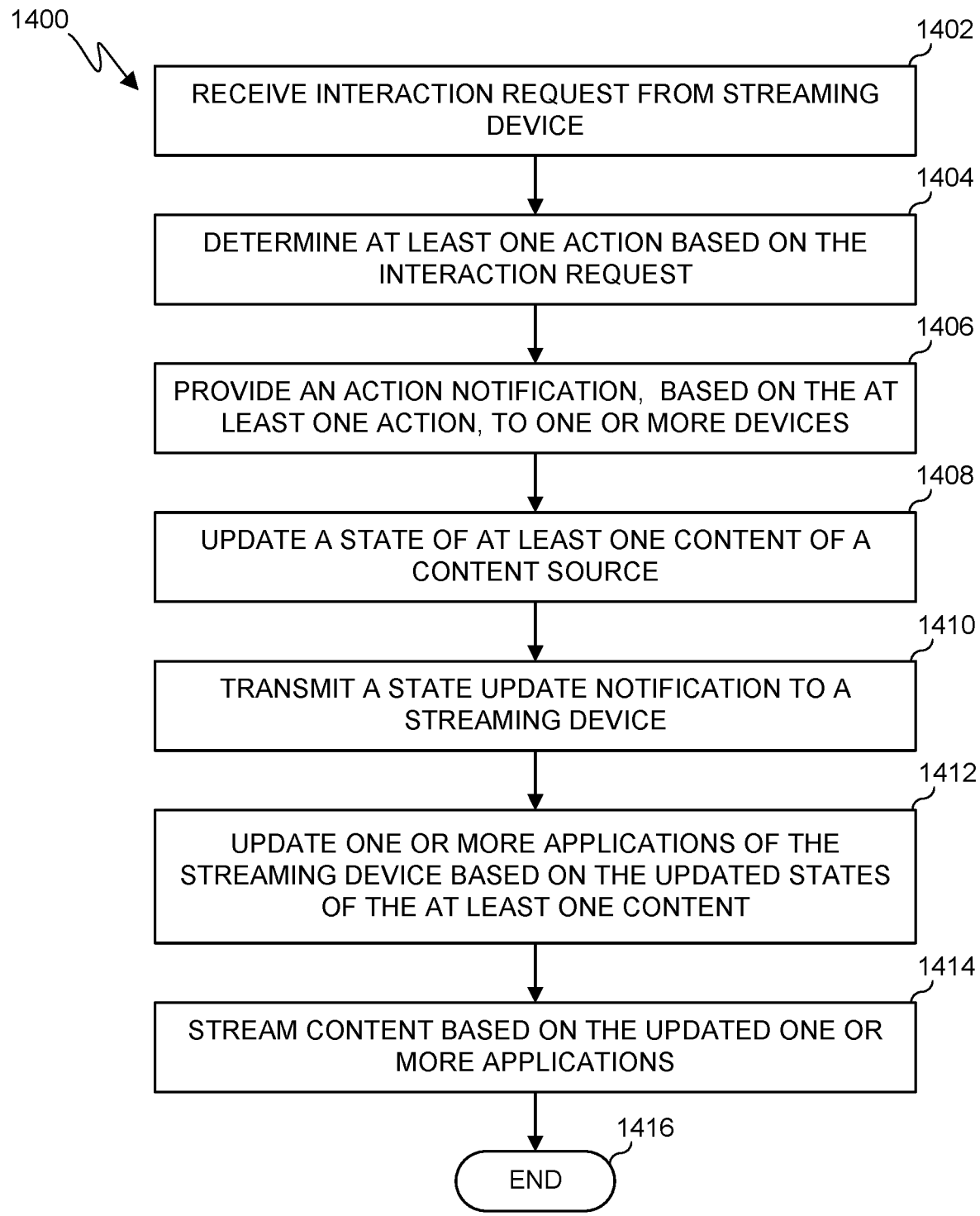
FIG. 14 illustrates a content streaming interaction process in accordance with various embodiments of this disclosure.

FIG. 14 illustrates a content streaming interaction process 1400 in accordance with various embodiments of this disclosure. FIG. 14 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 1400 is described with respect to the processor 120 of any, or a combination, of the streaming service 1302, the stream viewer device 1304, the extension backend 1306, the game server 1308, or the streaming device 1305. However, the process 1400 can be used with any other suitable device(s) and in any suitable system. In some embodiments, the process 1400 is performed by one of or both of the streaming client extensions 1314 and 1318.

At block 1402 the processor receives an interaction request or update from a device such as a stream viewer device or a streaming device. At block 1404, the processor determines at least one action based on the interaction request. At block 1406, the processor provides an action notification or event update based on the at least one action to one or more devices, such as a stream viewer device, a streaming device, and/or a game server or game client. The action notification notifies the receiving device of the event, so that, at block 1408, the receiving device can update a state based on the event. For example, an event update sent to a stream viewer device, or to a streaming device, can cause the display of information, graphics, animations, or other data regarding the event, and provide the viewer or streamer with options for responding to the event. As another example, when an action notification or event update is sent to a content source such as a game server or game client, the event update notifies the content source to update a state of at least one content of the content source, such as updating a game state to reflect the nature of the event.

At block 1410, the processor transmits a game state update notification to a streaming device, and, at block 1412 the state update notification is used to update one or more applications of the streaming device based on the updated state of the at least one content associated with the game server. At block 1414, content is streamed based on the updated one or more applications, such as streaming content, via a streaming client, from a game client that has been updated by the state update notification. In some embodiments, the streaming client captures the updated state of the one or more applications and transmits an updated stream via a streaming service to one or more stream viewer devices. It will be understood that the operation of the streaming client is such that the streaming client continuously captures images of content being displayed by one or more applications, such that when the state of the one or more applications is updated, images of the content of the one or more applications showing the update is captured by the streaming client and streamed via the streaming service to one or more streaming clients of streaming viewer devices connected to the stream or streaming channel.

Figure 15A:
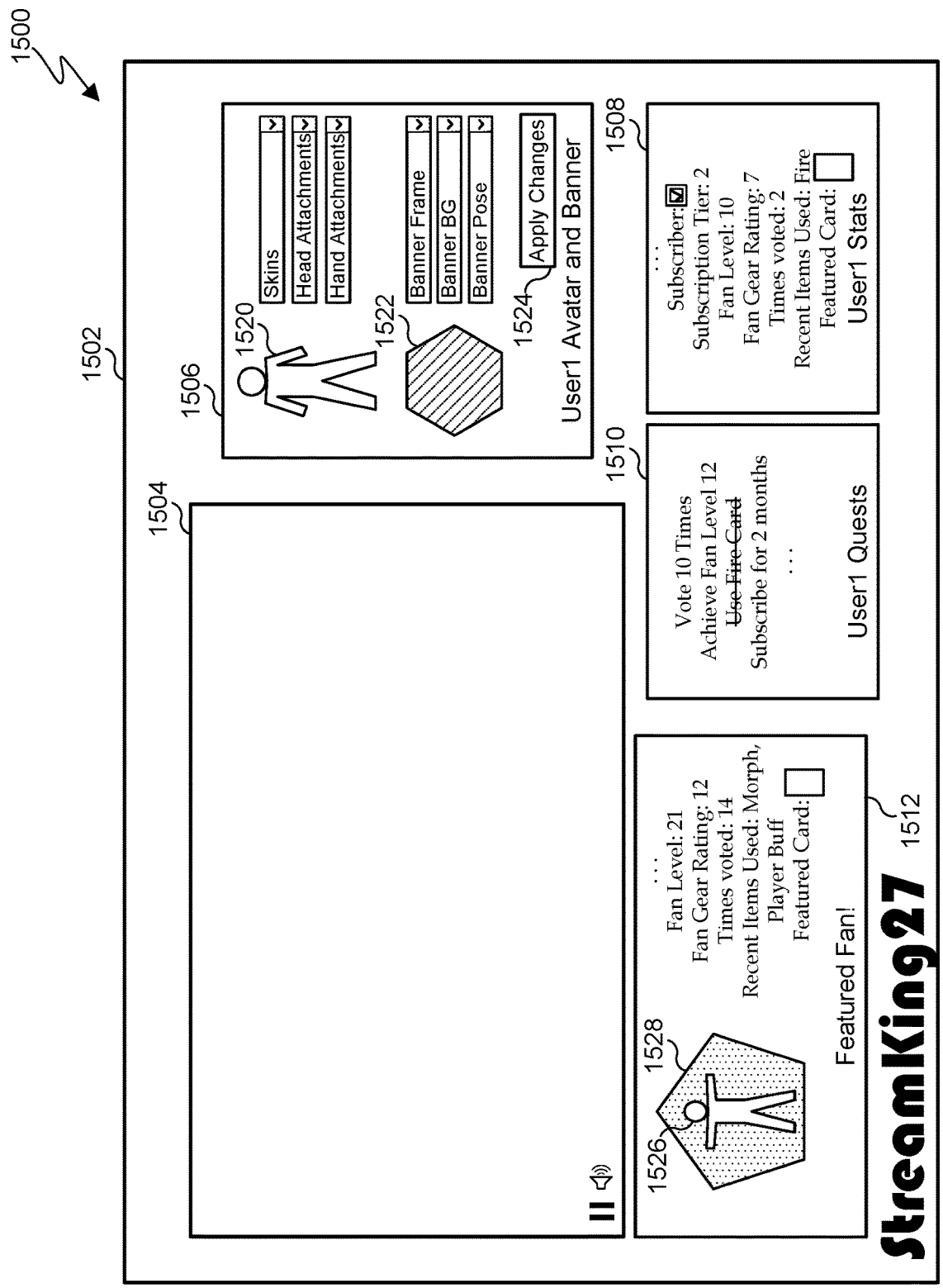
FIGS. 15A and 15B illustrate example diagrams of a streaming client window in accordance with various embodiments of this disclosure.
Figure 15B:
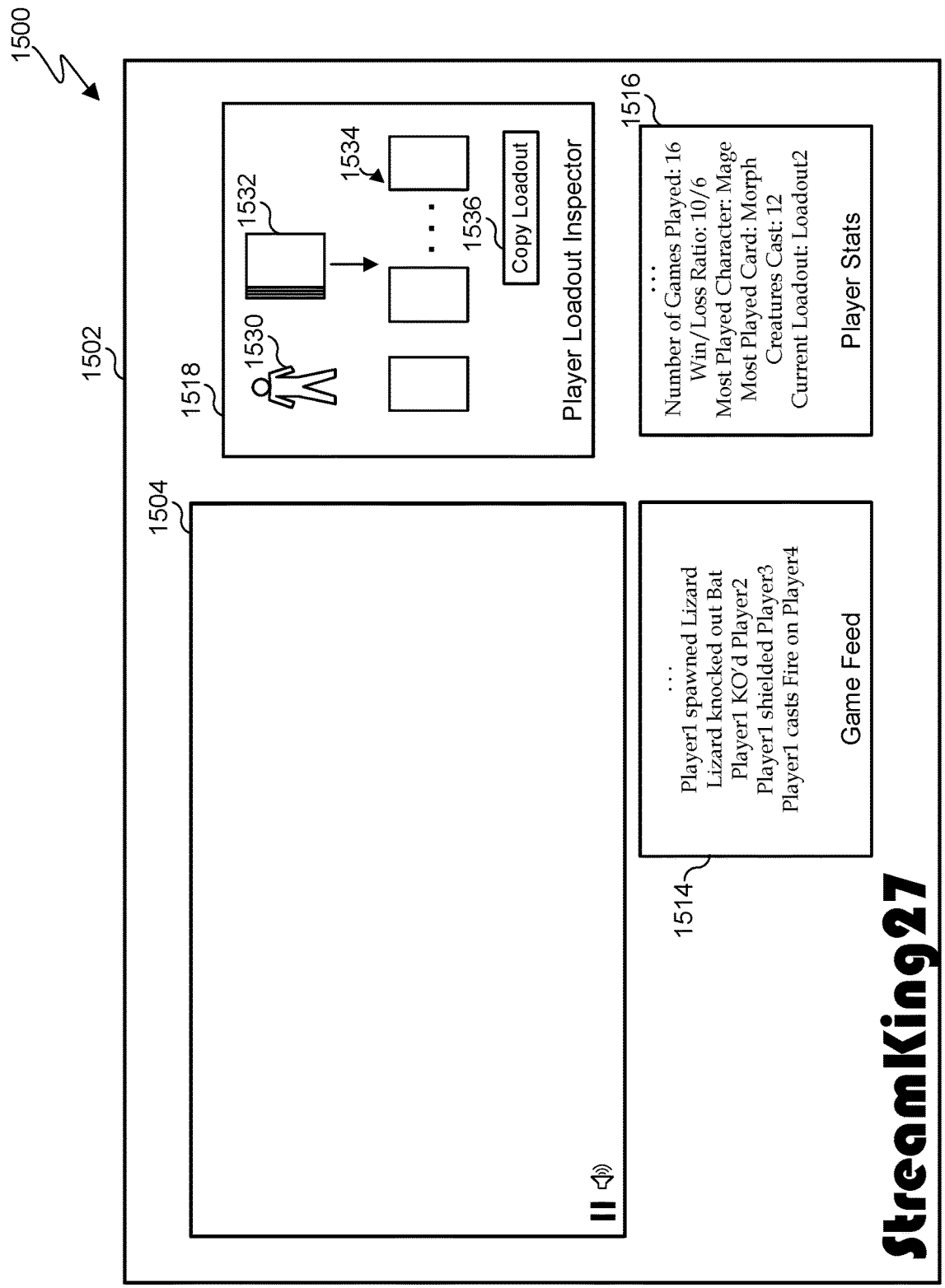

FIGS. 15A and 15B illustrate example diagrams 1500 of a streaming client window 1502 in accordance with various embodiments of this disclosure. The streaming client window 1502 can be presented to a viewer by a stream viewer client on a stream viewer device, such as the streaming client 1312 on the stream viewer device 1304. In some embodiments, an extension application such as the extension application 1314 can be used to provide the content shown in the window 1502 either on its own or as an overlay or addition to a user interface of the stream viewer client.

As illustrated in FIGS. 15A and 15B, the streaming client window 1502 includes a content playback portion 1504 that presents to the user streaming content such as a video of gameplay from a streamer streaming the content via a streaming service such as streaming service 1302. The content playback portion 1504 can include various controls such as controls to pause or play the content, controls to alter the volume level of content playback, or other controls. The streaming client window 1502 can also include the streamer's name, channel, or other identification in a bottom left corner of the streaming client window 1502, or elsewhere in the window 1502.

As described in this disclosure, the functionality of a streaming client such as the streaming client 1312 can be extended by executing and running a streaming extension, such as extension 1314. The streaming extension is configured to present to the viewer additional interfaces in the streaming client window 1502. The additional interfaces can display information pertaining to the functions of the extension application or of the content being streamed, accept viewer inputs to initiate actions, display interaction events, or provide other additional features to the streaming client window 1502. The additional interfaces can be separate windows that can be dragged anywhere on the viewer's device screen, or can be overlays or distinct GUI components of the streaming client window 1502. As shown in the example illustrated in FIGS. 15A and 15B, the streaming client window 1502 can include multiple interface areas in the streaming client window 1502, such as an avatar and banner interface 1506, a user stats interface 1508, a user quests interface 1510, a featured fan interface 1512, a game feed interface 1514, a player stats interface 1516, and a player loadout inspector interface 1518.

The avatar and banner interface 1506 allow a user to create a custom avatar 1520 to be displayed in the user's streaming client window 1502, in other viewer's streaming client windows, in the streamer's streaming client window, and in the game client itself. The user's avatar 1520 can be used and displayed in-game in various interactions with the streamer and/or other stream viewers such as in interactions in-game such as high-fiving a player's avatar, celebrating with the player's avatar after a match or other game event, sitting with a player's avatar in a pre-game area such as a locker room before a match or other game event, giving the player's avatar an item or other object, sitting in the stands during a match or other game event, or other interactions. Upon initially creating an account such as an account associated with the game being streamed and viewed in the content playback portion 1504, the user or viewer can be provided a default avatar. In some embodiments, the user can also link another account, such as a streaming service or social media account, to the game account to generate a default avatar.

The user can then customize the avatar 1520 by using the avatar and banner interface 1506 to apply new skins, such as clothing or other aesthetics, head attachments, hand attachments, or other customization options to the avatar 1520 to create a unique appearance for the user's avatar 1520. In some embodiments, skins are mostly full body visual cosmetics that change an overall appearance of the avatar 1520. In some embodiments, head attachments can include items such as hats, glasses, antlers, hair styles, or other attachments. In some embodiments, hand attachments, can include items such as a foam finger, gloves, a banner, a ball, or other items held or worn by the avatar 1520. In some embodiments, certain avatar customization options may not be available to a user until certain milestones are met, such as subscribing to a streamer's channel, reaching a certain fan level, voting a certain number of times, using or purchasing a certain number of items, or other milestones.

The avatar and banner interface 1506 also allows a user to create a custom banner 1522. Banners can be displayed when a fan or viewer is featured as a viewer's icon in a crowd or in the stands in-game, or at a location in the window 1502. In some embodiments, a banner can be used as a background for a user avatar when a user's avatar is displayed in the window 1502 or in-game. In some embodiments, a banner can be held like a flag by the user's avatar, or otherwise placed in the window 1502 or in-game, such as in an arena or in the stands during a match. The fan banner 1522 can include various customizable components such as a banner frame, a banner background, and a banner pose, which can be customized in the avatar and banner interface 1506. The banner frame includes border designs or textures that can be animated.

The banner background can include an image, a material, or a pattern that makes up a portion of the banner. The banner pose is a pose that an avatar takes while on the banner. In some embodiments, changes to the user's avatar 1520 and banner 1522 may not be saved until an "apply changes" button 1524 is pressed, clicked on, or touched, such that the user can abandon the process without altering the avatar 1520 or banner 1522 if the user does not like the changes. In some embodiments, users can create avatars and banners without purchasing the game being streamed. In some embodiments, if a user chooses to purchase the game, the avatar and banner created by the user can be imported into the game and used by the user as the user's in-game avatar and banner when the user plays the game. Avatars and banners can be stored in association with user accounts, such as on the data store 1320 of the extension backend 1306.

The user stats interface 1508 can include various information regarding the user of the window 1502. In some embodiments, an extension backend such as extension backend 1306 stores and updates user information, and provides the information to an extension application that provides the user stats interface 1508. Various information can be tracked and stored regarding fans or viewers, such as whether the viewer is a subscriber to the streaming channel and, if so, a subscription tier such as tier 1, tier 2, tier 3, etc. of the viewer's subscription. The various information on the viewer can also include the number of times the viewer has voted, whether the viewer has customized an avatar or banner, recent, game-state-changing, items used by the user, a featured card or game item of the user, or other information.

Viewers can also be provided with extra incentives or goals to keep the viewer engaged and watching content streams. For example, viewers can have stored in association with viewer accounts fan points, fan levels, and fan gear ratings. Fan gear ratings can be a quality or quantity rating of items or gear, either in-game or within the streaming application or extension, that the fan possesses in the fan's account. Fan points are rewards to viewers for watching the stream, interacting with the streamer or other viewers, voting, and completing fan quests. Fan quests are lists of one or more activities the viewer can perform to gain additional fan points, such as watching a stream for a certain amount of time, voting a number of times, becoming a subscriber or subscribing for a particular amount of time, or other activities. New fan quests can be generated periodically, such as once a week. Fan quests can be displayed in the user quests interface 1510 to allow the viewer to track fan quest progress. When a viewer receives fan points, a fan point multiplier can be applied to the fan points awarded, such as if the viewer is subbed at a particular subscription tier. For example, if there are three subscription tiers, a multiplier of 1.25× can be applied for tier 1, a multiplier of 1.5× can be applied for tier 2, and a multiplier of 2× can be applied for tier 3, to increase the number of points a fan receives based on the viewer's subscription tier. When a viewer gains fan points by completing activities or completing quests, if a number of fan points exceeds a threshold, the viewer's fan level increases. In some embodiments, there can be a limit to the number of fan points a viewer can receive over a period of time, such as a weekly limit.

The featured fan interface 1512 of the streaming client window 1502 can be displayed when a featured fan is chosen during a game. In some embodiments, a featured fan can be chosen based on random selection, a manual selection by the content streamer or streaming channel owner, when a viewer or fan reaches a new milestone, when a viewer or fan performs an interaction, a number of interactions, or other engagement activities, or other methods of choosing a featured fan. In embodiments in which the featured fan is chosen based on random selection, fans eligible for featured fan selection can be filtered or set as parameters for featured fan selection, such as limiting featured fan selection to subscribing fans, subscribing fans of a particular tier, fans who have performed certain interactions and/or a number of interactions, or other parameters. In some embodiments, random selection of featured fans can keep track of which fans have already been featured, and avoids picking the same fan as the featured fan until all other eligible fans have been featured, until a certain number of eligible fans have been featured, until a certain amount of time has passed since the fan was featured, or other methods for avoiding featuring the same fan multiple times. In some embodiments, featured fans are shown between rounds in a game, or in other down time in the game. The featured fan interface 1512 can include various information on the fan chosen to be featured, such as the featured fan's avatar 1526, the featured fan's banner 1528, a featured card of the featured fan, and other featured fan stats such as fan level, fan gear rating, time voted, recent items used, or other information.

The streaming client window 1502 can also include the game feed interface 1514. The game feed interface 1514 provides a play-by-play feed of the game currently being streamed. In some embodiments, updates from the game server or the game client to the extension backend provides the information to be displayed in the game feed interface 1514, and the extension backend provides such information to the extension of the stream viewer application for display. The game feed interface 1514 displays game event types that are dependent on the game being played and streamed. The event types can include various events each with its own syntax. For example, casting a spell or creature can have the syntax of [Player][Spawn Icon][Creature], and triggering a KO on a creature or player character can have the following respective syntaxes of [KOing creature][KO Type Icons] [KO'd Creature] and [KOer][KO Type Icon][Player Icon]. KO types can include types such as basic damage, area-of-effect (AOE), death touch, damage-over-time (DOT), environmental, or other types. It will be understood that these are simply examples, and the types of events, syntax, and other information is dependent on the specific game title being played and streamed.

The player stats interface 1516 can include various information on the player or streamer that is streaming the content to the stream viewer. Such information can include stats on the current game, such as amount of resources spent during the current game, number of kills during the current game, spells cast during the current game, etc. The information presented in the player stats interface 1516 can also include lifetime player stats, such as a win/loss ratio, a most played spell, card, or character, favorite or most-used gear, or other information. The player loadout inspector interface 1518 allows a fan to view a player's current set of equipment, items, team makeup, or other data on the player. The player loadout inspector interface 1518 can display the player's avatar 1530, such as to see how the player's loadout affects the appearance of the player's avatar 1530. The player loadout inspector interface 1518 displays a collection of items 1532, gear or other in-game objects related to the player. One or more items 1534 can be removed from the collection of items 1532 so that the viewer can more closely inspect the one or more items 1534. In some embodiments, the viewer can select one of the one or more items 1534, such as by hovering a mouse over the item, or clicking or touching on the item, to view information or tooltips that describe the item. A copy loadout button 1536 is also provided in the player loadout inspector interface 1518, which allows the viewer to equip the player's loadout for use in the viewer's game. In some embodiments, if the viewer does not possess each of the items in the player's loadout in the viewer's account, an option to buy the missing items can be provided to the viewer.

It will be understood that FIGS. 15A and 15B illustrates examples of a streaming client window 1502, and the streaming client window 1502 can include other information than illustrated in FIGS. 15A and 15B. The interfaces 1506, 1508, 1510, 1512, 1514, 1516, and 1518 can also be displayed in different areas of the window 1502, and the display of these interfaces can be toggled, resized, or otherwise altered based on user preferences and on current operations of the window 1502.

Figure 16:
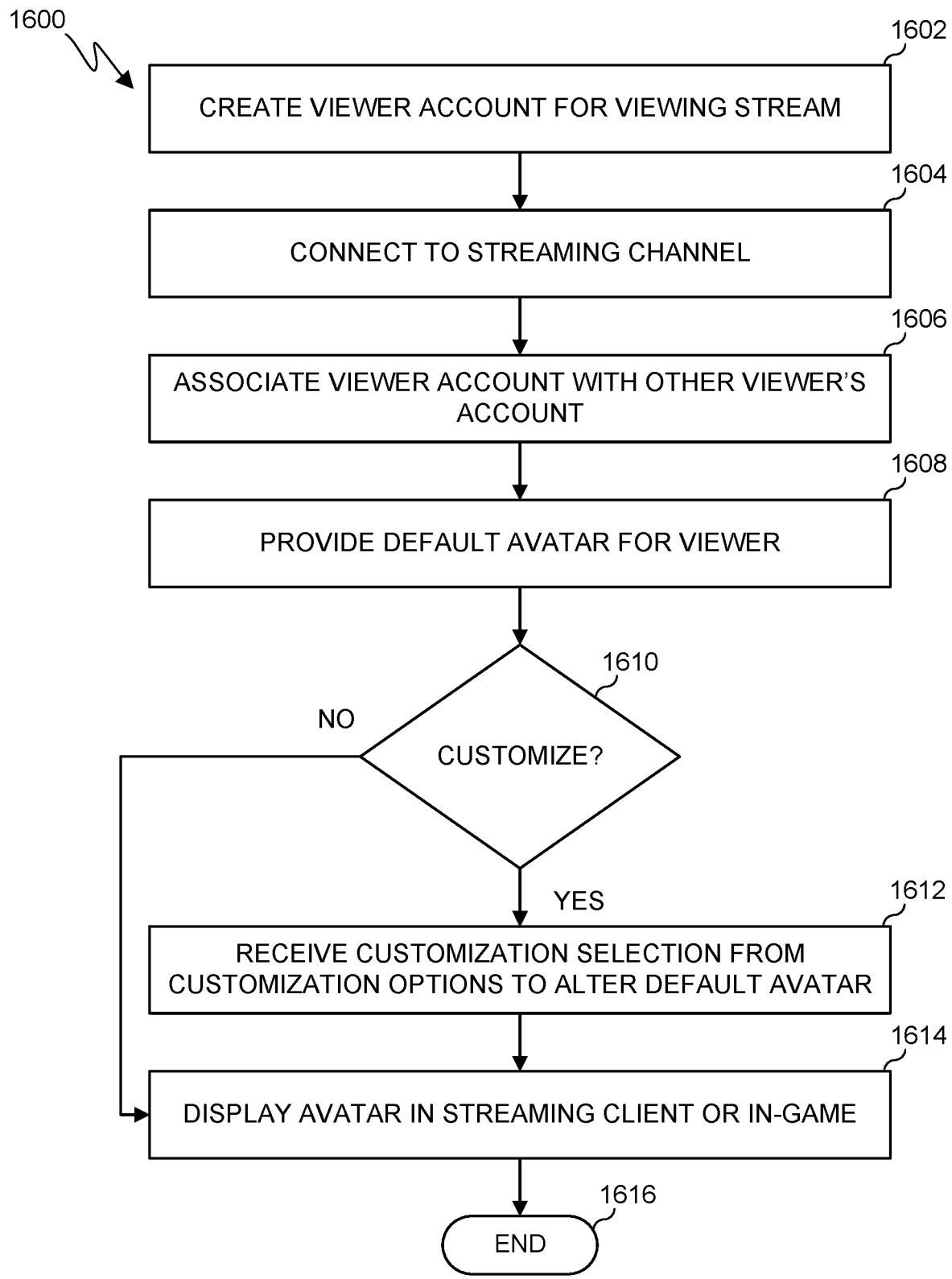
FIG. 16 illustrates a viewer account and avatar creation process in accordance with various embodiments of this disclosure.

FIG. 16 illustrates a viewer account and avatar creation process 1600 in accordance with various embodiments of this disclosure. FIG. 16 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 1600 is described with respect to the processor 120 of any, or a combination, of the streaming service 1302, the stream viewer device 1304, the extension backend 1306, the game server 1308, or the streaming device 1305. However, the process 1600 can be used with any other suitable device(s) and in any suitable system. In some embodiments, the process 1600 is performed by the streaming client extensions 1314. It will be understood that the process 1600 is one example of a function or interaction event of a streaming service, streaming client, streaming client extension, and/or an extension backend, and this example does not limit the functions or interaction events that can be provided by the systems or devices of this disclosure.

At block 1602 the processor creates a viewer account for use in, and granting access to, a stream. In some embodiments, the viewer account can be an account associated with a game being streamed. At block 1604, the processor connects to a streaming channel. At block 1606, the processor associates the viewer account with another viewer's account, such as a streaming service account or social media account originally used to access the streaming service before creation of the viewer account at block 1602. At block 1608, the processor provides a default avatar for the viewer. This disclosure provides that a user or viewer that connects to a stream and links a viewer account is provided with certain game features or rewards, even without buying the game being streamed, such as a customizable avatar that can be customized and later used in the game if the game is purchased, game items that can be collected, used in loadout requests to streamers, and later used in-game by the viewer if the viewer buys the game, game achievements, or other features and rewards.

At decision block 1610, the processor determines if a request to customize the default avatar is received. If so, at block 1612, the processor receives a customization selection from a plurality of customization options, and alters the appearance of the default avatar. At block 1614, the processor displays the avatar in the streaming client interface, and/or in-game, such as during a interaction with a streamer avatar. If at decision block 1610, the processor determines that there is no attempt to customize the default avatar, the process 1600 moves to block 1614 to display the default avatar in the streaming client or in-game. The process 1600 ends at block 1616.

Figure 17A:
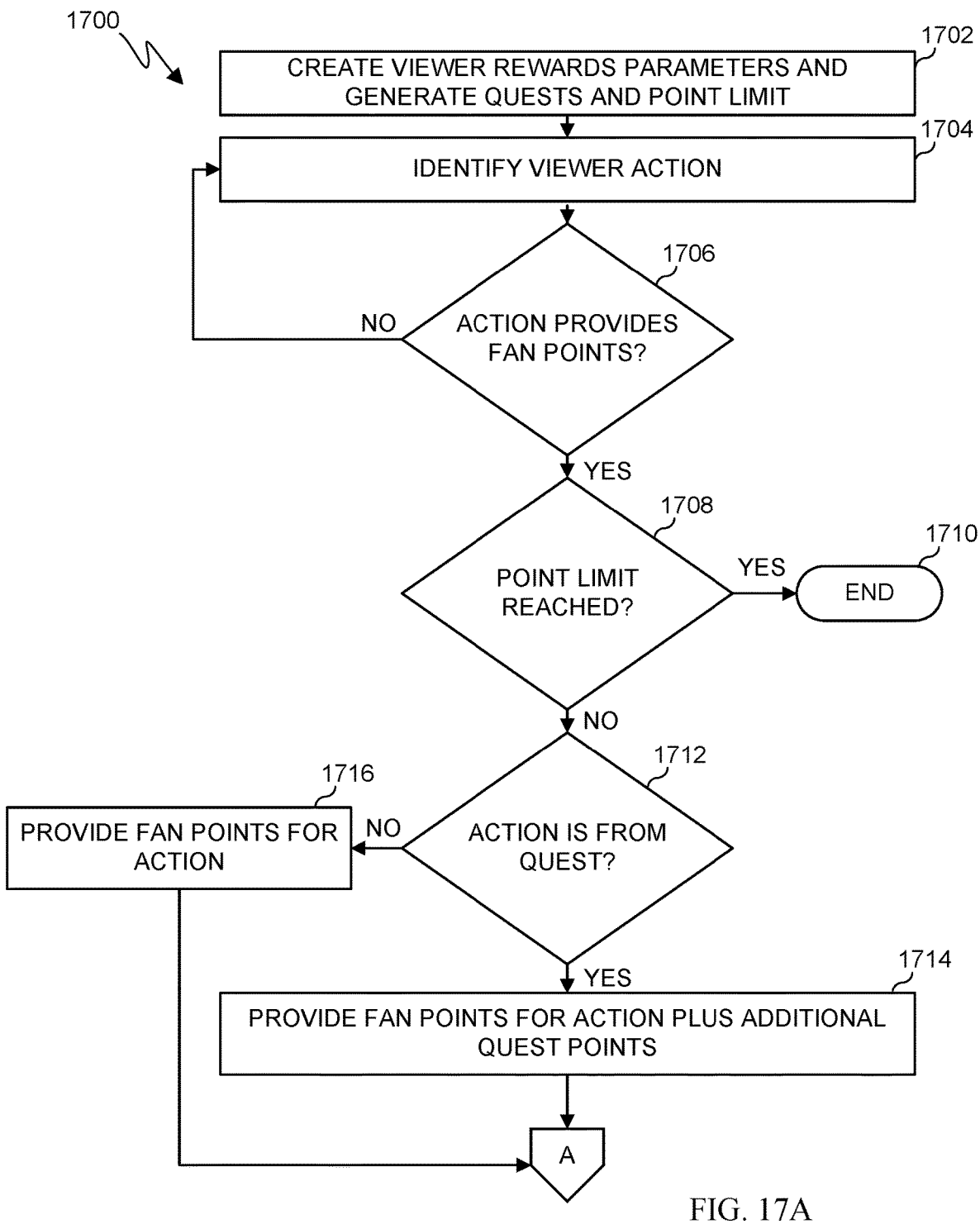
FIGS. 17A and 17B illustrate a fan points and leveling process in accordance with various embodiments of this disclosure.
Figure 17B:
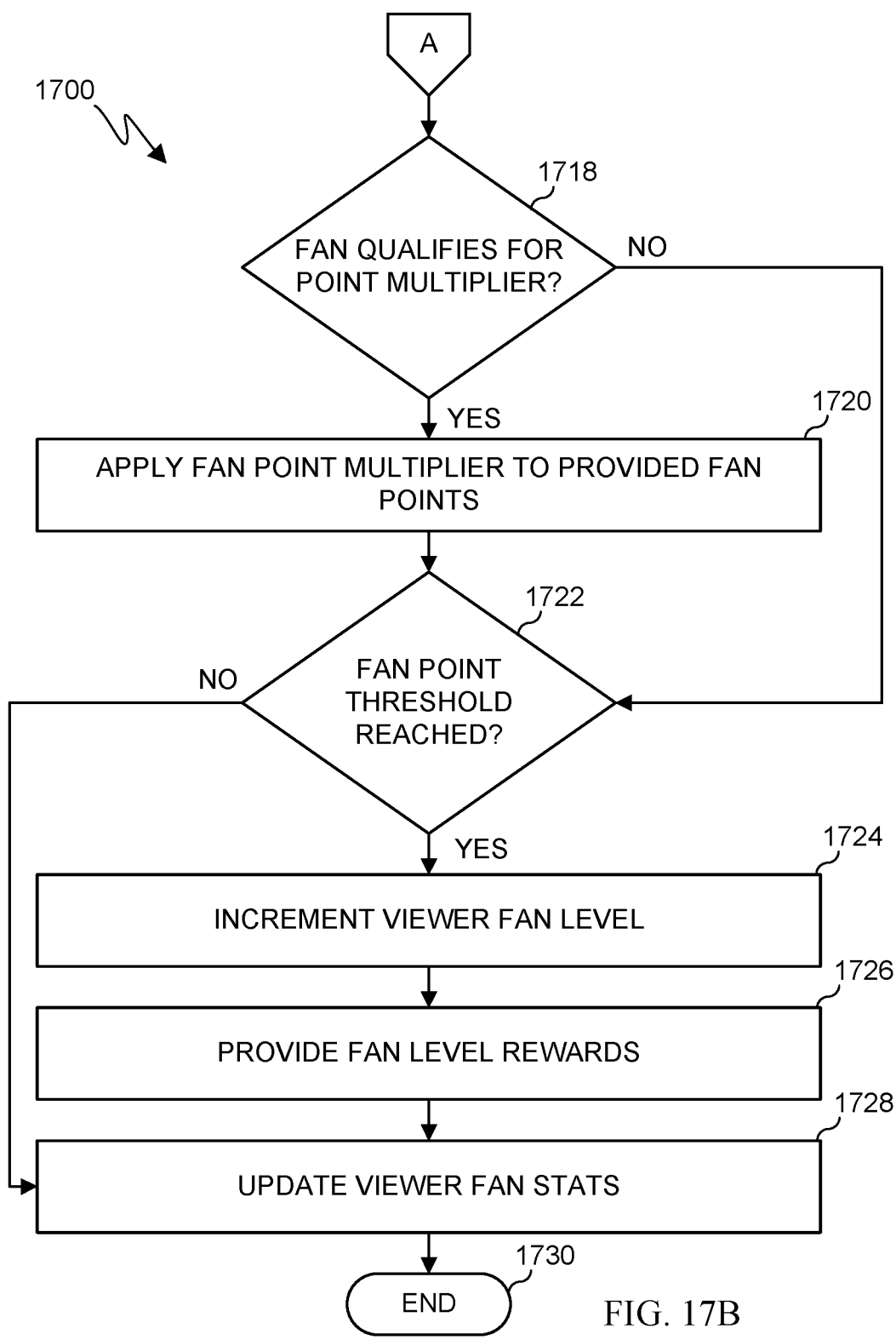

FIGS. 17A and 17B illustrate a fan points and leveling process 1700 in accordance with various embodiments of this disclosure. FIGS. 17A and 17B do not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 1700 is described with respect to the processor 120 of any, or a combination, of the streaming service 1302, the stream viewer device 1304, the extension backend 1306, the game server 1308, or the streaming device 1305. However, the process 1700 can be used with any other suitable device(s) and in any suitable system. It will be understood that the process 1700 is one example of a function or interaction event of a streaming service, streaming client, streaming client extension, and/or an extension backend, and this example does not limit the functions or interaction events that can be provided by the systems or devices of this disclosure.

At block 1702, the processor creates viewer rewards parameters and generates quests and a fan point limit. The rewards parameters, quests, and point limit can be provided by a streamer creating custom rewards parameters, quests, point limits, and other features, or can be default settings. The viewer rewards parameters can include which actions provide fan points, how many fan points are used for each fan level, which rewards are given to viewers based on actions, completed quests, or leveling up, and other parameters. At block 1704, the processor identifies a viewer action, such as any action a viewer performs while using a stream viewer application and/or extension, such as logging in, subscribing, using items or rewards, participating in a streamer interaction, or other viewer actions. At decision block 1706, the processor determines if the viewer action performed at block 1704 is an action that provides fan points based on the viewer rewards parameters. If not, the process 1700 moves back to block 1704. If so, the process 1700 moves to decision block 1708.

At decision block 1708, the processor determines if the viewer has reached the point limit. If so, the process 1700 ends at block 1710. If the viewer has not yet reached the point limit, the process 1700 moves to decision block 1712. At decision block 1712, the processor determines if the action identified in block 1704 is a quest action for an quest currently active for the viewer. For example, a viewer's list of quests may include a quest to vote 10 times, and, if the action identified in block 1704 is the tenth time the viewer has voted, the processor determines at decision block 1712 that the action is a completed quest action. If at decision block 1712 the processor determines that the action is a completed quest action, at block 1714, the processor provides to the viewer's account a number of fan points associated with the identified action, and additional fan points for completing the quest. For example, if voting in a streamer poll provides 10 fan points, and completing a quest to vote 10 times provides 50 fan points, a voting action that also completes the quest would reward 60 fan points. If, at decision block 1712, the processor determines that the action is not a quest action, or that the action does not compete a quest, at block 1716, the processor provides to the viewer's account a number of fan points for the action identified in block 1704. In some embodiments, if a viewer has not yet reached the point limit, but a number of points to be awarded will go over the limit, the viewer can be rewarded with just the number of points to reach the limit.

At decision block 1718, the processor determines if the viewer qualifies for a point multiplier. Point multipliers can be multipliers that increase the number of earned points based on certain criteria, such as number of quests completed, whether the viewer is subscribed to the streaming channel, a subscription tier of the viewer's subscription, or other criteria. If the user qualifies for a point multiplier, at block 1720, the processor applies the point multiplier to the fan points provided at blocks 1714 or 1716. For example, if there are three subscription tiers, a multiplier of 1.25× can be applied for tier 1, a multiplier of 1.5× can be applied for tier 2, and a multiplier of 2× can be applied for tier 3. It will be understood that, in some embodiments, applying the fan point multiplier can be performed before providing the fan points to the viewer's account. The process 1700 then moves to decision block 1722. If, at decision block 1718, the processor determines that the viewer does not qualify for a point multiplier, the process 1700 moves to decision block 1722.

At decision block 1722, the processor determines if the viewer's account has reached a fan point threshold that defines when a viewer's fan level increases. In some embodiments, the fan point threshold for each fan level can be defined as a total number of fan points received by the viewer's account. For example, a viewer may level up to level 2 after acquiring 1000 fan points. To level up to level 3, the viewer may need 2500 total fan points, meaning that the viewer, from reaching level 2, will need 1500 more fan points to level up to level 3. In other embodiments, the number of fan points a viewer possesses can be essentially reset upon reaching a new level. For example, a viewer may level up to level 2 after acquiring 1000 fan points, which resets the total number of fan points. To level up to level 3, the viewer may need 2500 total fan points, meaning that the viewer, from reaching level 2, will need 2500 more fan points to level up to level 3.

If, at decision block 1722, the processor determines that the fan point threshold has not been reached, the process 1700 moves to block 1728. At block 1728, the processor updates the viewer's fan stats based on the actions and quests completed by the viewer, and the fan points provided to the viewer. The process 1700 then ends at block 1730. If, at decision block 1722, the processor determines that the fan point threshold has been reached, the process 1700 moves to block 1724. At block 1724, the processor increments the viewer's fan level. At block 1726, the processor can provide rewards to the viewer for leveling up, such as items to affect the game state of the game, more avatar or banner customization options, better seats or custom seats in the stands or arena, such as a seat on top of a display screen or goal post on a digital field, recognition as a featured fan, collectible cards or items, digital currency, digitally signed cards or items signed by the streamer, more streamer interaction options, or other rewards. In some embodiments, if the viewer reaches a certain fan level, the viewer can receive a title, such as a "super fan" title, so that the streamer and others recognize the viewer's contribution to the streamer and/or streaming channel. At block 1728, the processor updates the viewer's fan stats in the stored viewer's account based on the actions and quests completed by the viewer, and the fan points provided to the viewer. The process 1700 then ends at block 1730.

Figure 18:
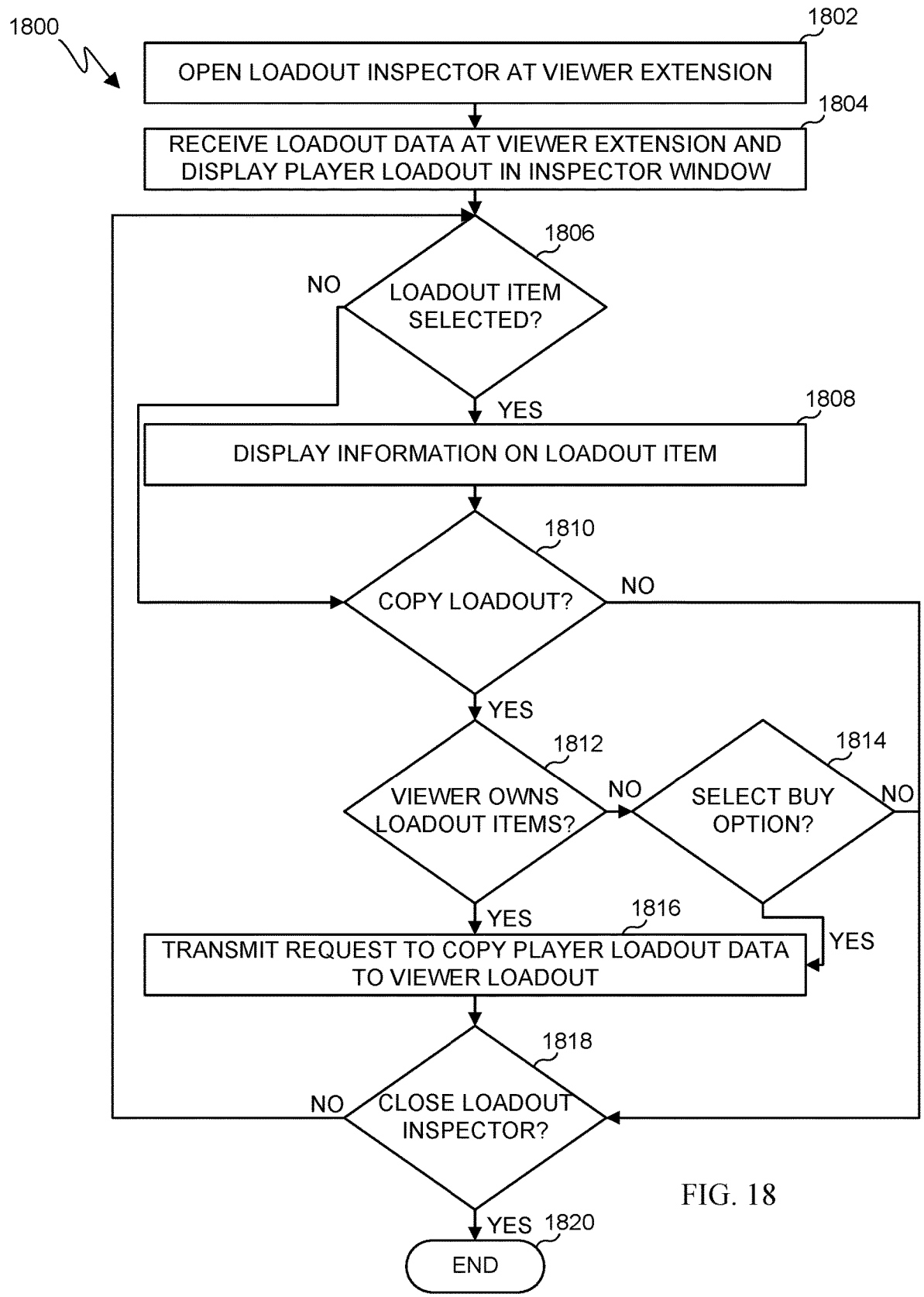
FIG. 18 illustrates a loadout inspector process in accordance with various embodiments of this disclosure.

FIG. 18 illustrates a loadout inspector process 1800 in accordance with various embodiments of this disclosure. FIG. 18 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 1800 is described with respect to the processor 120 of any, or a combination, of the streaming service 1302, the stream viewer device 1304, the extension backend 1306, the game server 1308, or the streaming device 1305. However, the process 1800 can be used with any other suitable device(s) and in any suitable system. It will be understood that the process 1800 is one example of a function or interaction event of a streaming service, streaming client, streaming client extension, and/or an extension backend, and this example does not limit the functions or interaction events that can be provided by the systems or devices of this disclosure.

At block 1802, the processor opens a loadout inspector, such as the player loadout inspector interface 1518, in a stream viewer extension or in a stream viewer client. At block 1804, the processor receives loadout data via the stream viewer application extension and displays a player's loadout in the loadout inspector window. In some embodiments, the extension backend requests or retrieves player loadout data from the game server or game client, and then sends the data to the stream viewer extension or streaming viewer client. In some embodiments, the extension backend may already have stored player loadout information. In some embodiments, player loadout data may already be stored in memory of the stream viewer device running the stream viewer application and/or the stream viewer client extension, such as if the stream viewer device requested player loadout data upon connecting to the streaming channel. In some embodiments, player loadout data is updated for all stream viewers whenever a player updates or makes changes to the player's loadout.

The player loadout inspector allows a fan to view a player's current set of equipment, items, team makeup, or other data on the player. The player loadout inspector can also display the player's avatar, so as to see how the player's loadout affects the appearance of the player's avatar. The player loadout inspector can also display a collection of items, gear or other in-game objects related to the player. In decision block 1806, the processor determines if a loadout item in the loadout inspector is selected. In some embodiments, the viewer can select one of the one or more loadout items, such as by hovering a mouse over the item, or clicking or touching on the item, to view information or tooltips for the item that describe the item. If, at decision block 1806, the processor determines a loadout item is selected, at block 1808, the processor displays information on the loadout item. The process 1800 then moves to decision block 1810. If, at decision block 1806, the processor determines a loadout item is not selected, at block 1808, the process 1800 moves to decision block 1810.

At decision block 1810, the processor determines if a request is received to copy the player's loadout. In some embodiments, the loadout inspector includes and displays a loadout copy button, which allows the viewer to equip the player's loadout for use in the viewer's game. In some embodiments, even if the viewer does not own a licensed copy of the game, the viewer can still copy the loadout to experiment with different loadout possibilities. In some embodiments, the viewer can even preview any changes the copied loadout has on the viewer's custom avatar. If at decision block 1810, the processor determines that no request to copy the loadout is received, the process 1800 moves to decision block 1818. If at decision block 1810, the processor determines that a request to copy the loadout is received, the process moves to decision block 1812.

At decision block 1812, the processor determines if the viewer does not possess in the viewer's account each of the items requested to be copied from the player's loadout. In some embodiments, the processor can send a request to the extension backend to retrieve the viewer's owned item information and to compare the requested copy items with the items in the viewer's account. In some embodiments, the processor of the extension backend can perform each step of the process 1800, receiving and sending commands and requests from/to the stream viewer client or the stream viewer client extension. If, at decision block 1812, the processor determines the viewer does not own all the player loadout items to be copied, at decision block 1814, the processor presents to the viewer an option to buy the missing loadout items and determines if the viewer selects the option to buy the missing loadout items. If the viewer does not choose to buy the missing items, the process 1800 moves to decision block 1818. If the viewer chooses to purchase the missing items, a transaction is processed to buy the missing items, such as using a credit card associated with the viewer's account, and the process 1800 moves to block 1816. If, at decision block 1812, the processor determines that the viewer owns all the items to be copied, the process 1800 also moves to block 1816.

At block 1816, the processor transmits a request to copy the player loadout data to the viewer's account to update the viewer's loadout. In some embodiments, the request is sent from a stream viewer client or stream viewer client extension to an extension backend, which updates the viewer loadout and sends back new viewer loadout data to the stream viewer client or the stream viewer client extension. Once the player loadout is copied to the viewer loadout, the viewer can view or alter the viewer's loadout, even if the viewer does not own the game, or, if the viewer owns the game, can use the copied loadout in-game. The process 1800 then moves to decision block 1818. At decision block 1818, the processor determines if the processor receives a request to close the loadout inspector. If not, the process 1800 loops back to decision block 1806. If so, the process 1800 ends at block 1820.

Figure 19:
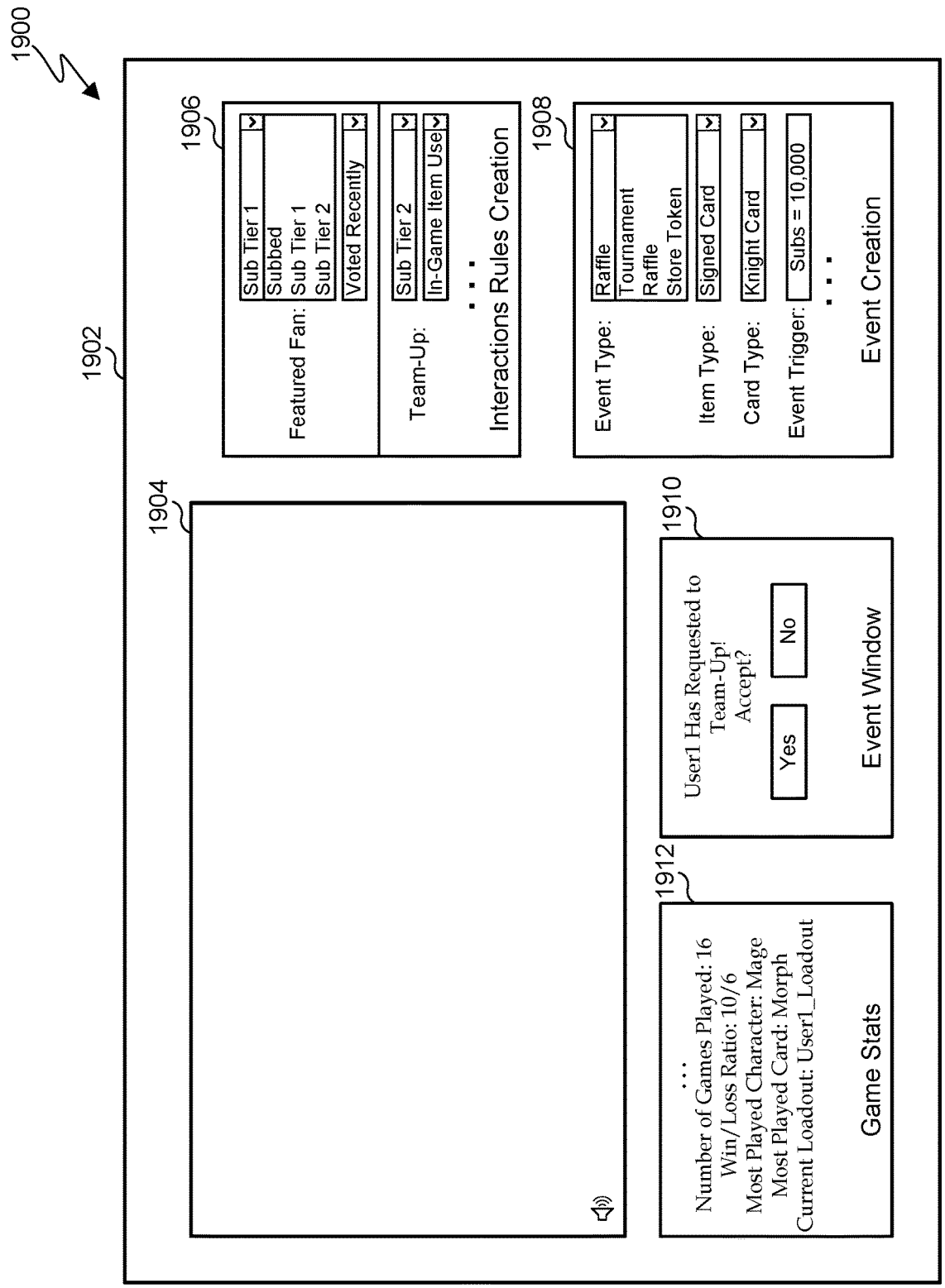
FIG. 19 illustrates an example diagram of a streamer client window in accordance with various embodiments of this disclosure.

FIG. 19 illustrates an example diagram 1900 of a streamer client window 1902 in accordance with various embodiments of this disclosure. The streamer client window 1902 can be presented to a streamer or player by a streamer client on a streamer device, such as the streaming client 1316 on the streaming device 1305. In some embodiments, an extension application such as the extension application 1318 can be used to provide the content shown in the window 1902 either on its own or as an overlay or addition to a user interface of the streamer client.

As illustrated in FIG. 19, the streamer client window 1902 includes a content playback portion 1904 that presents to the streamer a live feed of an application client so the streamer can view the content the streamer is currently streaming, such as a video of gameplay from a game client, images and audio from a camera and/or microphone, such as if the streamer is currently streaming video of the streamer speaking to viewers, or video from other applications running on the streamer device, such as a web browser, a development tool application, a modding tool application, or other applications. It will be understood that in some embodiments, a streamer need not stream only gameplay, but can stream the viewer speaking about various topics, stream educational or instructional content, or stream content about a game without actually being a player or streaming gameplay. The content playback portion 1904 can include various controls such as controls to pause or play the content, controls to alter the volume level of content playback, or other controls.

As described in this disclosure, the functionality of a streamer client such as the streaming client 1316 can be extended by executing and running a streaming extension, such as extension 1318. The streaming extension is configured to present to the streamer additional interfaces in the streamer client window 1902. The additional interfaces can display information pertaining to the functions of the extension application or of the content being streamed, accept streamer inputs to initiate actions, create interaction events for viewers, display interaction events or interaction event requests, or provide other additional features to the streamer client window 1902. The additional interfaces can be separate windows that can be dragged anywhere on the streamer's device screen, or can be overlays or distinct GUI components of the streamer client window 1902. As shown in the example illustrated in FIG. 19, the streamer client window 1902 can include multiple interface areas in the streamer client window 1902, such as an interactions rules creation interface 1906, an event creation interface 1908, an event window 1910, and a game stats window 1912.

The interactions rules creation interface 1906 provides an interface for the streamer to create rules for fan or viewer interactions that can be presented in the streamer client, the stream viewer clients, or affect the gameplay in the game client. Interactions created by a streamer or content creator provide opportunities for fans or viewers to engage with the streamer or content creator. Some interactions allow for fans or viewers to request that the streamer perform some action or accept a request. For example, viewers can request that the viewer's avatar, either in-game or in the streaming clients, perform an emote or other action. For instance, the viewer can request to give the player's or streamer's avatar a high five, give the streamer's avatar an item, celebrate with the streamer's avatar, or other interactions. Other example viewer initiated interactions include requesting that the streamer use the viewer's loadout, requesting to play with or against the streamer in-game, or other viewer initiated requests. Although these types of interactions are viewer initiated during a stream, the streamer can still use the interactions rules creation interface 1906 to define parameters for when these interactions can take place, which viewers can request the interactions, or other parameters. Some interactions are streaming or gameplay events that the streamer creates that are displayed to the viewers, or that request action from the viewers. For example, the streamer can define parameters for when a fan is displayed as a featured fan, when fan avatars celebrate with the streamer's avatar or otherwise appear in-game with the streamer, such as in a locker room or other area of the game, which fans can use the VIP chat, or other interaction types. The interactions rules creation interface 1906 can be used to set the various parameters for interactions. For example, as shown in FIG. 19, criteria can include a subscription tier that restricts featured fans to only those fans that have subscribed at a particular subscription tier, or other parameters based on viewer activity, such as if a viewer voted recently in a poll provided by the streamer, if the viewer has used an in-game item that affected gameplay during a stream of a game, or other parameters. The parameters thus limit which fans can access the various interactions, to encourage fans to engage with the streamer.

The event creation interface 1908 includes options for creating unique interaction events. Unique interaction events can be events such as a raffle in which the streamer selects, either manually, randomly, or via another selection method, a user to receive a prize, such as a rewards item that can affect gameplay, a loadout item, a card such as an item or creature card that includes a graphical or digital signature of the streamer, or other prizes. In some embodiments, the raffle can be displayed in-game via the game client, such as by displaying the streamer's avatar throwing the prize into a crowd of viewer avatars. Other events can include tournament events, store token events, or other events. Creating tournament events can include the streamer selecting a date or other trigger for an in-game tournament to start. In some embodiments, fans can buy or earn tickets to participate in the tournament. In some embodiments, the streamer can also participate in the in-game tournament, or can host the tournament for the participating fans, while providing the rules or parameters for tournament play. The streamer can also provide additional rewards for winners of the tournament. A store token event provides a redeemable store token that viewers can use as currency to buy rewards. In some embodiments, the event creation interface 1908 provides to the streamer various options for selecting an event type, a prize type, and a trigger for the event. Unique interaction events can be triggered when the streamer's streaming channel meets a milestone, such as reaching a certain number of subscribers, can be events that are scheduled for a specific date, such as holding a tournament on a specific date, or other criteria for triggering the event. In some embodiments, the options presented by the event creation interface can also be presented in the interactions rules creation interface 1906 or vice versa.

The event window 1910 displays to the streamer messages or other content when an interaction event is triggered. For example, if a viewer requests to team-up or play with the streamer in-game, a message appears in the event window 1910, which prompts the streamer to either accept or deny the viewer's team-up request. Other event messages, notifications, animations, prompts, or other content can be presented in the event window 1910, such as fan challenge requests, featured fan displays, raffle results, tournament results, or other event information. The game stats window 1912 can include various information on the player or streamer. Such information can include stats on the current game, such as an amount of resources spent during the current game, a number of kills during the current game, spells cast during the current game, etc. The information presented in the player stats interface 1516 can also include lifetime player stats, such as a win/loss ratio, a most played spell, card, or character, favorite or most-used gear, or other information.

It will be understood that FIG. 19 illustrates an example of a streamer client window 1902, and the streamer client window 1902 can include other information than that illustrated in FIG. 19, such as any of the viewer client interface windows illustrated in FIGS. 8, 10A, 10B, 15A, 15B, and 20. The interfaces 1906, 1908, 1910, and 1912 can also be displayed in different areas of the window 1902, and the display of these interfaces can be toggled, resized, or otherwise altered based on user preferences and on current operations of the window 1902.

Figure 20:
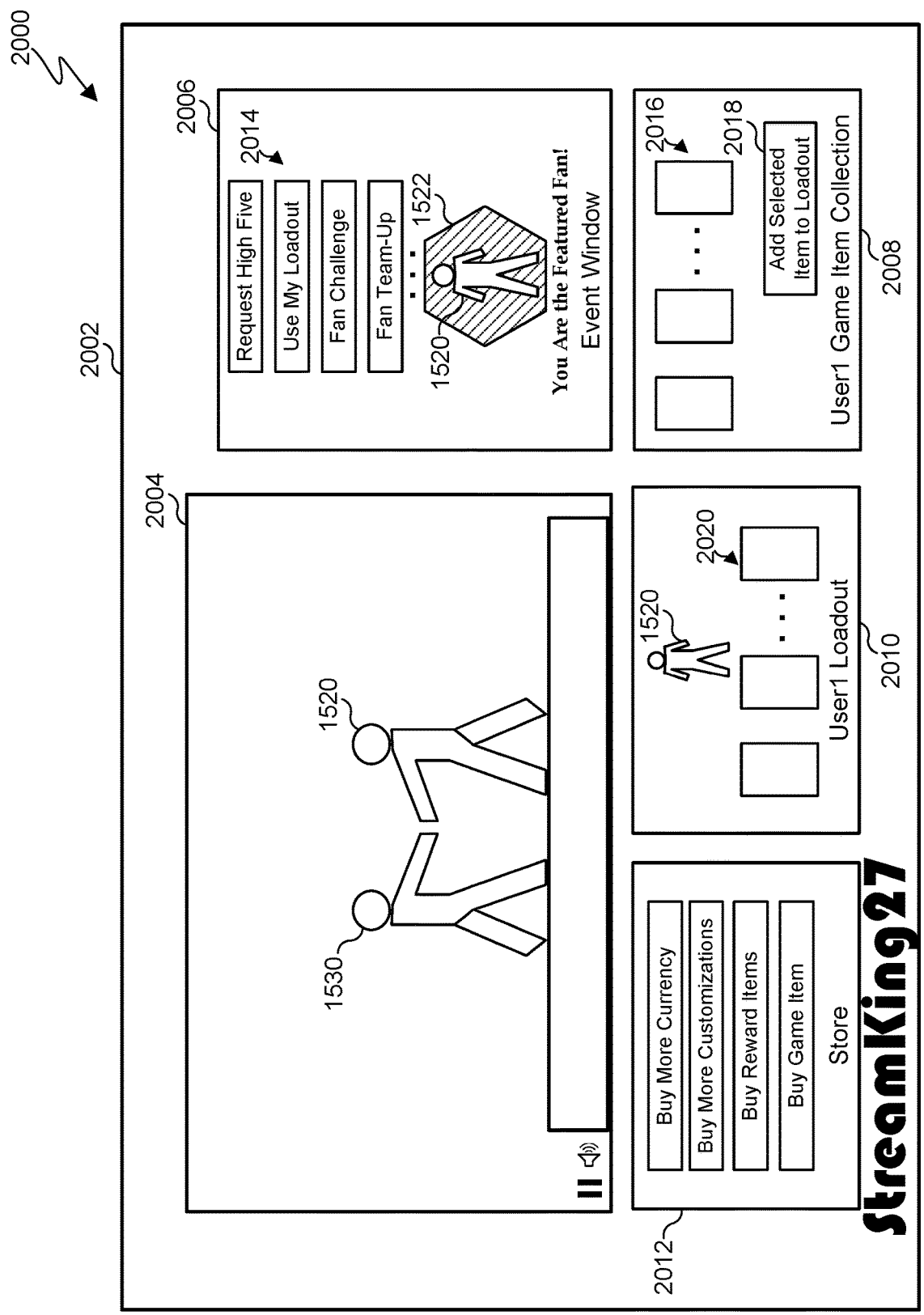
FIG. 20 illustrates an example diagram of a streaming client window in accordance with various embodiments of this disclosure.

FIG. 20 illustrates an example diagram 2000 of a streaming client window 2002 in accordance with various embodiments of this disclosure. The streaming client window 2002 can be presented to a viewer by a stream viewer client on a stream viewer device, such as the streaming client 1312 on the stream viewer device 1304. In some embodiments, an extension application such as the extension application 1314 can be used to provide the content shown in the window 2002 either on its own or as an overlay or addition to a user interface of the stream viewer client.

As illustrated in FIG. 20, the streaming client window 2002 includes a content playback portion 2004 that presents to the user streaming content such as a video of gameplay from a streamer streaming the content via a streaming service such as streaming service 1302. The content playback portion 2004 can include various controls such as controls to pause or play the content, controls to alter the volume level of content playback, or other controls. The streaming client window 2002 can also include the streamer's name, channel, or other identification in a bottom left corner of the streaming client window 2002, or elsewhere in the window 2002.

As described in this disclosure, the functionality of a streaming client such as the streaming client 1312 can be extended by executing and running a streaming extension, such as extension 1314. The streaming extension is configured to present to the viewer additional interfaces in the streaming client window 2002. The additional interfaces can display information pertaining to the functions of the extension application or of the content being streamed, accept viewer inputs to initiate actions, display interaction events, or provide other additional features to the streaming client window 2002. The additional interfaces can be separate windows that can be dragged anywhere on the viewer's device screen, or can be overlays or distinct GUI components of the streaming client window 2002. As shown in the example illustrated in FIG. 20, the streaming client window 2002 can include multiple interface areas in the streaming client window 2002, such as an event window 2006, a game item collection interface 2008, a viewer loadout interface 2010, and a store interface 2012.

The event window 2006 can display options for triggering or requesting interaction events, and can also display results, animations, graphics, information, or other content relating to triggered interaction events that involve the viewer. For example, as illustrated in FIG. 20, the event window 2006 includes buttons 2014 for selecting various interactions, such as a high five interaction in which the viewer's avatar high fives the player's avatar, a "use my loadout" interaction in which the viewer requests that the player use the viewer's current loadout in-game, a fan challenge interaction in which the viewer requests to play the game against the streamer, and a fan team-up interaction in which the viewer requests to play the game cooperatively with the streamer. When an interaction event that involves the viewer is triggered, the results, graphics, animations, or other information concerning the interaction are displayed in the event window 2006. For example, as illustrated in FIG. 20, when the viewer is selected as the featured fan, the event window 2006 can display information indicating to the viewer that the viewer is the featured fan, and can display other data such as the viewer's avatar 1520 and banner 1522. Additionally, when some events are triggered, the results can be displayed in-game, such as viewer and player avatar interactions such as high fives or other emotes or gestures, end-of-game celebrations, appearing during rest periods or break periods in the game, following the player avatar, or other interactions. For example, as illustrated in FIG. 20, the viewer's avatar 1520 can appear in-game with the player's avatar 1530, and thus appear together in the content stream presented in the content playback portion 2004.

The game item collection interface 2008 presents to the viewer a list or graphical representation of game items 2016 the viewer has collected, such as from store purchases, raffles, interaction events, leveling up, or other means. In some embodiments, the game items 2016 can be in-game items that can be used in-game, such as in a viewer's loadout. A button 2018 can be included in the game item collection interface 2008 to add a selected game item to the user's loadout. In some embodiments, the game items 2016 can be collectible items or cards, such as cards signed by the streamer, that represent how engaged the viewer has been with the streaming channel. In some embodiments, the game items 2016 can be earned even when the viewer does not own the game and, if the viewer later purchases the game, game items 2016 associated with the viewer's account at the extension backend will also appear in the viewer's inventory in-game.

The viewer loadout interface 2010 displays to the viewer the viewer's current loadout items 2020, and can also display the viewer's avatar 1520 to see any appearance changes the selected loadout has on the viewer's avatar 1520. The store interface 2012 includes an interface for purchasing various items, such as digital game items, rewards items, avatar customizations, additional digital currency, or other items.

It will be understood that FIG. 20 illustrates an example of a streaming client window 2002, and the streaming client window 2002 can include other information than that illustrated in FIG. 20. The interfaces 2006, 2008, 2010, and 2012 can also be displayed in different areas of the window 2002, and the display of these interfaces can be toggled, resized, or otherwise altered based on user preferences and on current operations of the window 2002.

Figure 21:
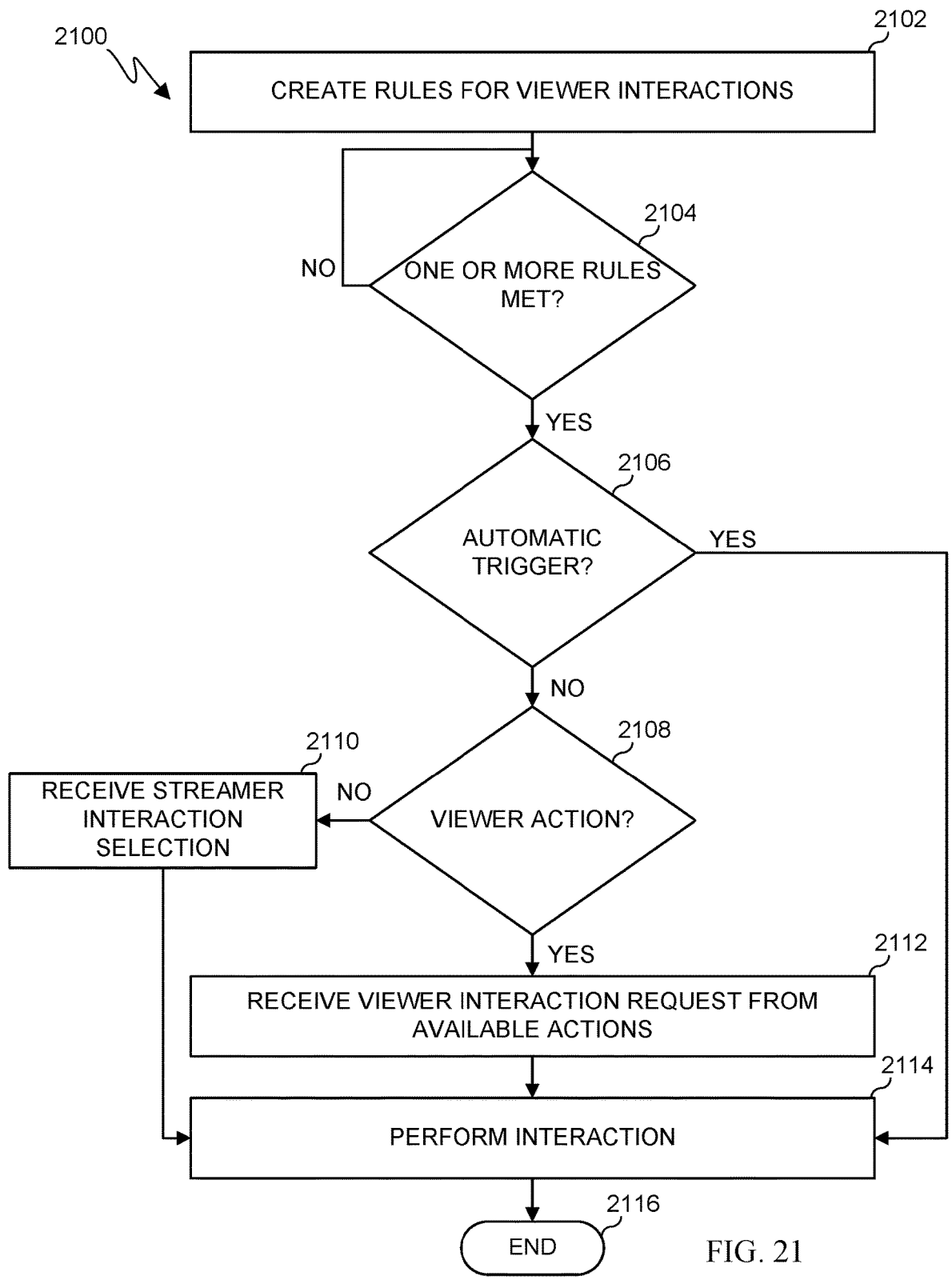
FIG. 21 illustrates an interaction creation and triggering process in accordance with various embodiments of this disclosure.

FIG. 21 illustrates an interaction creation and triggering process 2100 in accordance with various embodiments of this disclosure. FIG. 21 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 2100 is described with respect to the processor 120 of any, or a combination, of the streaming service 1302, the stream viewer device 1304, the extension backend 1306, the game server 1308, or the streaming device 1305. However, the process 2100 can be used with any other suitable device(s) and in any suitable system. It will be understood that the process 2100 is one example of a function or interaction event creation of a streaming service, streaming client, streaming client extension, and/or an extension backend, and this example does not limit the functions or interaction events that can be provided by the systems or devices of this disclosure.

At block 2102, the processor creates rules for one or more viewer interactions. The processor can create the rules in response to a request via a streamer client or streamer client extension that received parameters for the one or more viewer interactions input by a streamer, such as being input in the interaction rules creation interface 1906 or the event creation interface 1908. The interaction rules can be rules for designating the types of fans, times, triggers, or other parameters for various interactions or events, such as featured fan criteria, end-of-game criteria, locker room or other avatar interaction criteria, loadout requests criteria, fan challenge criteria, fan team-up criteria, or VIP chat criteria. For example, parameters that define the one or more viewer interactions can be parameters that filter which fans can be involved in the interaction, such as whether a fan is a subscriber, has been subscribed for at least a particular period of time, is subscribed at or above a particular subscription tier, or other parameters. Parameters can also include whether a fan has been engaged in affecting the game play, such as by using a particular number of items that affect the gameplay, a rate of item use, use of an item that is at or above a particular item rarity classification, use of an item during the current match, or other parameters. Parameters can also include whether the viewer has voted, voted a number of times, voted at a particular rate, voted this match, or other parameters. Parameters can also include whether the fan has customized an avatar, an average rarity for the fan's avatar equipment, or other parameters.

At decision block 2104, the processor determines if one or more of the interaction parameters are met. In some embodiments, the extension backend monitors the stream viewer client extension and the streamer client extension, or the stream viewer client extension and the streamer client extension send periodic updates to the extension backend, to determine if a trigger for an event has occurred. If, at decision block 2104, the processor determines that no rules are met, the process 2100 loops back to decision block 2104 to further monitor activity of the streamer and viewers. If, at decision block 2104, the processor determines that one or more rules are met, the process 2100 moves to decision block 2106.

At decision block 2106, the processor determines if the interaction that has one or more rules met is an automatically triggering action, such as an automatic featured fan action, an end-of-game celebration action, a raffle, or other interaction. If the action is an automatic interaction, the process 2100 moves to block 2114 to perform the interaction. The process 2100 then ends at block 2116. If, at decision block 2106, the processor determines that the interaction is not an automatically triggering interaction, such as if the interaction is a privilege granted to a viewer such as a fan team-up request, VIP chat privileges, or other privileges, or if the interaction is a streamer hosted interaction such as a tournament, the process 2100 moves to decision block 2108.

At decision block 2108, the processor determines if the triggered interaction is a viewer action. If not, at block 2110, the processor receives a streamer interaction selection, such as a selection by a streamer to begin a tournament, team-up with a viewer, challenge a viewer, hold a voting event, or other interactions that can be chosen by the streamer. The process 2100 then moves to block 2114 to perform the interaction. The process 2100 then ends at block 2116. If, at decision block 2108, the processor determines that the interaction is a viewer action, the process 2100 moves to block 2112. At block 2112, the processor receives a viewer interaction request from among a viewer's available actions, such as a loadout request, a team-up request, a challenge request, or other interactions. The process 2100 then moves to block 2114 to perform the interaction. The process 2100 then ends at block 2116.

Figure 22:
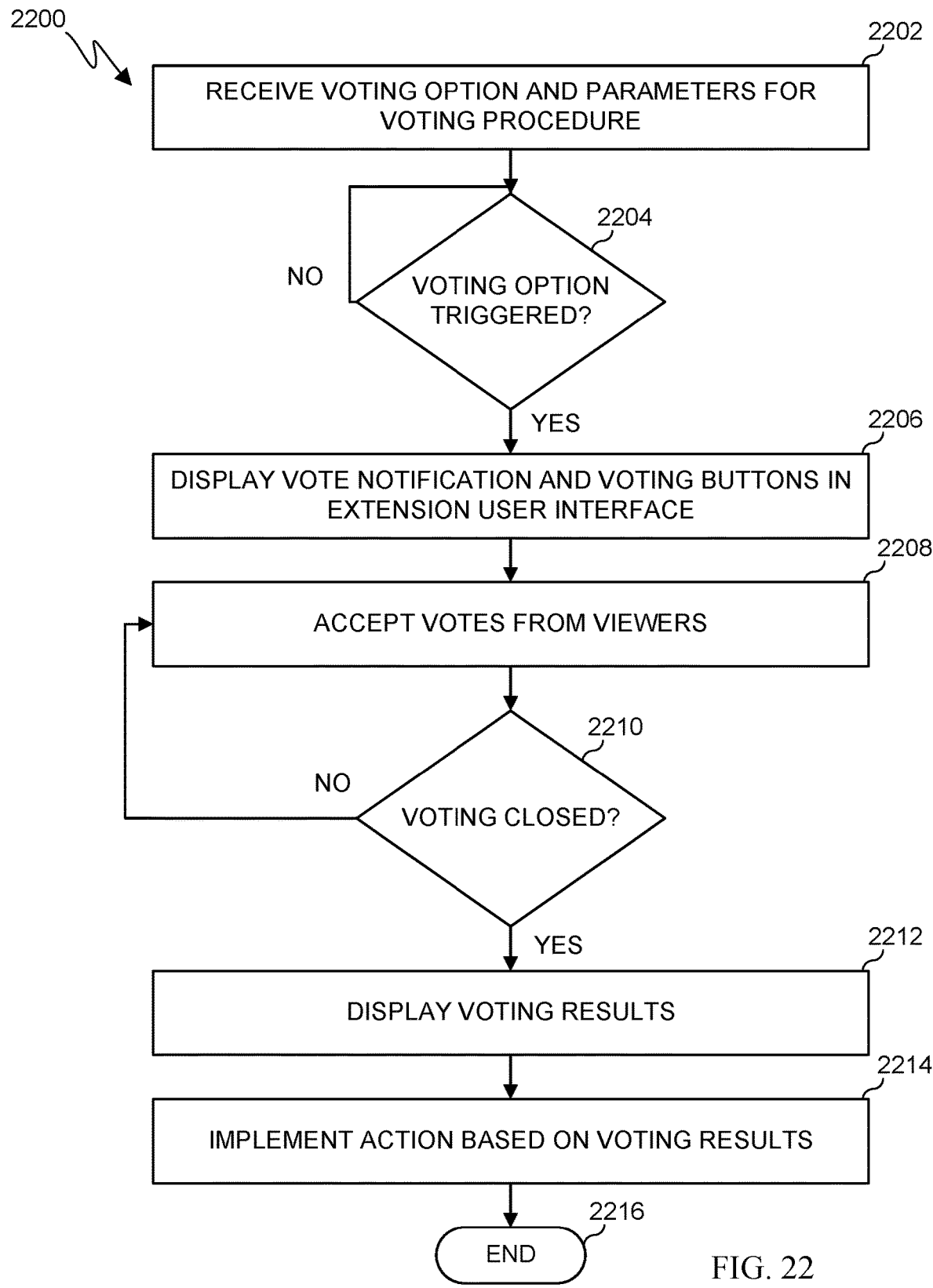
FIG. 22 illustrates a voting process in accordance with various embodiments of this disclosure.

FIG. 22 illustrates a voting process 2200 in accordance with various embodiments of this disclosure. FIG. 22 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 2200 is described with respect to the processor 120 of any, or a combination, of the streaming service 1302, the stream viewer device 1304, the extension backend 1306, the game server 1308, or the streaming device 1305. However, the process 2200 can be used with any other suitable device(s) and in any suitable system. It will be understood that the process 2200 is one example of a function or interaction event of a streaming service, streaming client, streaming client extension, and/or an extension backend, and this example does not limit the functions or interaction events that can be provided by the systems or devices of this disclosure.

At block 2202, the processor receives one or more voting options and parameters for a voting procedure. For example, a streamer can use a streamer client or streamer client extension interface to create one or more voting events each having unique queries and responses. For instance, the streamer can create a voting query regarding which character the streamer should play, a voting query regarding a choice of match types, a voting query regarding which attacks to use, a voting query regarding favorite modding tools, or other voting queries. The streamer can also choose when each of the one or more voting options is displayed, such as between match rounds, after a game, before a game, during a game, when a viewer performs an action, or other times. The voting options can be stored by a streamer client or streamer client extension, or by an extension backend. At decision block 2204, the processor determines if the parameters for triggering a voting option occur. If not, the process 2200 loops back to decision block 2204 to await a triggering event. If so, the process 2200 moves to block 2206.

At block 2206, the processor displays, or sends a request or notification to display, a vote notification and voting buttons in a user interface of a viewer client or viewer client extension. At block 2208, the processor accepts and receives voting choices from at least one viewer. At decision block 2210, the processor determines if voting is closed. The closing of voting can be set by the parameters received in block 2202, such as setting a time for the voting procedure, designating that voting will close once a match begins, or other closing parameters. If, at decision block 2210, the processor determines that voting is not yet closed, the process 2200 moves back to block 2208 to continue accepting votes from viewers. If, at decision block 2210, the processor determines that voting is closed, the process 2200 moves to block 2212. At block 2212, the processor displays, or sends a request or notification to display, voting results based on the votes received at block 2208. The voting results can be displayed in the streamer client or streamer client extension, or in stream viewer clients or stream viewer client extensions. At block 2214, the processor implements an action based on the voting results. In some embodiments, an action can be performed in response to a winning vote result, and the action can be initiated or performed by a viewer or streamer, or automatically based on the vote result. For example, if a poll to choose which character a streamer it to play as is completed, selection of the winning character can automatically be selected for the player or streamer. The process 2200 ends at block 2216.

Figure 23:
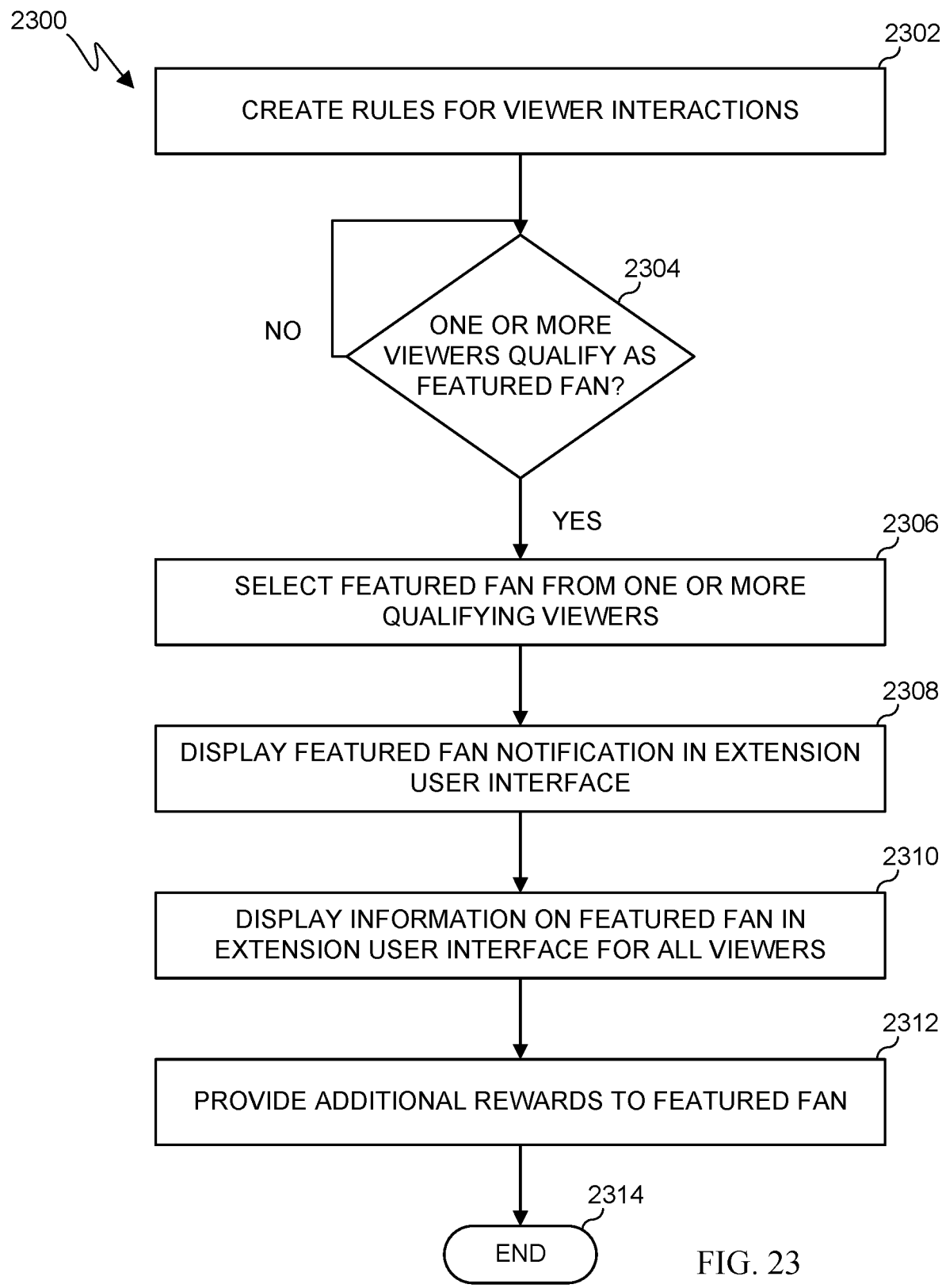
FIG. 23 illustrates a featured fan process in accordance with various embodiments of this disclosure.

FIG. 23 illustrates a featured fan process 2300 in accordance with various embodiments of this disclosure. FIG. 23 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 2300 is described with respect to the processor 120 of any, or a combination, of the streaming service 1302, the stream viewer device 1304, the extension backend 1306, the game server 1308, or the streaming device 1305. However, the process 2300 can be used with any other suitable device(s) and in any suitable system. It will be understood that the process 2300 is one example of a function or interaction event of a streaming service, streaming client, streaming client extension, and/or an extension backend, and this example does not limit the functions or interaction events that can be provided by the systems or devices of this disclosure.

At block 2302, the processor creates rules for one or more viewer interactions. The processor can create the rules in response to a request via a streamer client or streamer client extension that received parameters for the one or more viewer interactions input by a streamer, such as being input in the interaction rules creation interface 1906 or the event creation interface 1908. The interaction rules can be rules for designating the types of fans, times, triggers, or other parameters for various interactions or events, such as featured fan criteria, end-of-game criteria, locker room or other avatar interaction criteria, loadout requests criteria, fan challenge criteria, fan team-up criteria, or VIP chat criteria. For example, parameters that define the one or more viewer interactions can be parameters that filter which fans can be involved in the interaction, such as whether a fan is a subscriber, has been subscribed for at least a particular period of time, is subscribed at or above a particular subscription tier, or other parameters. Parameters can also include whether a fan has been engaged in affecting the game play, such as by using a particular number of items that affect the gameplay, a rate of item use, use of an item that is at or above a particular item rarity classification, use of an item during the current match, or other parameters. Parameters can also include whether the viewer has voted, voted a number of times, voted at a particular rate, voted this match, or other parameters. Parameters can also include whether the fan has customized an avatar, an average rarity for the fan's avatar equipment, or other parameters.

At decision block 2304, the processor determines, based on the created rules or parameters, if one or more viewers qualify as a featured fan. In some embodiments, the extension backend monitors the stream viewer client extension and the streamer client extension, or the stream viewer client extension and the streamer client extension send periodic updates to the extension backend, to determine if or when a viewer qualifies as a featured fan. In some embodiments, the streamer can set the featured fan criteria, such as subscription tier, and, once a fan or viewer becomes a subscriber at or above the specified subscription tier, the viewer is added to a pool of potential fans to be selected as a featured fan. At block 2306, the processor selects a featured fan from among one or more qualifying viewers. The selection of the featured fan can be a manual selection, such as if a streamer manually selects which fan to feature, or non-manual, such as a random selection, a selection from a queue, such as if fans are queued for featured fan status, such as in a first-in-first-out (FIFO) procedure that ensures each eligible fan is featured before a same fan is featured again, a weighted system in which fans are chosen based on how often or how much a fan engages in interactions during a stream, direct triggers such as triggering featured fan status when a fan performs a particular interaction, or other selection procedures.

At block 2308, the processor displays, or sends one or more requests to display, a featured fan notification in a stream viewer client or stream viewer extension application, and/or in a streamer client or streamer extension application, such as described with respect to FIG. 20. At block 2310, the processor displays, or sends one or more requests to display, information on the selected featured fan in user interfaces of the stream viewer clients or extensions for all current stream viewers. In some embodiments, the featured fan can also be displayed in-game, such as bringing a featured fan down onto a field or arena, or highlighting the featured fan in a crowd or in the stands. At block 2312, the processor can provide additional rewards to the selected featured fan, and the rewards can be stored in association with the featured fan's account. For example, the featured fan can be awarded fan points, digital currency, reward items to use during a stream, collection items or cards, loadout items, or special privileges such as one or more opportunities to request an avatar interaction with the streamer, a fan team-up, a fan challenge, or other privileges or rewards. The process 2300 ends at block 2314.

Figure 24:
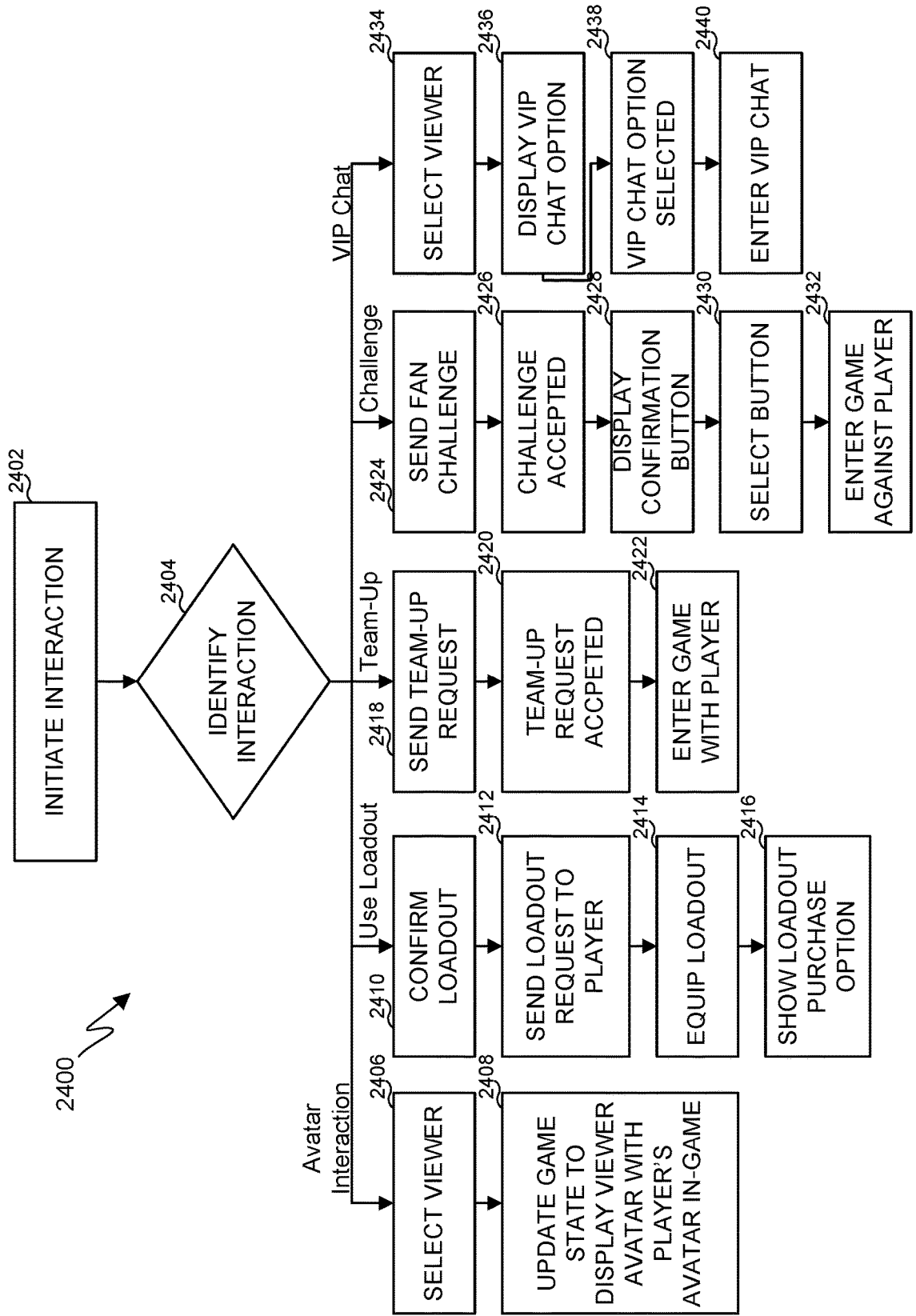
FIG. 24 illustrates a variable interaction process in accordance with various embodiments of this disclosure.

FIG. 24 illustrates a variable interaction process 2400 in accordance with various embodiments of this disclosure. FIG. 24 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 2400 is described with respect to the processor 120 of any, or a combination, of the streaming service 1302, the stream viewer device 1304, the extension backend 1306, the game server 1308, or the streaming device 1305. However, the process 2400 can be used with any other suitable device(s) and in any suitable system. It will be understood that the process 2400 includes examples of functions or interaction events of a streaming service, streaming client, streaming client extension, and/or an extension backend, and the examples do not limit the functions or interaction events that can be provided by the systems or devices of this disclosure.

At block 2402, the processor initiates an interaction, such as if an event in-game, by a viewer, by a streamer, or due to other factors, triggers an event. At decision block 2404, the processor determines the type of event for the triggered event. If the identified event is an avatar interaction, the process 2400 moves to block 2406. At block 2406, the processor selects a viewer based on parameters such as if a viewer requested the avatar interaction, if a viewer is chosen for other reasons, such as randomly, or due to a previous interaction by the viewer. At block 2408, the processor updates, or sends a request to update, the game state to display the viewer's avatar with the player's avatar in-game, or, in some embodiments, in a user interface of a streaming application or extension. The viewer's avatar can interact with the player's avatar, such as following the player's avatar, performing emotes or gestures with the player's avatar, sitting with the player's avatar between matches, or other avatar interactions.

If, at decision block 2404, the processor determines the interaction is a loadout request interaction, the process 2400 moves to block 2410. At block 2410, the processor confirms with a fan or viewer, or the fan or viewer submits a confirmation, of a loadout selected by the viewer. At block 2412, the processor sends or receives a loadout request from the viewer, wherein the loadout request includes data regarding a full loadout that can be equipped or used by the player. At block 2414, the processor equips, or sends a request or notification to equip, the loadout selected by the viewer on the player's character or other object the player plays as or uses. At block 2416, the processor can display, or send a request to display, a loadout purchase option to the player. In some embodiments, a player can equip a viewer's selected loadout even though the player does not own all the items in the loadout, to incentivize the player to purchase the missing loadout items after the player receives an opportunity to play using the loadout items. In some embodiments, a viewer whose loadout is selected often by the player can also be given rewards.

If, at decision block 2404, the processor determines that the interaction is a fan team-up interaction, the process 2400 moves to block 2418. At block 2418, the processor sends or receives a team-up request. In some embodiments, a streamer can send a team-up request, while, in some embodiments, a viewer can send a team-up request. At block 2420, the processor accepts the team-up request and a team including at least the viewer and the streamer is created at the game server and/or in the game client. At block 2422, the processor operates to enter the viewer into a game with the player. In some embodiments, a team-up can even occur when a viewer does not own the game, to give the viewer an opportunity to play the game so that the viewer can decide whether the viewer wishes to purchase a licensed copy of the game to continue playing. In some embodiments, when a team-up or challenge interaction occurs, or when other interactions that involve the viewer playing a game occur, a game client application can be executed on the stream viewer device to allow the viewer to play the game, even if the viewer does not own the game. In some embodiments, the stream viewer client or stream viewer client extension can include executable instructions for streaming gameplay, such that the game is streamed to the viewer from a remote server and the viewer can send commands back to the server to control and play the game, even though the game is not installed on the stream viewer device.

If, at decision block 2404, the processor determines that the interaction is a fan challenge interaction, the process 2400 moves to block 2424. At block 2424, the processor sends or receives a challenge request. In some embodiments, a streamer can send a challenge request, while, in some embodiments, a viewer can send a challenge request. At block 2426, the processor accepts the challenge request, such as in response to an input to accept the request by either the streamer or viewer. At block 2428, a confirmation button is displayed to the streamer or viewer who initiated the interaction at block 2402, to allow the streamer of viewer to confirm they still wish to enter the game. A similar confirmation button can also be displayed during a fan team-up process. At block 2430, the confirmation is selected. At block 2432, the processor creates at the game server and/or in the game client a game or match pitting the streamer and the viewer against one another. The processor operates to enter the viewer into a game with the player. In some embodiments, a challenge can even occur when a viewer does not own the game, to give the viewer an opportunity to play the game so that the viewer can decide whether the viewer wishes to purchase a licensed copy of the game to continue playing. In some embodiments, when a team-up or challenge interaction occurs, or when other interactions that involve the viewer playing a game occur, a game client application can be executed on the stream viewer device to allow the viewer to play the game, even if the viewer does not own the game. In some embodiments, the stream viewer client or stream viewer client extension can include executable instructions for streaming gameplay, such that the game is streamed to the viewer from a remote server and the viewer can send commands back to the server to control and play the game, even though the game is not installed on the stream viewer device.

If, at decision block 2404, the processor determines that the interaction is a VIP chat interaction, the process 2400 moves to block 2434. Stream viewer clients or stream viewer client extensions and/or streamer clients or streamer client extensions, can include a VIP chat interface displayed in a window similarly to the chat window shown in FIG. 8, except that the VIP chat may only include certain fans based on fan engagement or status, providing these fans with the ability have more exclusive communication with the streamer and other VIP fans. At block 2434, the processor selects a viewer or fan based on VIP chat criteria such as subscription level, fan level, an amount of fan engagement, or other criteria. At block 2436, the processor displays, or sends a request to display, a VIP chat option to the viewer. The processor also receives a notification that the VIP chat option is selected by the viewer. At block 2440, the processor enters, or sends a request to enter, the viewer into the VIP chat room.

Figure 25:
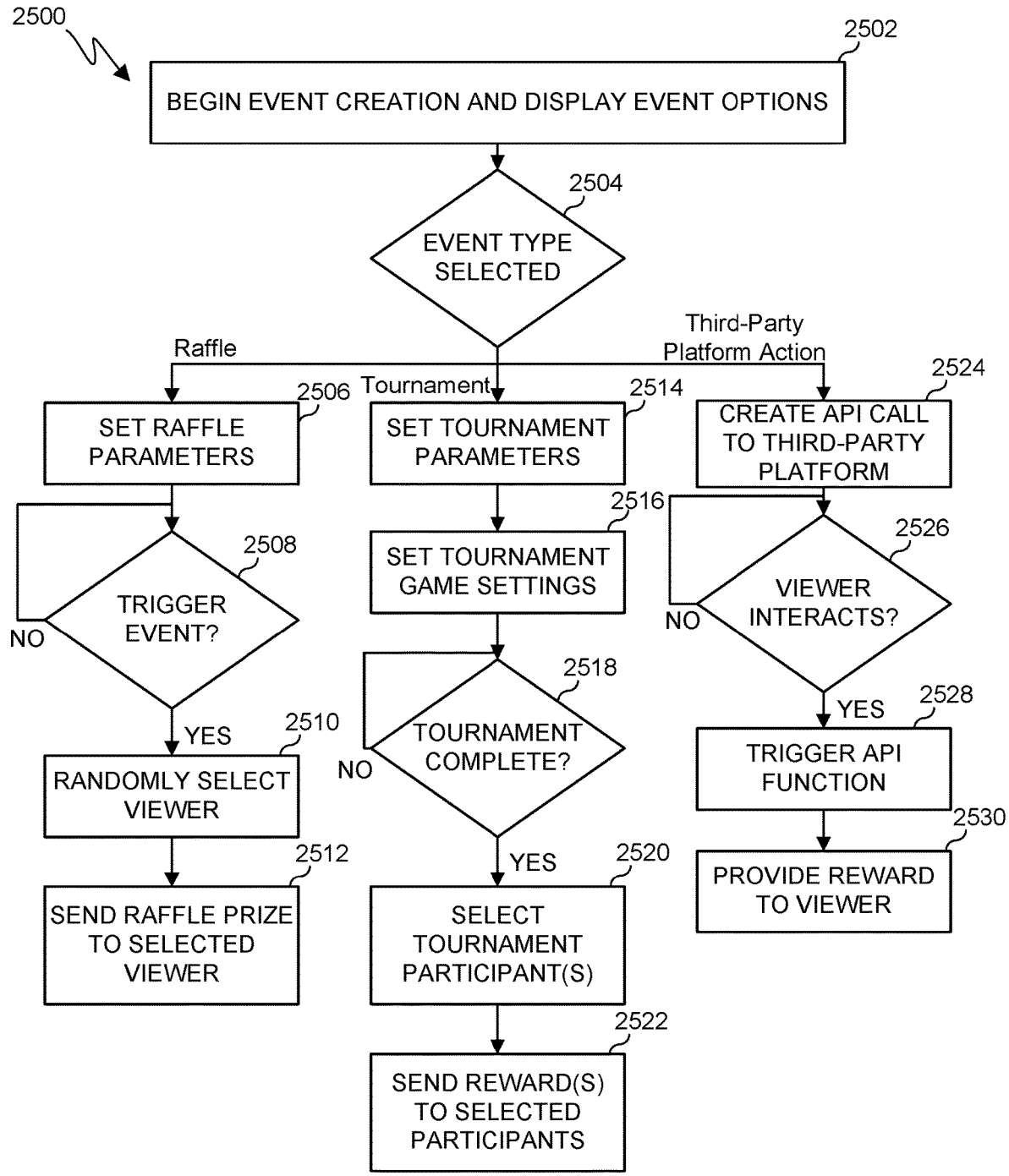
FIG. 25 illustrates a variable event process in accordance with various embodiments of this disclosure.

FIG. 25 illustrates a variable event process 2500 in accordance with various embodiments of this disclosure. FIG. 25 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. It will be understood that the process 2500 is described with respect to the processor 120 of any, or a combination, of the streaming service 1302, the stream viewer device 1304, the extension backend 1306, the game server 1308, or the streaming device 1305. However, the process 2500 can be used with any other suitable device(s) and in any suitable system. It will be understood that the process 2500 includes examples of functions or interaction events of a streaming service, streaming client, streaming client extension, and/or an extension backend, and the examples do not limit the functions or interaction events that can be provided by the systems or devices of this disclosure.

At block 2502, the processor begins, or receives a request or notification to begin, event creation and displays event options, such as if a streamer begins using an event creation interface to create an event in a streamer client or a streamer client extension. At decision block 2504, the processor determines if an event type is selected. If a raffle event type is selected, the process 2500 moves to block 2506. At block 2506, the processor sets raffle parameters, such as parameters for the raffle set by a streamer using a user interface to select different options for the parameters. The processor can store the parameters in a memory in association with the raffle event, and in association with the streamer account that created the raffle event. At decision block 2508, the processor determines if a trigger event occurs. If not, the process 2500 loops back to decision block 2508. If so, at block 2510, the processor randomly selects a viewer as the winner of the raffle. In some embodiments, other ways of selecting the winning viewer can be performed. At block 2512, the processor transmits or receives the raffle prize to the selected viewer, such as by sending or receiving a request to add an item to the viewer's account.

If, at decision block 2504, the processor determines that the selected event type is a tournament event, the process moves to block 2514. At block 2514, the processor sets tournament parameters, such as parameters for which viewers can request to participate in the tournament, whether tickets are to be purchased to enter the tournament, a date and time the tournament will take place, or other parameters. At block 2516, the processor sets tournament game settings, such as settings for match or game type, characters, items, or other in-game assets that can be used, number of players, or other settings. The processor can store the parameters and settings in a memory in association with the tournament event, and in association with the streamer account that created the tournament event. At decision block 2518, the processor determines if the tournament is complete. If not, the process 2500 loops back to decision block 2518 to await the end of the tournament. If so, at block 2520, the processor selects at least one tournament participant to receive an award, such as the first place winner of the tournament. At block 2522, the processor can transmit or add rewards to a participant's account, such as items that can be used to affect gameplay while viewing a stream, collectible items or cards, achievements, fan point or levels, digital currency, redeemable store tokens, loadout items, avatar customization options, or other rewards.

If, at decision block 2504, the processor determines that the selected event type is a third-party platform action, the process 2500 moves to block 2524. A third-party platform action can be some type of action such as a promotional event or item with a third-party other than the streaming service, the extensions and extension backend, and the game server/client. For example, a streamer may have a personal web site that promotes the streamer's brand and content, or may be affiliated with third-party sites such as crowdfunding sites or platforms, modding or other gaming tool platforms, accounts with other games, or other third-party platforms. In some embodiments, an API call to a third-party platform can be used in a stream viewer application or extension, or a streamer application or extension, to link to a third-party platform and provide additional functionality to the stream viewer application or extension, or the streamer application or extension. For example, the API call can provide an interface or interface object of a third-party site for donating to the streamer's personal bank account, or to donate to a streamer's crowdfunding account to provide funds to the streamer to produce and create content, such as videos, game mods or mod tools, prize giveaways, and other content.

At block 2524, the processor creates an API call to a third-party platform, and the processor displays an object for a user to interact with to trigger the API call in a streaming client application. At decision block 2526, the processor determines if a viewer interacts with the object. If not, the process 2500 loops back to decision block 2526. If so, at block 2528, the processor triggers the API function, such as transmitting a request to the third-party platform to perform the function, such as a donation, associated with the API object. At block 2530, the processor can provide a reward to the viewer for taking advantage of the additional third-party functionality by providing a reward to the viewer, such as in-game items, digital currency, additional avatar customization options, fan points, or other rewards.

In one example embodiment, an electronic device for interactive content streaming comprises a memory and at least one processor coupled to the memory, wherein the at least one processor is configured to receive an interaction request from a streaming device, determine at least one action based on the interaction request, provide an action notification, based on the at least one action, to a content source, wherein the action notification notifies the content source to update a state of at least one content of the content source, and transmit a state update notification to the streaming device, wherein the state update notification updates one or more applications of the streaming device based on the updated state of the at least one content.

In one or more of the above examples, the one or more applications include an extension application and a streaming application, and wherein the extension application is configured to monitor user activity in the streaming application.

In one or more of the above examples, the at least one processor is further configured to stream the updated state of the at least one content to one or more streaming client applications.

In one or more of the above examples, the updated state of the at least one content includes a visually-identifiable action involving at least one streamer and at least one stream viewer.

In one or more of the above examples, the user activity includes one or more of content streamer activity, stream viewer activity, a number of stream viewers associated with a content streamer, an amount of streaming time of the content streamer, and a type of content streamed by the content streamer.

In one or more of the above examples, the at least one processor is further configured to receive, from the extension application, a participation notification based on the user activity, and update a user account based on the participation notification.

In one or more of the above examples, the at least one processor is further configured to determine, based on the user account, whether performance of the at least one action is enabled.

In one or more of the above examples, determining whether the performance of the at least one action is enabled is based on at least one consumable resource included in the user account, and wherein the at least one consumable resource is associated with the at least one action.

In one or more of the above examples, the at least one processor is further configured to consume the consumable resource based on the state update notification.

In one or more of the above examples, the at least one processor is further configured to receive, in response to the action notification, a confirmation message from the content source, wherein the confirmation message confirms the updated state of the at least one content.

In another example embodiment, a method for interactive content streaming comprises receiving an interaction request from a streaming device, determining at least one action based on the interaction request, providing an action notification, based on the at least one action, to a content source, wherein the action notification notifies the content source to update a state of at least one content of the content source, and transmitting a state update notification to the streaming device, wherein the state update notification updates one or more applications of the streaming device based on the updated state of the at least one content.

In one or more of the above examples, the one or more applications include an extension application and a streaming application, and wherein the extension application monitors user activity in the streaming application.

In one or more of the above examples, the method further comprises streaming the updated state of the at least one content to one or more streaming client applications.

In one or more of the above examples, the updated state of the at least one content includes a visually-identifiable action involving at least one streamer and at least one stream viewer.

In one or more of the above examples, the user activity includes one or more of content streamer activity, stream viewer activity, a number of stream viewers associated with a content streamer, an amount of streaming time of the content streamer, and a type of content streamed by the content streamer.

In one or more of the above examples, the method further comprises receiving, from the extension application, a participation notification based on the user activity, and updating a user account based on the participation notification.

In one or more of the above examples, the method further comprises determining, based on the user account, whether performance of the at least one action is enabled.

In one or more of the above examples, determining whether the performance of the at least one action is enabled is based on at least one consumable resource included in the user account, and wherein the at least one consumable resource is associated with the at least one action.

In one or more of the above examples, the method further comprises consuming the consumable resource based on the state update notification.

In one or more of the above examples, the method further comprises receiving, in response to the action notification, a confirmation message from the content source, wherein the confirmation message confirms the updated state of the at least one content.

In another example embodiment, a method for providing interactions during a media stream comprises receiving an interaction request from a streaming device, determining at least one action based on the interaction request, transmitting an action notification based on the at least one action to a content source, receiving a confirmation message from the content source, wherein the confirmation message confirms that a state of at least one content of the content source is updated in response to the action notification, and transmitting a state update notification to update a streaming client application on the streaming device based on the updated state.

In one or more of the above examples, the interaction request includes an identification of a consumable resource, the method further comprising determining based on the identification of the consumable resource that the at least one action is available.

In one or more of the above examples, the state update notification includes an indication that the consumable resource is consumed.

In one or more of the above examples, the media stream is a stream of a video game, wherein the at least one content is game content, and wherein the content source is a game server.

In one or more of the above examples, the at least one action is configured to alter the state of the video game.

In one or more of the above examples, the streaming device includes an extension application configured to operate concurrently with the streaming client application, and wherein the extension application is configured to monitor user activity in the streaming client application.

In one or more of the above examples, the method further comprises receiving from the extension application a participation notification, wherein the participation notification indicates an occurrence of a particular user activity, and updating a user account based on the particular user activity.

In one or more of the above examples, updating the user account based on the particular user activity includes associating a consumable resource with the user account.

In one or more of the above examples, the interaction request includes an identification of the consumable resource, the method further comprising determining based on the identification of the consumable resource that the at least one action is available.

In one or more of the above examples, the state update notification includes an indication that the consumable resource is consumed, and wherein the state update notification causes an update of an inventory of consumable resources in the extension application.

In another example embodiment, a method for providing content to a streaming client application comprises receiving an identifier detection notification from the streaming client application, wherein the identifier detection notification includes information associated with an identifier detected by the streaming client application in one or more streamed images, retrieving at least one content in response to the identifier detection notification, and transmitting the at least one content to the streaming client application for display in the streaming client application.

In one or more of the above examples, the one or more applications include an extension application and a streaming application, and wherein the extension application monitors user activity in the streaming application.

In one or more of the above examples, the method further comprises streaming the updated state of the at least one content to one or more streaming client applications.

In one or more of the above examples, the updated state of the at least one content includes a visually-identifiable action involving at least one streamer and at least one stream viewer.

In one or more of the above examples, the user activity includes one or more of content streamer activity, stream viewer activity, a number of stream viewers associated with a content streamer, an amount of streaming time of the content streamer, and a type of content streamed by the content streamer.

In one or more of the above examples, the method further comprises receiving, from the extension application, a participation notification based on the user activity, and updating a user account based on the participation notification.

In one or more of the above examples, the method further comprises determining, based on the user account, whether performance of the at least one action is enabled.

In one or more of the above examples, determining whether the performance of the at least one action is enabled is based on at least one consumable resource included in the user account, and wherein the at least one consumable resource is associated with the at least one action.

In one or more of the above examples, the method further comprises consuming the consumable resource based on the state update notification.

In one or more of the above examples, the method further comprising receiving, in response to the action notification, a confirmation message from the content source, wherein the confirmation message confirms the updated state of the at least one content.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An electronic device for interactive content streaming, comprising:
   a memory; and
   at least one processor coupled to the memory, wherein the at least one processor is configured to:
      execute an extension backend service;
      receive an interaction request, via the extension backend service, from an extension application executed on a streaming device, wherein the extension application is configured to:
         provide additional functionality to a streaming application executed on the streaming device, including providing additional viewer communications options, functions to interact with content streamed by another streaming device, and functions to enable projection of additional content onto the streaming application, wherein the projected additional content includes a viewer inventory interface having one or more inventory components, wherein the one or more inventory components projected in the viewer inventory interface are specific to individual viewers, and monitor user activity related to streamer-viewer interactions in the streaming application, wherein the user activity includes content streamer activity, an amount of streaming time of a content streamer, and a type of content streamed by the content streamer;

determine, via the extension backend service, at least one action based on the interaction request,
wherein the interaction request includes a selection of at least one of the one or more inventory components, and
wherein the interaction request includes a consume message from the extension application, wherein the consume message includes a plurality of parameters including the selection of the at least one of the one or more inventory components, and at least one of a viewer authentication token and a viewer account identifier;

update, via the extension backend service, a database to reflect a consumption of the at least one of the one or more inventory components;

provide, via the extension backend service, an action notification, based on the at least one action, to a content source, wherein the action notification notifies the content source to update a state of at least one content of the content source; and transmit, via the extension backend service, a state update notification to the streaming device, wherein the state update notification updates one or more applications of the streaming device based on the updated state of the at least one content.

2. The electronic device of claim 1, wherein the one or more applications include the extension application and the streaming application.

3. The electronic device of claim 2, wherein the at least one processor is further configured to stream the updated state of the at least one content to one or more streaming client applications.

4. The electronic device of claim 2, wherein the updated state of the at least one content includes a visually-identifiable action involving at least one streamer and at least one stream viewer.

5. The electronic device of claim 2, wherein the user activity further includes one or more of:
stream viewer activity; and
a number of stream viewers associated with the content streamer.

6. The electronic device of claim 2, wherein the at least one processor is further configured to:
receive, from the extension application, a participation notification based on the user activity; and
update a user account based on the participation notification.

7. The electronic device of claim 6, wherein the at least one processor is further configured to determine, based on the user account, whether performance of the at least one action is enabled.

8. The electronic device of claim 7, wherein determining whether the performance of the at least one action is enabled is based on at least one consumable resource included in the user account, and wherein the at least one consumable resource is associated with the at least one action, and wherein the consumable resource includes the one or more inventory components.

9. The electronic device of claim 8, wherein the at least one processor is further configured to reflect the consumption of the consumable resource based on the state update notification.

10. The electronic device of claim 1, wherein the at least one processor is further configured to receive, in response to the action notification, a confirmation message from the content source, wherein the confirmation message confirms the updated state of the at least one content.

11. The electronic device of claim 1, wherein the state update notification further causes a streaming service to update the extension application via a publish-subscribe communication system that periodically pushes received updates at predetermined intervals.

12. A method for interactive content streaming, comprising:

executing an extension backend service;

receiving an interaction request, via the extension backend service, from an extension application executed on a streaming device, wherein the extension application provides:
additional functionality to a streaming application executed on the streaming device, including providing additional viewer communications options, functions to interact with content streamed by another streaming device, and functions to enable projection of additional content onto the streaming application, wherein the projected additional content includes a viewer inventory interface having one or more inventory components, wherein the one or more inventory components projected in the viewer inventory interface are specific to individual viewers, and
monitoring of user activity related to streamer-viewer interactions in the streaming application, wherein the user activity includes content streamer activity, an amount of streaming time of a content streamer, and a type of content streamed by the content streamer;

determining, via the extension backend service, at least one action based on the interaction request,
wherein the interaction request includes a selection of at least one of the one or more inventory components, and
wherein the interaction request includes a consume message from the extension application, wherein the consume message includes a plurality of parameters including the selection of the at least one of the one or more inventory components, and at least one of a viewer authentication token and a viewer account identifier;

updating, via the extension backend service, a database to reflect a consumption of the at least one of the one or more inventory components;

providing, via the extension backend service, an action notification, based on the at least one action, to a content source, wherein the action notification notifies the content source to update a state of at least one content of the content source; and transmitting, via the extension backend service, a state update notification to the streaming device, wherein the state update notification updates one or more applications of the streaming device based on the updated state of the at least one content.

13. The method of claim 12, wherein the one or more applications include the extension application and the streaming application.

14. The method of claim 13, further comprising streaming the updated state of the at least one content to one or more streaming client applications.

15. The method of claim 13, wherein the updated state of the at least one content includes a visually-identifiable action involving at least one streamer and at least one stream viewer.

16. The method of claim 13, wherein the user activity further includes one or more of:
- stream viewer activity; and
- a number of stream viewers associated with the content streamer.

17. The method of claim 13, further comprising:
- receiving, from the extension application, a participation notification based on the user activity; and
- updating a user account based on the participation notification.

18. The method of claim 17, further comprising determining, based on the user account, whether performance of the at least one action is enabled.

19. The method of claim 18, wherein determining whether the performance of the at least one action is enabled is based on at least one consumable resource included in the user account, and wherein the at least one consumable resource is associated with the at least one action, and wherein the consumable resource includes the one or more inventory components.

20. The method of claim 19, further comprising reflecting the consumption of the consumable resource based on the state update notification.

21. The method of claim 12, further comprising receiving, in response to the action notification, a confirmation message from the content source, wherein the confirmation message confirms the updated state of the at least one content.

* * * * *